United States Patent
Goldberg et al.

(10) Patent No.: US 10,654,394 B2
(45) Date of Patent: May 19, 2020

(54) MULTI-MODAL DISTRIBUTION SYSTEMS AND METHODS USING VENDING KIOSKS AND AUTONOMOUS DELIVERY VEHICLES

(71) Applicant: ZUME, Inc., Mountain View, CA (US)

(72) Inventors: Joshua Gouled Goldberg, Mountain View, CA (US); Alexander John Garden, Mountain View, CA (US); Vaibhav Goel, Mountain View, CA (US)

(73) Assignee: ZUME, Inc., Mountain View, CA (US)

( * ) Notice: Subject to any disclaimer, the term of this patent is extended or adjusted under 35 U.S.C. 154(b) by 0 days.

(21) Appl. No.: 16/163,339

(22) Filed: Oct. 17, 2018

(65) Prior Publication Data
US 2019/0047460 A1    Feb. 14, 2019

Related U.S. Application Data

(63) Continuation of application No. PCT/US2018/040785, filed on Jul. 3, 2018.
(Continued)

(51) Int. Cl.
*B60P 3/025* (2006.01)
*G06Q 10/08* (2012.01)
(Continued)

(52) U.S. Cl.
CPC ............. *B60P 3/0257* (2013.01); *B25J 5/007* (2013.01); *B25J 11/0045* (2013.01); *B60P 3/20* (2013.01);
(Continued)

(58) Field of Classification Search
CPC ...... B60P 3/0257; B60P 3/20; G06Q 10/0832; G06Q 50/12; G06Q 20/18; G06Q 20/40;
(Continued)

(56) References Cited

U.S. PATENT DOCUMENTS

| | | |
|---|---|---|
| 3,985,991 A | 10/1976 | Levinson |
| 4,373,636 A | 2/1983 | Hoffman |
| (Continued) | | |

FOREIGN PATENT DOCUMENTS

| | | |
|---|---|---|
| DE | 29606255 U1 | 9/1996 |
| EP | 2230184 A1 | 9/2010 |
| (Continued) | | |

OTHER PUBLICATIONS

CPG Insights, "Mobile factories and robotic pizza chefs: Rev your engines," email newsletter, mailed May 10, 2018; 13 pages.
(Continued)

*Primary Examiner* — Michael Collins
(74) *Attorney, Agent, or Firm* — Hertzberg, Turk & Associates, LLC

(57) ABSTRACT

Vehicles, components, and methods are disclosed for distributing hot or cold food items from a vending kiosk, a locker system, or a self-propelled delivery vehicle. The vending kiosk may have multiple doors, at least one of which is unlocked responsive to confirming a purchase transaction or authenticating the presence of a person or device associated with the purchase transaction. The multiple doors provide access to respective compartments that may be selectively heated and refrigerated. Such temperature changes may be based upon a temperature control schedule. The locker system may include one or more configurable compartments that may be accessible via a set of set of doors that can be selectively coupled into larger doors. The self-propelled delivery vehicle may have a plurality of thermally insulated compartments that may be used to carry multiple items at different temperatures.

24 Claims, 21 Drawing Sheets

Related U.S. Application Data

(60) Provisional application No. 62/531,131, filed on Jul. 11, 2017, provisional application No. 62/531,136, filed on Jul. 11, 2017, provisional application No. 62/532,885, filed on Jul. 14, 2017, provisional application No. 62/613,272, filed on Jan. 3, 2018.

(51) Int. Cl.
| | |
|---|---|
| *B25J 5/00* | (2006.01) |
| *B25J 11/00* | (2006.01) |
| *B62D 33/04* | (2006.01) |
| *B62D 63/04* | (2006.01) |
| *G07C 9/00* | (2020.01) |
| *B60P 3/20* | (2006.01) |
| *G07F 17/00* | (2006.01) |
| *G07F 11/46* | (2006.01) |
| *G07F 9/10* | (2006.01) |
| *G07F 17/12* | (2006.01) |
| *G07F 5/26* | (2006.01) |
| *G06Q 50/12* | (2012.01) |
| *G07F 11/00* | (2006.01) |
| *G07F 11/04* | (2006.01) |
| *G07F 11/38* | (2006.01) |
| *G06Q 20/18* | (2012.01) |
| *G06Q 20/40* | (2012.01) |
| *G07F 11/62* | (2006.01) |
| *G05D 1/00* | (2006.01) |
| *H05B 3/00* | (2006.01) |

(52) U.S. Cl.
CPC ........... *B62D 33/042* (2013.01); *B62D 63/04* (2013.01); *G05D 1/0088* (2013.01); *G06Q 10/0832* (2013.01); *G06Q 20/18* (2013.01); *G06Q 20/40* (2013.01); *G06Q 50/12* (2013.01); *G07C 9/00563* (2013.01); *G07F 5/26* (2013.01); *G07F 9/10* (2013.01); *G07F 9/105* (2013.01); *G07F 11/007* (2013.01); *G07F 11/04* (2013.01); *G07F 11/38* (2013.01); *G07F 11/46* (2013.01); *G07F 11/62* (2013.01); *G07F 17/0064* (2013.01); *G07F 17/12* (2013.01); *G05D 2201/0216* (2013.01); *H05B 3/00* (2013.01)

(58) Field of Classification Search
CPC ..... B25J 5/007; B25J 11/0045; B62D 33/042; B62D 63/04; G07C 9/00563; G07F 17/0064; G07F 11/46; G07F 9/10; G07F 17/12; G07F 5/26; G07F 11/007; G07F 11/04; G07F 11/38; G07F 11/62; G07F 9/105; G05D 1/0088; G05D 2201/0216; H05B 3/00
USPC ................................................. 700/231–244
See application file for complete search history.

(56) References Cited

U.S. PATENT DOCUMENTS

| | | | |
|---|---|---|---|
| 4,556,046 A | 12/1985 | Riffel et al. | |
| 4,632,836 A | 12/1986 | Abbott et al. | |
| 4,716,819 A | 1/1988 | Beltz | |
| 4,718,769 A | 1/1988 | Conkey | |
| 4,816,646 A | 3/1989 | Solomon et al. | |
| 4,912,338 A | 3/1990 | Bingham | |
| 4,919,477 A | 4/1990 | Bingham et al. | |
| 4,924,763 A | 5/1990 | Bingham | |
| 5,039,535 A | 8/1991 | Lang et al. | |
| 5,109,760 A | 5/1992 | Ansari | |
| D326,749 S | 6/1992 | Greve et al. | |
| 5,179,843 A | 1/1993 | Cohausz | |
| 5,243,899 A | 9/1993 | McDonald et al. | |
| 5,244,344 A | 9/1993 | Doeberl et al. | |
| 5,256,432 A | 10/1993 | McDonald et al. | |
| 5,299,557 A | 4/1994 | Braithwaite et al. | |
| 5,423,477 A | 6/1995 | Valdman et al. | |
| 5,435,685 A * | 7/1995 | Tsuda | B65G 1/0478 414/331.03 |
| 5,454,295 A | 10/1995 | Cox et al. | |
| 5,732,610 A | 3/1998 | Halladay et al. | |
| 5,921,163 A | 7/1999 | McInnes et al. | |
| 5,921,170 A | 7/1999 | Khatchadourian et al. | |
| 5,997,924 A | 12/1999 | Olander, Jr. et al. | |
| D426,646 S | 6/2000 | Monaghan et al. | |
| 6,320,165 B1 | 11/2001 | Ovadia | |
| 6,396,031 B1 | 5/2002 | Forrester | |
| 6,513,671 B2 | 2/2003 | Dicello et al. | |
| 6,543,983 B1 * | 4/2003 | Felder | B23Q 7/10 414/331.07 |
| 6,568,586 B1 | 5/2003 | Vanesley et al. | |
| 6,626,996 B1 | 9/2003 | Amigh et al. | |
| 6,755,122 B2 | 6/2004 | Holmes | |
| 6,843,167 B1 | 1/2005 | Kanafani et al. | |
| 7,127,984 B2 | 10/2006 | Holmes | |
| 7,174,830 B1 | 2/2007 | Dong | |
| 7,505,929 B2 | 3/2009 | Angert et al. | |
| 7,678,036 B1 | 3/2010 | Malitas et al. | |
| 7,984,667 B2 | 7/2011 | Freudinger | |
| 8,430,262 B2 | 4/2013 | Corbett et al. | |
| 8,549,432 B2 | 10/2013 | Warner | |
| 8,561,823 B1 | 10/2013 | Krupa | |
| 8,663,419 B2 | 3/2014 | Corbett et al. | |
| 8,807,377 B2 | 8/2014 | Corbett et al. | |
| D720,227 S | 12/2014 | Corbett et al. | |
| 8,948,914 B2 * | 2/2015 | Zini | G05B 19/41895 700/258 |
| 8,991,635 B2 | 3/2015 | Myerscough | |
| 9,010,621 B2 | 4/2015 | Baker et al. | |
| 9,126,717 B2 | 9/2015 | Myerscough | |
| 9,126,719 B2 | 9/2015 | Corbett et al. | |
| D743,302 S | 11/2015 | Weiner et al. | |
| D743,311 S | 11/2015 | Weiner et al. | |
| 9,292,889 B2 | 3/2016 | Garden | |
| D754,250 S | 4/2016 | Elmer | |
| 9,788,157 B2 | 10/2017 | Shaffer et al. | |
| 9,815,191 B2 | 11/2017 | Oleynik | |
| 9,914,223 B2 | 3/2018 | Fritz-Jung et al. | |
| 10,140,587 B2 | 11/2018 | Garden | |
| 2002/0048624 A1 | 4/2002 | Blanchet et al. | |
| 2002/0148831 A1 | 10/2002 | Dicello et al. | |
| 2003/0037681 A1 | 2/2003 | Zhu et al. | |
| 2003/0136782 A1 | 7/2003 | Dicello et al. | |
| 2003/0209194 A1 | 11/2003 | Amigh et al. | |
| 2004/0020375 A1 | 2/2004 | Holmes | |
| 2004/0194641 A1 | 10/2004 | Holmes | |
| 2004/0253348 A1 | 12/2004 | Woodward et al. | |
| 2004/0255795 A1 | 12/2004 | Holmes | |
| 2005/0193901 A1 | 9/2005 | Buehler | |
| 2006/0010037 A1 | 1/2006 | Angert et al. | |
| 2006/0027106 A1 | 2/2006 | Craig et al. | |
| 2006/0226669 A1 | 10/2006 | Tong et al. | |
| 2007/0160715 A1 | 7/2007 | Elnakib et al. | |
| 2008/0023459 A1 | 1/2008 | Leach | |
| 2008/0275643 A1 | 11/2008 | Yaqub et al. | |
| 2008/0316045 A1 * | 12/2008 | Sriharto | G06Q 50/22 340/10.1 |
| 2009/0048890 A1 | 2/2009 | Burgh | |
| 2009/0057381 A1 | 3/2009 | Gokhale | |
| 2010/0200591 A1 | 8/2010 | Myerscough | |
| 2010/0234995 A1 * | 9/2010 | Zini | G05B 19/41895 700/258 |
| 2011/0036846 A1 | 2/2011 | Corbett et al. | |
| 2011/0220652 A1 | 9/2011 | Corbett et al. | |
| 2011/0235463 A1 | 9/2011 | Justusson et al. | |
| 2012/0024859 A1 | 2/2012 | Longoni et al. | |
| 2012/0024897 A1 | 2/2012 | Corbett et al. | |
| 2012/0175367 A1 | 7/2012 | Lopes et al. | |
| 2012/0185086 A1 * | 7/2012 | Khatchadourian | A21D 8/02 700/233 |

(56) References Cited

U.S. PATENT DOCUMENTS

| | | |
|---|---|---|
| 2013/0101709 A1 | 4/2013 | Rader |
| 2014/0089077 A1 | 3/2014 | Zuckerman et al. |
| 2014/0370167 A1 | 12/2014 | Garden |
| 2015/0006005 A1 | 1/2015 | Yu et al. |
| 2015/0019354 A1 | 1/2015 | Chan et al. |
| 2015/0068945 A1 | 3/2015 | Baker et al. |
| 2015/0068946 A1 | 3/2015 | Baker et al. |
| 2015/0290795 A1 | 10/2015 | Oleynik |
| 2015/0343933 A1 | 12/2015 | Weiner et al. |
| 2015/0343936 A1 | 12/2015 | Weiner et al. |
| 2016/0053514 A1 | 2/2016 | Savage et al. |
| 2016/0054163 A1 | 2/2016 | Walton et al. |
| 2016/0063435 A1 | 3/2016 | Shah et al. |
| 2016/0066732 A1 | 3/2016 | Sarvestani |
| 2016/0162833 A1 | 6/2016 | Garden |
| 2016/0260161 A1 | 9/2016 | Atchley et al. |
| 2016/0292798 A1 | 10/2016 | Berry et al. |
| 2017/0010608 A1 | 1/2017 | High et al. |
| 2017/0024806 A1 | 1/2017 | High et al. |
| 2017/0055752 A1 | 3/2017 | Mueller et al. |
| 2017/0124670 A1 | 5/2017 | Becker et al. |
| 2017/0148075 A1 | 5/2017 | High et al. |
| 2017/0178066 A1 | 6/2017 | High et al. |
| 2017/0290345 A1 | 10/2017 | Garden et al. |
| 2017/0345033 A1 | 11/2017 | Wilkinson et al. |
| 2018/0053369 A1 | 2/2018 | High et al. |
| 2018/0060943 A1 | 3/2018 | Mattingly et al. |
| 2018/0071939 A1 | 3/2018 | Garden et al. |
| 2018/0105344 A1 | 4/2018 | Chiang et al. |
| 2018/0121037 A1 | 5/2018 | Wajda et al. |
| 2018/0194257 A1 | 7/2018 | Eismann |
| 2019/0034967 A1 | 1/2019 | Ferguson et al. |
| 2019/0050797 A1 | 2/2019 | Joshua et al. |
| 2019/0050798 A1 | 2/2019 | Joshua et al. |
| 2019/0050799 A1 | 2/2019 | Joshua et al. |
| 2019/0050800 A1 | 2/2019 | Garden |
| 2019/0050801 A1 | 2/2019 | Garden |
| 2019/0050802 A1 | 2/2019 | Garden |
| 2019/0050803 A1 | 2/2019 | Garden |
| 2019/0050804 A1 | 2/2019 | Garden |
| 2019/0050951 A1 | 2/2019 | Goldberg et al. |
| 2019/0050952 A1 | 2/2019 | Goldberg et al. |
| 2019/0051083 A1 | 2/2019 | Joshua et al. |
| 2019/0051086 A1 | 2/2019 | Goldberg et al. |
| 2019/0051087 A1 | 2/2019 | Goldberg et al. |
| 2019/0051090 A1 | 2/2019 | Goldberg et al. |

FOREIGN PATENT DOCUMENTS

| | | |
|---|---|---|
| EP | 1685045 B2 | 12/2014 |
| EP | 2984618 B1 | 9/2018 |
| FR | 3027148 A1 | 4/2016 |
| FR | 3047146 A1 | 8/2017 |
| FR | 3047149 A1 | 8/2017 |
| FR | 3047150 A1 | 8/2017 |
| FR | 3047158 A1 | 8/2017 |
| JP | 09-267276 A1 | 10/1997 |
| JP | 2002347944 A | 12/2002 |
| JP | 2003-240405 A1 | 8/2003 |
| JP | 5244344 B2 | 4/2013 |
| KR | 200360448 Y1 | 8/2004 |
| KR | 20090098949 A | 9/2009 |
| KR | 1020090098949 | 9/2009 |
| KR | 1020150121771 A1 | 10/2015 |
| WO | 9208358 A1 | 5/1992 |
| WO | 0167869 A1 | 9/2001 |
| WO | 2012005683 A1 | 1/2012 |
| WO | 2014205041 A1 | 12/2014 |
| WO | 2015006649 A1 | 1/2015 |
| WO | 2016094765 A1 | 6/2016 |
| WO | 2016169654 A1 | 10/2016 |
| WO | 2017019501 A1 | 2/2017 |
| WO | 2017134147 A1 | 8/2017 |
| WO | 2017134149 A1 | 8/2017 |
| WO | 2017134150 A1 | 8/2017 |
| WO | 2017134153 A1 | 8/2017 |
| WO | 2017134156 A1 | 8/2017 |
| WO | 2017205758 A1 | 11/2017 |
| WO | 2018039549 A1 | 3/2018 |
| WO | 2018052583 A1 | 3/2018 |
| WO | 2019014020 A1 | 1/2019 |
| WO | 2019014027 A1 | 1/2019 |
| WO | 2019014030 A1 | 1/2019 |

OTHER PUBLICATIONS

Extended European Search Report dated Jun. 22, 2016 for corresponding EP Application No. 148140445, 8 pages.
International Search Report and Written Opinion for PCT/US2018/040714 dated Nov. 16, 2018 in 9 pages.
International Search Report and Written Opinion for PCT/US2018/040765 dated Nov. 16, 2018 in 13 pages.
International Search Report and Written Opinion of the International Searching Authority, dated Jan. 31, 2018, for International Application No. PCT/US2017/050950, 20 pages.
International Search Report and Written Opinion of the International Searching Authority, dated Nov. 27, 2017, for International Application No. PCT/US2017/026408, 36 pages.
International Search Report, dated Oct. 22, 2014, for International Application No. PCT/US2014/042879, 3 pages.
International Search Report, dated Sep. 5, 2015, for International Application No. PCT/EP2016/000648, 3 pages (English translation).
Nourish Technology, "Teaching robots how to cook," downloaded from https://angel.co/nourish-technology on Jul. 12, 2017, 6 pages.
Written Opinion of the International Searching Authority, dated Sep. 5, 2016, for International Application No. PCT/EP20161000648, 11 pages (with English translation).
Written Opinion, dated Oct. 22, 2014, for International Application No. PCT/US2014/042879, 8 pages.
"EKIM, "Robots at the service of taste: EKIM launches the restoration of the future with the first robot cook!"", downloaded from https://ekim.fr/ on Jun. 29, 2018, 11 pages.
Becker, et al., "A System and Process for Managing Preparation and Packaging of Food and/or Beverage Products for a Precise Delivery Time," U.S. Appl. No. 15/217,314, filed Jul. 22, 2016, 75 pages.
Garden, "Methods of Preparing Food Products," Response Under 37 CFR 1.116, filed Mar. 23, 2018, for U.S. Appl. No. 15/040,866, 14 pages.
Garden, "System and Methods of Preparing Food Products," Notice of Allowance, dated Jan. 7, 2016, for U.S. Appl. No. 13/920,998, 9 pages.
Garden, "Systems and Methods of Preparing Food Products," Advisory Action dated Aug. 27, 2015 for U.S. Appl. No. 13/920,998, 3 pages.
Garden, "Systems and Methods of Preparing Food Products," Advisory Action dated Jul. 29, 2015 for U.S. Appl. No. 13/920,998, 3 pages.
Garden, "Systems and Methods of Preparing Food Products," Amendment filed Apr. 2, 2015 for U.S. Appl. No. 13/920,998, 23 pages.
Garden, "Systems and Methods of Preparing Food Products," Amendment filed Aug. 10, 2015 for U.S. Appl. No. 13/920,998, 29 pages.
Garden, "Systems and Methods of Preparing Food Products," Amendment filed Jul. 22, 2015 for U.S. Appl. No. 13/920,998, 29 pages.
Garden, "Systems and Methods of Preparing Food Products," Amendment filed Sep. 25, 2015 for U.S. Appl. No. 13/920,998, 29 pages.
Garden, "Systems and Methods of Preparing Food Products," Office Action dated Mar. 16, 2015 for U.S. Appl. No. 13/920,998, 28 pages.
Garden, "Systems and Methods of Preparing Food Products," Office Action dated May 27, 2015 for U.S. Appl. No. 13/920,998, 31 pages.

(56) References Cited

OTHER PUBLICATIONS

Garden, "Systems and Methods of Preparing Food Products," Response to Restriction Requirement, filed Oct. 24, 2014, for U.S. Appl. No. 13/920,998, 3 pages.

Garden, "Systems and Methods of Preparing Food Products," Restriction Requirement, dated Sep. 10, 2014, for U.S. Appl. No. 13/920,998, 5 pages.

Joussellin, Sophie, "Pizza: the pizza-machine robots go to the stove", published online Jun. 3, 2018, downloaded from http://www.rtl.fr/actu/futur/pizza-les-robots-pizzaiolos-se-mettent-au-fourneau-7793604225 on Jun. 7, 2018; 8 pages (with machine generated English translation).

Lamb, Catherine, "Scoop: Little Caesars Has a Patent for a Pizza-Making Robot", Mar. 13, 2018, downloaded from https://thespoon.tech/scoop-little-caesars-has-a-patent-for-a-pizza-making-robot/ on Mar. 14, 2018, 3 pages.

Ohr, Thomas, "French food tech startup EKIM raises €2.2 million to start the food "robolution"", published online May 22, 2018, downloaded from http://www.eu-startups.com/2018/05/french-food-tech-startup-ekim-raises-e2-2-million-to-start-the-food-robolution/ on Jun. 7, 2018; 2 pages.

Pershan, Caleb, "Grocery Delivery Startup Tests A.I. to Outsmart Food Waste (and Amazon)", downloaded from https://sf.eater.com/2018/3/19/16427328/farmstead-sf-grocery-delivery-startup-amazon on Mar. 26, 2018, 3 pages.

Shaw, Keith, "Robot Investments Weekly: Pizza Robots, Picking Platform Get Pieces of Funding Pie", published online May 25, 2018, https://www.roboticsbusinessreview.com/financial/robot-investments-weekly-pizza-robots-earn-slice-of-funding-pic/?utm_source=newsletter&utm_medium=email&utm_campaign=weekly_roundup&eid=399365852&bid=2127951 on Jun. 7, 2018.

Veebie, "Delicious Food. Zero Wait," downloaded from http://www.veebie.me/ on Oct. 20, 2017, 8 pages.

PCT/US2018/040730 International Search Report and Written Opinion, dated Nov. 14, 2018, 22 pages.

EP 18192070.3 Extended European Search Report, dated Dec. 13, 2018, 8 pages.

PCT/US2018/040785 International Search Report and Written Opinion in, dated Nov. 19, 2018, 22 pages.

https://www.kiwibot.com/ Mar. 2017.

U.S. Appl. No. 16/094,441, filed Oct. 17, 2018, Multi-Modal Distribution Systems and Methods Using Vending Kiosks and Autonomous Delivery Vehicles.

U.S. Appl. No. 16/163,317, filed Oct. 17, 2018, Multi-Modal Distribution Systems and Methods Using Vending Kiosks and Autonomous Delivery Vehicles.

U.S. Appl. No. 16/163,323, filed Oct. 17, 2018, Multi-Modal Distribution Systems and Methods Using Vending Kiosks and Autonomous Delivery Vehicles.

U.S. Appl. No. 16/163,328, filed Oct. 17, 2018, Multi-Modal Distribution Systems and Methods Using Vending Kiosks and Autonomous Delivery Vehicles.

\* cited by examiner

MULTI-MODAL DISTRIBUTION SYSTEMS AND METHODS USING VENDING KIOSKS AND AUTONOMOUS DELIVERY VEHICLES

TECHNICAL FIELD

This description generally relates to vending and delivery of items, such as food items, in particular using one or more of vending kiosks and autonomous delivery vehicles.

DESCRIPTION OF THE RELATED ART

Historically, consumers have had a choice when hot, prepared, food was desired. Some consumers would travel to a restaurant or other food establishment where such food would be prepared and consumed on the premises. Other consumers would travel to the restaurant or other food establishment, purchase hot, prepared, food and transport the food to an off-premises location, such as a home or picnic location for consumption. Yet other consumers ordered delivery of hot, prepared food, for consumption at home. Over time, the availability of delivery of hot, prepared, foods has increased and now plays a significant role in the marketplace. Delivery of such hot, prepared, foods was once considered the near exclusive purview of Chinese take-out and pizza parlors. However, today even convenience stores and "fast-food" purveyors such as franchised hamburger restaurants have taken to testing the delivery marketplace. The delivery of food items to individual consumers can represent one of the biggest costs of a food establishment.

BRIEF SUMMARY

A vending kiosk may be summarized as including: a plurality of compartments, each of the compartments having a respective interior and a respective opening via which items are retrievable or dispensable from the interior to an exterior of the vending kiosk, the interiors of the compartments delineated from one another; a plurality of doors, the doors respectively moveable between a closed configuration in which the door prevents access to the interior of at least one of the compartments and an open configuration in which the door provides access to the interior of at least one of the compartments; a plurality of actuators responsive to at least one actuator control signal to lock the doors in the closed configuration and selectively unlock one or more of the doors to move to the open configuration; and at least one processor communicatively coupled to the actuators to provide the at least one actuator control signal to unlock one or more of the doors in response to at least one of: a purchase transaction occurring at or proximate the kiosk or a receipt of information that indicates a presence of a device or a person proximate the kiosk the device or person logically associated with a previous purchase transaction.

At least one of the plurality of actuators may be comprised of at least one of a solenoid, a piston and associated cylinder, a pair of magnets including at least one electromagnet, and a pair of an electromagnet and a ferrous metal. The device or the person proximate the vending kiosk may be within 4 inches of the vending kiosk. The device or the person proximate the vending kiosk may be within 9 feet of the vending kiosk.

The vending kiosk may further include a plurality of heaters positioned to heat the interiors of the compartments. At least one of the plurality of heaters may be comprised of at least one of an electrically resistive heating element, a natural gas burner, a propane burner, and an inductive heating element. The plurality of heaters may include at least one electrically resistive heating element per compartment. The plurality of heaters may each be operable to raise a temperature in at least one of the compartments to at least 325° F. to cook an item of food stored in the compartment. The plurality of heaters may each be operable to raise a temperature in at least one of the compartments to between 140° F. and 250° F. to warm an already cooked item of food stored in the compartment.

The vending kiosk may further include a plurality of coolers positioned to cool the interiors of the compartments. At least one of the plurality of coolers may be comprised of at least one of a refrigerant carrying coil and associated compressor, a Peltier cooler, and a thermoelectric cooler. The plurality of coolers may include at least one refrigerant carrying coil per compartment.

The vending kiosk may further include thermal insulation positioned to thermally insulate the compartments from one another.

The vending kiosk may further include at least one card reader that reads information encoded in a financial transaction card, the at least one card reader communicatively coupled to the at least one processor to authorize a purchase transaction based on the information read from the financial transaction card.

The vending kiosk may further include: at least one antenna, and at least one radio communicatively coupled to the antenna, wherein the at least one processor includes a near field communications processor communicatively coupled to the radio to receive near field communications signals via the antenna and authorize a purchase transaction based on information encoded in the received near field communications signals.

The vending kiosk may further include: at least one antenna, and at least one radio communicatively coupled to the antenna, wherein the at least one processor may include a near field communications processor communicatively coupled to the radio to receive near field communications signals via the antenna and confirm that the device or the person logically associated with the previous purchase transaction is proximate the kiosk via the near field communications signals.

The vending kiosk may further include at least one user input device comprising a keypad card that allows entry of a key code, the user input device communicatively coupled to the at least one processor which confirms that an entered key code matches a key code for the previous purchase transaction.

The actuators may be part of a latch mechanism that locks and unlock the doors. The doors may be manually moveable from the closed configuration to the open configuration when unlocked. The actuators may be coupled to physically move the doors to the closed configuration. The actuators may be coupled to physically move the doors to the open configuration. The actuators may fail to the closed configuration. The actuators may fail to a locked state in which the doors are locked in the closed configuration.

The vending kiosk may further include a plurality of springs that bias the doors toward the closed configuration.

The vending kiosk may further include a plurality of springs that bias the doors toward the open configuration.

The vending kiosk may further include a plurality of magnets that bias the doors toward the closed configuration.

At least one of the plurality of magnets may be a permanent magnet. At least one of the plurality of magnets may be an electromagnet.

The vending kiosk may further include a plurality of magnets that bias the doors toward the open configuration.

At least one of the plurality of magnets may be a permanent magnet. At least one of the plurality of magnets may be an electromagnet. The vending kiosk may be a self-propelled vehicle, and may further include: at least one of a set of wheels or a set of treads; and at least one motor coupled to drive the set of wheels and the set of treads to propel the kiosk in an autonomous or semi-autonomous vehicle mode.

The vending kiosk may further include: a low pressure source having a pressure less than an atmospheric pressure of an external ambient environment; a plenum proximate a bottom of the vending kiosk, the plenum in fluid communication with the low pressure source; and a debris collection compartment, in communication with the plenum to collect debris pick-up via a suction effect at the plenum.

The vending kiosk may further include: at least one brush positioned to contact a surface on which the vending kiosk is supported; and at least one motor coupled to move the brush to sweep debris on the surface of ground.

A vending kiosk may be summarized as including: a plurality of compartments, each of the compartments having a respective interior and a respective opening via which items are retrievable or dispensable from the interior to an exterior of the vending kiosk, the interiors of the compartments delineated and thermally insulated from one another; a plurality of doors, the doors respectively moveable between a closed configuration in which the door prevents access to the interior of at least one of the compartments and an open configuration in which the door provides access to the interior of at least one of the compartments; a plurality of actuators responsive to at least one actuator control signal to lock the doors in the closed configuration and selectively unlock one or more of the doors to move to the open configuration; a plurality of heaters positioned to heat the interiors of the compartments; a plurality of coolers positioned to cool the interiors of the compartments; and at least one processor communicatively coupled to provide control signals to control the heaters, the coolers and the actuators.

At least one of the plurality of actuators may be comprised of at least one of a solenoid, a piston and associated cylinder, a pair of magnets including at least one electromagnet, and a pair of an electromagnet and a ferrous metal. At least one of the plurality of heaters may be comprised of at least one of an electrically resistive heating element, a natural gas burner, a propane burner, and an inductive heating element. At least one of the plurality of coolers may be comprised of at least one of a refrigerant carrying coil and associated compressor, a Peltier cooler, and a thermoelectric cooler. The plurality of heaters may include at least one electrically resistive heating element per compartment. The plurality of heaters may each be operable to raise a temperature in at least one of the compartments to at least 325° F. to cook an item of food stored in the compartment. The plurality of heaters may each be operable to raise a temperature in at least one of the compartments to between 140° F. and 250° F. to warm an already cooked item of food stored in the compartment. The plurality of coolers may include at least one cooler per compartment. The plurality of coolers may include at least one refrigerant carrying coil per compartment. The plurality of coolers may each be operable to lower a temperature in at least one of the compartments to at or below 41° F. to cool an item of food stored in the compartment. The plurality of compartments may each be operable to selectively transition between a refrigeration state in which the plurality of coolers are operable to lower a temperature in at least one compartment to at or below 41° F. and a heated state in which the plurality of heaters are each operable to raise a temperature in the at least one compartment to at least 140° F. The heated state may include a cooking state in which the at least one compartment is heated to at least 325° F. to cook an item of food and a warming state in which the at least one compartment is heated to between 140° F. and 250° F. to warm an item of food. The at least one compartment may transition from the cooking state to one of the refrigeration state and the warming state responsive to cooking of a food item. The at least one compartment may selectively, operably transition between the refrigeration state, the warming state, and the cooking state. The at least one compartment may transition between a plurality of the refrigeration state, the warming state, and the cooking state based at least in part upon a temperature control schedule. The temperature control schedule for the at least one compartment may be based at least in part upon an estimated pick-up time for the food item being dispensed from the at least one compartment. The temperature control schedule may be updateable based at least in part on a change in the estimated pick-up time.

The vending kiosk may further include at least one card reader that reads information encoded in a financial transaction card, the at least one card reader communicatively coupled to the at least one processor to authorize a purchase transaction based on the information read from the financial transaction card.

The vending kiosk may further include: at least one antenna, and at least one radio communicatively coupled to the antenna, wherein the at least one processor may include a near field communications processor communicatively coupled to the radio to receive near field communications signals via the antenna and authorize a purchase transaction based on information encoded in the received near field communications signals.

The vending kiosk may further include: at least one antenna, and at least one radio communicatively coupled to the antenna, wherein the at least one processor may include a near field communications processor communicatively coupled to the radio to receive near field communications signals via the antenna and confirm that the device or the person logically associated with the previous purchase transaction is proximate the kiosk via the near field communications signals.

The vending kiosk may further include at least one user input device comprising a keypad that allows entry of a key code, the user input device communicatively coupled to the at least one processor which confirms that an entered key code matches a key code for the previous purchase transaction.

The actuators may be part of a latch mechanism that locks and unlock the doors. The doors may be manually moveable from the closed configuration to the open configuration when unlocked. The actuators may be coupled to physically move the doors to the closed configuration. The actuators may be coupled to physically move the doors to the open configuration. The actuators may fail to the closed configuration. The actuators may fail to a locked state in which the doors are locked in the closed configuration.

The vending kiosk may further include a plurality of springs that bias the doors toward the closed configuration.

The vending kiosk may further include a plurality of springs that bias the doors toward the open configuration.

The vending kiosk may further include a plurality of magnets that bias the doors toward the closed configuration.

At least one of the plurality of magnets may be a permanent magnet. At least one of the plurality of magnets may be an electromagnet. The vending kiosk may further include a plurality of magnets that bias the doors toward the open configuration.

At least one of the plurality of magnets may be a permanent magnet. At least one of the plurality of magnets may be an electromagnet. The vending kiosk may be a self-propelled vehicle, and may further include: at least one of a set of wheels or a set of treads; and at least one motor coupled to drive the set of wheels and the set of treads to propel the kiosk in an autonomous or semi-autonomous vehicle mode.

The vending kiosk may further include: a low pressure source having a pressure less than an atmospheric pressure of an external ambient environment; a plenum proximate a bottom of the vending kiosk, the plenum in fluid communication with the low pressure source; and a debris collection compartment, in communication with the plenum to collect debris pick-up via a suction effect at the plenum.

The vending kiosk may further include: at least one brush positioned to contact a surface on which the vending kiosk is supported; and at least one motor coupled to move the brush to sweep debris on the surface of ground.

A vending kiosk may be summarized as including: a plurality of compartments, each of the compartments having a respective interior and a respective opening via which items are retrievable or dispensable from the interior to an exterior of the vending kiosk, the interiors of the compartments delineated and thermally insulated from one another; a plurality of doors, the doors respectively moveable between a closed configuration in which the door prevents access to the interior of at least one of the compartments and an open configuration in which the door provides access to the interior of at least one of the compartments; a plurality of actuators responsive to at least one actuator control signal to lock the doors in the closed configuration and selectively unlock one or more of the doors to move to the open configuration; at least one processor communicatively coupled to provide control signals to control the actuators; a low pressure source having a pressure less than an atmospheric pressure of an external ambient environment; a plenum proximate a bottom of the vending kiosk, the plenum in fluid communication with the low pressure source; and a debris collection compartment, in communication with the plenum to collect debris pick-up via a suction effect at the plenum.

At least one of the plurality of actuators may be comprised of at least one of a solenoid, a piston and associated cylinder, a pair of magnets including at least one electromagnet, and a pair of an electromagnet and a ferrous metal.

The vending kiosk may further include: at least one brush positioned to contact a surface on which the vending kiosk is supported; and at least one motor coupled to move the brush to sweep debris on the surface of ground.

The vending kiosk may further include a plurality of heaters positioned to heat the interiors of the compartments.

At least one of the plurality of heaters may be comprised of at least one of an electrically resistive heating element, a natural gas burner, a propane burner, and an inductive heating element.

The vending kiosk may further include a plurality of coolers positioned to cool the interiors of the compartments.

At least one of the plurality of coolers may be comprised of at least one of a refrigerant carrying coil and associated compressor, a Peltier cooler, and a thermoelectric cooler.

The vending kiosk may further include: at least one antenna, and at least one radio communicatively coupled to the antenna, wherein the at least one processor includes a near field communications processor communicatively coupled to the radio to receive near field communications signals via the antenna and authorize a purchase transaction based on information encoded in the received near field communications signals.

The vending kiosk may further include: at least one antenna, and at least one radio communicatively coupled to the antenna, wherein the at least one processor may include a near field communications processor communicatively coupled to the radio to receive near field communications signals via the antenna and confirm that the device or the person logically associated with the previous purchase transaction is proximate the kiosk via the near field communications signals.

The vending kiosk may further include at least one user input device comprising a keypad card that allows entry of a key code, the user input device communicatively coupled to the at least one processor which confirms that an entered key code matches a key code for the previous purchase transaction.

The vending kiosk may further include at least one card reader that reads information encoded in a financial transaction card, the at least one card reader communicatively coupled to the at least one processor to authorize a purchase transaction based on the information read from the financial transaction card.

The actuators may be part of a latch mechanism that locks and unlock the doors. The doors may be manually moveable from the closed configuration to the open configuration when unlocked. The actuators may be coupled to physically move the doors to the closed configuration. The actuators may be coupled to physically move the doors to the open configuration. The actuators may fail to the closed configuration. The actuators may fail to a locked state in which the doors are locked in the closed configuration. The vending kiosk may further include a plurality of springs that bias the doors toward the closed configuration.

The vending kiosk may further include a plurality of springs that bias the doors toward the open configuration.

The vending kiosk may further include a plurality of magnets that bias the doors toward the closed configuration.

At least one of the plurality of magnets may be a permanent magnet. At least one of the plurality of magnets may be an electromagnet.

The vending kiosk may further include a plurality of magnets that bias the doors toward the open configuration.

At least one of the plurality of magnets may be a permanent magnet. At least one of the plurality of magnets may be an electromagnet.

A locker system may be summarized as including: a plurality of compartments, each of the compartments having a respective interior and a respective opening via which items are retrievable or dispensable from the interior to an exterior of the vending kiosk, the interiors of the compartments delineated from one another; a plurality of doors, the doors respectively moveable between a closed configuration in which the door prevents access to the interior of at least one of the compartments and an open configuration in which the door provides access to the interior of at least one of the compartments; a plurality of actuators responsive to at least one actuator control signal to selectively uncouple two or more of the doors from each other to move independently from one another in an uncoupled configuration and to couple two or more of the doors together to move as one in a coupled configuration, and responsive to at least one actuator control signal to lock the doors in the closed configuration and selectively unlock one or more of the doors to move to the open configuration; and at least one processor communicatively coupled to the actuators to provides the at least one actuator control signal.

At least one of the plurality of actuators may be comprised of at least one of a solenoid, a piston and associated cylinder, a pair of magnets including at least one electromagnet, and a pair of an electromagnet and a ferrous metal. The plurality of actuators may include: a first set of the actuators which are responsive to at least one actuator control signal to selectively uncouple two or more of the doors from each other to move independently from one another in an uncoupled configuration and to couple two or more of the doors together to move as one in a coupled configuration; and a second set of the actuators which are responsive to at least one actuator control signal to lock the doors in the closed configuration and selectively unlock one or more of the doors to move to the open configuration. The actuators of the second set may not be in the first set and the actuators of the first set may not be in the second set. The plurality of actuators may include a third set of the actuators which are responsive to at least one actuator control signal to selectively hinge one or more of the doors to pivot about a first axis, and to alternatively selectively hinge the one or more doors to pivot about a second axis, the second axis opposed across a dimension of the door from the first axis. The actuators of the first set of actuators may cause one or more doors to pivot about a right side axis on a right edge of the one or more doors in a first configuration and may cause one or more doors to pivot about a left side axis on a left edge of the one or more doors in a second configuration. The actuators of the first set of actuators may cause one or more doors to pivot about a top axis on a top edge of the one or more doors in a first configuration and may cause one or more doors to pivot about a bottom axis on a bottom edge of the one or more doors in a second configuration. The at least one processor may determine an end user physical trait and may select the first or the second configurations based on the determined end user physical trait. The at least one processor may determine the end user physical trait from a set of stored user specific information. The at least one processor may determine the end user physical trait from at least one image of an end user who is proximate the locker system.

A self-propelled delivery robot may be summarized as including: a propulsion subsystem including at least one motor coupled to move the self-propelled delivery robot through an environment; a first thermally insulated compartment having a first interior, the first interior sized and dimensioned to contain a first food item; a second thermally insulated compartment having a second interior, the second interior sized and dimensioned to contain a second food item; and a control subsystem comprising: a processor; and a computer readable memory, the computer readable memory including processor-readable instructions that when executed by the processor, cause the processor to: receive location information related to a destination; and transmit at least one instruction to the at least one motor, the at least one instruction which causes the at least one motor to move the self-propelled delivery robot along a route.

The self-propelled delivery robot may further include a container, the container which surrounds the first thermally insulated compartment and the second thermally insulated compartment.

The self-propelled delivery robot may further include a transfer assembly, the transfer assembly which selectively, operably transfers selected food items between the first thermally insulated compartment and the second thermally insulated compartment.

The transfer assembly may be comprised of a robotic arm, the robotic arm which is positionable relative to the first thermally insulated compartment and the second thermally insulated compartment to transfer food items there between. The first thermally insulated compartment may include a heater positioned to heat the first interior of the first thermally insulated compartment. The heater may include at least one electrically resistive heating element. The heater may be operable to raise a temperature in the first interior to between 140° F. and 250° F. to warm an already cooked item of food stored in the first thermally insulated compartment. The second thermally insulated compartment may include a cooler positioned to cool the second interior of the second thermally insulated compartment. The cooler may include a refrigerant carrying coil.

The self-propelled delivery robot may further include a set of doors including a first door associated with the first thermally insulated compartment and a second door associate with the second thermally insulated compartment, wherein each door may be respectively moveable between a closed configuration in which the door prevents access to the interior of the associated thermally insulated compartment and an open configuration in which the door provides access to the interior of the associated thermally insulated compartment.

The first door may include a first selectively lockable door that provides access to at least the first thermally insulated sub-compartment, and the second door may include a second selectively lockable door that provides access to at least the second thermally insulated sub-compartment. The first selectively lockable door may selectively unlock responsive to a signal received from a controller network located remotely from the self-propelled delivery robot, and wherein the second lockable door may selectively unlock responsive to a signal received from a controller network located remotely from the self-propelled delivery robot.

The self-propelled delivery robot may further include: at least one antenna, and at least one radio communicatively coupled to the antenna, wherein the at least one processor may include a near field communications processor communicatively coupled to the radio to receive near field communications signals via the antenna, at least one of the first selectively lockable door and the second selectively lockable door which selectively unlocks responsive to a near field communication signal received via the antenna, the near field communication signal which confirms that a device or a person logically associated with the food item in the respective first thermally insulated compartment or the second thermally insulated compartment is proximate the self-propelled delivery robot.

The self-propelled delivery robot may further include a biometric input subsystem that generates a signal based upon one or more biometric feature of a person, wherein one of the first selectively lockable door and the second selectively lockable door may selectively unlock responsive to signal generated from the biometric input scanner.

The self-propelled delivery robot may be one in which the propulsion subsystem includes at least one of a set of wheels or a set of treads.

The self-propelled delivery robot may be one in which the propulsion subsystem includes one or more rotors.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
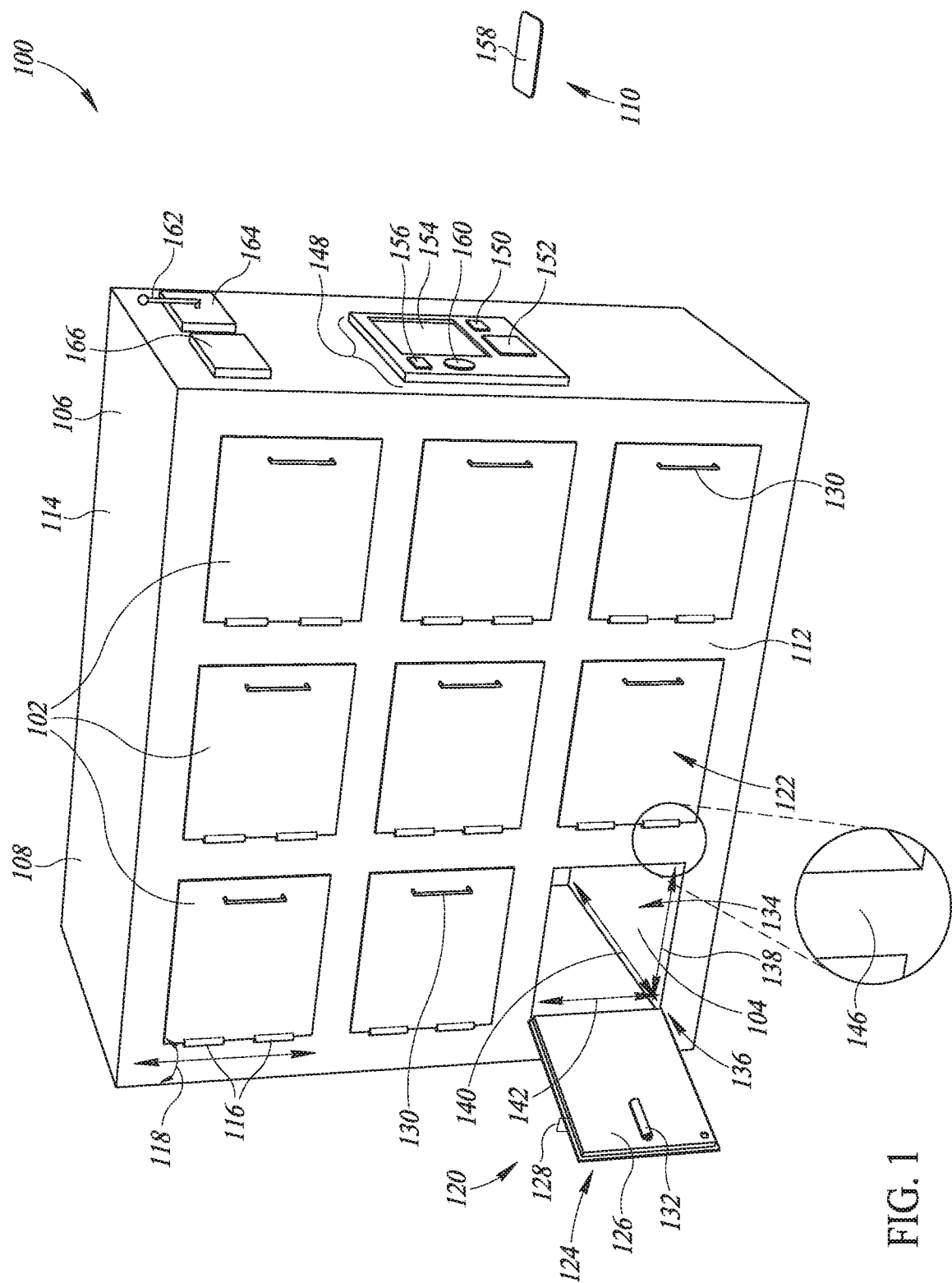
FIG. 1 is a front, top, right isometric view of a vending kiosk that includes a plurality of doors that each provides access to at least one compartment, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with food preparation devices or appliances such as ovens, skillets, stoves with burners, inductive heaters, micro-wave ovens, rice cookers, and, or sous vide cookers, and other similar devices, closed-loop controllers used to control cooking conditions, food preparation techniques, wired and wireless communications protocols, wired and wireless transceivers, radios, communications ports, geolocation, and optimized route mapping algorithms have not been shown or described in detail to avoid unnecessarily obscuring descriptions of the embodiments. In other instances, certain structures associated with conveyors, robots, and/or vehicles have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein the terms "food item" and "food product" refer to any item or product intended for human consumption. Although illustrated and described herein in the context of pizza to provide a readily comprehensible and easily understood description of one illustrative embodiment, one of ordinary skill in the culinary arts and food preparation will readily appreciate the broad applicability of the systems, methods, and apparatuses described herein across any number of prepared food items or products, including cooked and uncooked food items or products, and ingredients or components of food items and products.

As used herein the terms "robot" or "robotic" may refer to any device, system, or combination of systems and devices that includes at least one appendage, typically with an end of arm tool or end effector, where the at least one appendage is selectively moveable to perform work or an operation useful in the preparation a food item or packaging of a food item or food product. The robot may be autonomously controlled, for instance based at least in part on information from one or more sensors (e.g., optical sensors used with machine-vision algorithms, position encoders, temperature sensors, moisture or humidity sensors). Alternatively, one or more robots can be remotely controlled by a human operator. Alternatively, one or more robots can be partially remotely controlled by a human operator and partially autonomously controlled. As used herein, the terms "robot" or "robotic" may refer to any autonomous and/or semi-autonomous machine which is capable of carrying out defined physical action, for instance a machine with at least one jointed appendage that is movable with respect to an operational environment, or any autonomous and/or semi-autonomous vehicles that is movable with respect to an operational environment.

As used herein the term "food preparation unit" refers to any device, system, or combination of systems and devices useful in preparing, cooking or heating a food product, such as, for example, cooking units. While such preparation may include the heating of food products during preparation, such preparation may also include the partial or complete cooking of one or more food products. Additionally, while the term "oven" may be used interchangeably with the term "cooking unit" herein, such usage should not limit the applicability of the systems and methods described herein to only foods which can be prepared in an oven. For example, one or more burners, either gas or electric or inductive, a hot skillet surface or griddle, a deep fryer, a microwave oven, rice cooker, sous vide cooker, and/or toaster can be considered a "cooking unit" that is included within the scope of the systems, methods, and apparatuses described herein. Food preparation units may include other types of equipment used to prepare food items, such as equipment related to cooled or chilled foods, such as may be used to prepare smoothies, frozen yogurt, ice cream, and beverages (e.g., fountain beverages). Further, the food preparation unit may be able to control more than temperature. For example, some food preparation units may control pressure and/or humidity. Further, some food preparation units may control airflow therein, thus able to operate in a convective cooking mode if desired, for instance to decrease cooking time.

As used herein the term "vehicle" refers to any car, truck, van, or other vehicle, including any autonomous and/or semi-autonomous vehicle, useful in cooking and heating a food item for distribution to a customer. The size and shape of the vehicle may depend in part on licensing requirements of the locality in which the vehicle is intended to operate. In some instances, the size and shape of the vehicle may depend on the street layout and the surrounding environment of the locality in which the vehicle is intended to operate. For example, small, tight city streets may require a vehicle that is comparatively shorter and/or narrower than a vehicle that can safely and conveniently navigate larger, suburban thoroughfares. Such vehicles may include drones, including land-based, flying, water-borne (by surface or submersible), and/or amphibious drones.

FIG. 1 shows a vending kiosk 100 according to at least one illustrated implementation. The vending kiosk 100 includes a housing, frame or outer shell 106 that is divided into a plurality of compartments 104 (only one visible in FIG. 1), each of the compartments having a respective opening 136, the vending kiosk 100 having a plurality doors 102 (only three called out in FIG. 1) that selectively provide access to interiors 134 (only one visible in FIG. 1) of the compartments 104 from an exterior 110 of the vending kiosk 100 via the openings 136.

The housing, frame or outer shell 106 of the vending kiosk 100 may include one or more exterior surfaces 108 that at least partially surrounds the compartments 104. In some implementations the exterior surface(s) 108 separate the plurality of compartments 104 from the exterior 110 of the vending kiosk 100. In some implementations, the housing, frame or outer shell 106 may include one or more customer facing or "front" walls or faces 112 to which one or more of the plurality of doors 102 are rotatably coupled. While illustrated with one customer facing or "front" wall or face, some implementations may include customer facing or "front" walls or faces with respective arrays of doors on two, more or all sides or faces of the vending kiosk 100. Further, while illustrated as substantially rectangular, the vending kiosk 100 can have other shapes, for instance a pentagonal, hexagonal, or octagonal top plan view profile, with doors distributed across one, more or all vertically extending sides or faces of the vending kiosk. Even further, some implementations the vending kiosk 100 may include customer facing or "front" walls or faces with respective arrays of doors on a top or upper face of the vending kiosk, similar in some respect to "deep" or "chest" freezers.

In some implementations, for example, all of the plurality of doors 102 may be rotatably coupled to the same customer facing wall or face 112 or to a plurality of customer facing walls or faces 112 or a frame which forms a portion of the walls or to which the walls are coupled or attached. In some implementations, a subset of the plurality of doors 102 may be rotatably coupled to a first customer facing wall or face 112, whereas the remaining plurality of doors 102 are rotatably coupled to a second customer facing wall or face 112 of the same vending kiosk. In some implementations, for example, the plurality of doors 102 may be rotatably coupled to two or more customer facing walls or faces 112 to increase the space at which customers may retrieve orders, and thereby improve the comfort and safety of the customers. In some implementations, some or all of the plurality of doors 102 may be rotatably coupled to another portion of the outer shell 106, such as, for example, along an upper surface 114. Locating some or all of the doors 102 along the upper surface 114 may be useful, for example, in a "deep" or "chest" freezer implementation in which customers may reach down into the compartments 104 to retrieve items.

To be clear, the doors 102 can be attached or coupled to a frame or skeleton of the vending kiosk 100. The frame or skeleton may form a portion of one or more walls, for example the customer facing walls or faces 112, and, or other walls (e.g., side walls without doors). For example, in some implementations, the vending kiosk 100 includes a frame or skeleton formed from a set of structural members, for instance trusses, I-beams, angle iron or angle steel. The vending kiosk 100 may include a number of skin or wall panels, coupled to the structural members. For instance, the vending kiosk 100 may include a floor or base skin or wall panel, a ceiling or top skin or wall panel, one or more side skin or wall panels, one or more customer facing panels (e.g., customer facing front skin or wall panel). Notably, doors 102 can be positioned on more than one side or face of the vending kiosk 100, for instance in a "front" skin or wall panel and a "back" skin or wall panel, or in three skin or wall panels, or even four or more skin or wall panels (e.g., hexagonal footprint, octagonal footprint). Doors can even be positioned in the ceiling or top skin or wall panel. The skin or wall panels can, for example, comprise respective sheets of material, e.g., steel, aluminum, sheet metal, plastic, which are fastened (e.g., riveted, welded, screwed) to the frame or skeleton. One or more sides or faces of the vending kiosk 100 include a set of openings and doors 102 that allow customers to access the compartments 104. The sides, faces, or skin or wall panels which include the doors 102 are customer facing walls, faces or sides. Those doors 102 can, for example, be pivotally coupled to either the frame or skeleton, or to the skin or wall panels, for example via one or more hinges, and, or via one or more magnetic couplers (e.g., permanent magnets, electromagnets, ferrous metals).

Each of the doors 102 may be rotatably coupled to the housing, frame or outer shell 106 of the vending kiosk 100 via one or more hinges 116. Such hinges 116 may be attached along, or proximate to, a portion of the housing, frame or outer shell 106. The hinges 116 provide an axis of rotation 118 that extends in a substantially vertical direction and is parallel to the corresponding customer facing wall or face 112 in which the door is located. Alternatively or additionally, the hinges 116 provide an axis of rotation 118 that extends in a substantially horizontal direction and is parallel to the corresponding customer facing wall 112 or face in which the door is located. The door 102 may rotate between an open configuration 120 in which the door 102 provides access to one or more of the compartments 104 in the vending kiosk 100, and a closed configuration 122 in which the door prevents access to one or more of the compartments 104. In some implementations, the doors 102 or the hinges 116 that rotatably couple the door 102 to the housing, frame or outer shell 106 may be biased to maintain the door 102 in one of the open configuration 120 or the closed configuration 122. In such an implementation, for example, one or more of the hinges 116 may be a torsional hinge that may exert a rotational force on the associated door 102 in an inward or an outward direction. Additionally or alternatively, one or more springs or magnets and/or pieces of ferrous metals may be positioned to bias the doors 102 into the open or the closed configurations.

Each door 102 may include an exterior surface 124 and an interior surface 126 that are separated by a width of a door edge 128. In some implementations, the door 102 or a portion thereof may be comprised of a thermally insulative material that may be used to reduce a transfer of heat between the interior 134 of the compartment 104 and the exterior 110 of the vending kiosk 100 or reduce a transfer of heat between the interior 134 of one compartment 104 and the interior 134 of other neighboring compartments 104, and thereby assist in maintaining a desired temperature within the compartment 104. Some implementations may include one or more gaskets comprised of rubber or some other compressible elastomer positioned to sealingly engage between the door and a portion of the housing, frame or outer shell 106 when the door 102 is in the closed configuration 122, to provide additional thermal insulation for the compartment 104. For example, a respective silicone gasket can be attached to the housing, frame or outer shell surrounding an opening 136 of each compartment. Alternatively, or additionally, a respective silicone gasket can be attached to the door for each compartment.

Each door 102 may include one or more handles 130 that may be used to facilitate the opening or closing of each respective door 102. In some implementations, each door 102 may include one or more actuators 132 that may be used to selectively lock the door 102 in the closed configuration 122 and to selectively unlock the door 102 such that the door may move from the closed configuration 122 to the open configuration 120, thereby providing access to at least one of the compartments 104. Such an actuator 132 may include, for example, one or more of a solenoid, a piston and associated cylinder, a plurality of magnets, including at least one of which is an electromagnet, and/or an electromagnet paired with a ferrous metal. In some implementations, the actuator 132 may be responsive to one or more actuator control signals transmitted from one or more processors, as discussed below, to lock and/or unlock the associated door 102. In some implementations, for example, the actuator 132 may receive a signal to unlock the associated door 102 based upon one or more of a purchase transaction occurring proximate the vending kiosk 100 and/or receipt of information indicating the presence of a person or object proximate the vending kiosk 100 in which the person or object is logically associated with a previous purchase transaction. In some implementations, the door 102 may be manually moveable between the open configuration 120 and the closed configuration 122 when the door is unlocked. In some implementations, the actuator 132 and/or a different actuator may be used to move the door 102 from an open configuration to a closed configuration, from a closed configuration to an open configuration, or between an open configuration and a closed configuration.

Consequently, i) an actuator can control a latch or lock; ii) the same actuator that controls a latch or lock can move the door from the closed configuration to the open configuration, iii) a separate actuator from the actuator that controls a latch or lock can move the door from the closed configuration to the open configuration; iv) the same actuator that controls a latch or lock can move the door from the open configuration to the closed configuration; v) a separate actuator from the actuator that controls a latch or lock can move the door from the open configuration to the closed configuration; vi) the same or a separate actuator can move the door from the open to closed configuration; vi) the same actuator that moves the door from the open configuration to the closed configuration may also move the door from the closed configuration to the open configuration; vii) the different actuator from the one that moves the door from the open configuration to the closed configuration may move the door from the closed configuration to the open configuration.

As noted above, the compartments 104 may include interiors 134 that may be accessible via one or more openings 136. The openings 136 may be used to place items into or retrieve items from the associated compartment 104. In some implementations, each of the compartments 104 in the vending kiosk 100 may be aligned with a respective door 102 in the plurality of doors 102. In such an implementation, moving each door 102 from the closed configuration 122 to the open configuration 120 may provide access to the associated compartment 104 that is aligned with each respective door 102. In some implementations, multiple doors 102 may be coupled together and opened to provide access to one compartment 104. Such an implementation may be used, for example, when one or more of the compartments 104 have been enlarged. The interior 134 of each compartment 104 may have dimensions that include a length 138, a depth 140, and a height 142 that may be delineated by an interior surface 144 of the compartment 104 along with the interior surface 126 of the door 102 when the door 102 is in the closed configuration 122. The dimensions of the interior 134 of the compartment 104 may be sized and shaped to hold one or more items, such as food items and/or food item containers, to be retrieved through the opening 136 associated with the compartment 104.

In some implementations, each door 102 may be aligned with a separate compartment 104. As such, the interiors 134 of each compartment 104 may be delineated from one another by the respective interior walls or surfaces 144 of each compartment 104. In some implementations, the respective interior walls or surfaces 144 of adjacent compartments 104 may include a thermal insulation 146, as shown in the partial cut-away in FIG. 1, such that each compartment 104 may be thermally insulated from each adjacent compartment 104. In some implementations, the thermal insulation 146 may extend from the interior surface 144 of one compartment 104 to the interior surface 144 of a second, adjacent compartment 104. In such an implementation, each respective compartment 104 may be maintained at a different temperature with little to no thermodynamic interaction between adjacent compartments 104. In some implementations, as discussed below, each individual compartment 104 may include one or more of a heating system and/or a cooling system that may be used to control the temperature within the interior 134 of the respective individual compartment 104.

In some implementations, the vending kiosk 100 may include a user input subsystem 148 and/or an on-board vending kiosk control system 166. The user input subsystem 148 may be used to collect information related to a vendable item, such as a food item, stored within one of the compartments 104 of the vending kiosk 100. In some implementations, for example, the user input subsystem 148 may include one or more of a magnetic stripe reader 150, a near field communications (NFC) reader, a currency acceptor and validator, a keypad 152, a touchscreen 154, an image capture device 156, and/or a biometric capture device 160. In some implementations, the magnetic stripe reader 150 may be used to read and collect information that has been encoded within a financial transaction card 158 using, for example, a magnetic stripe, a card chip, or some other type of storage medium. The magnetic stripe reader 150 may be communicatively coupled to one or more processors that may authorize a requested purchase transaction based upon information stored within and/or associated with the financial transaction card 158. Such one or more processors may be located locally at the vending kiosk 100 and/or remotely from the vending kiosk 100 at one or more processor-enabled devices that may be communicatively coupled to the vending kiosk 100 via a communications network.

The keypad 152 and/or touchscreen 154 may be used to enter information related to an item stored within one or more of the compartments 104. In such an implementation, for example, the keypad 152 and/or touchscreen 154 may be used to enter a key code that may associated with a previous purchase transaction and/or order to be retrieved from one of the compartments 104. In some implementations, the key code may include an order identifier that may be associated with a previous purchase transaction and may be comprised of a unique code that is associated with an order to be retrieved from the vending kiosk 100. In some implementations, the order identifier may be a randomly generated identifier that is not related to the order identifiers associated with other items being stored within the vending kiosk 100. Such a randomly generated identifier may be used, for example, to prevent orders from being stolen, and to reduce the possibility that an order entry that has been mis-entered will nonetheless open the door 102 to a compartment 104 associated with another order. In some implementations, the key code may additionally or alternatively include a customer identifier that may be associated with the customer who will be retrieving the order from the vending kiosk 100. In some implementations, the touchscreen 154 may be used to display information identifying the appropriate door 102 from which a consumer can retrieve an order from the vending kiosk 100.

The image capture device 156 may include, for example, a video camera or a still-image camera that may be used to capture images. In some implementations, such images may include, for example, machine-readable symbols that may be displayed within a field-of-vision of the image capture device 156. Such machine-readable symbols may include, for example, barcode symbols, and/or Quick Response code symbols. In such an implementation, the machine-readable symbols may be affixed to a physical object (e.g., printed on a piece of paper) and/or may be rendered on a changeable display. For example, in some implementations, the machine-readable symbol may be electronically transmitted to a portable device via, for example, an email and/or text to an address associated with the consumer, to be rendered on a display of the portable device within the field-of-vision of the image capture device 156. The image capture device 156 in such an implementation may transmit the captured image of the machine-readable symbol to a processor-enabled device to decode the information contained within the machine-readable symbol. In response, the processor-enabled device may transmit one or more signals that may result in the appropriate door 102 in the vending kiosk 100 being unlocked for the consumer.

The biometric capture device 160 and associated software may be used to identify consumers based upon one or more physical characteristics. The biometric capture device 160 and associated software may be used to identify consumers based upon, for example, one or more of fingerprints, facial features, eye feature, vocal characteristics, and/or any other unique physical characteristic of the consumer. In some implementations, such software may be implemented by one or more processor-enabled devices, including processor-enabled devices that may be communicatively coupled to the vending kiosk 100 via a communications network. Once the biometric capture device 160 and associated software has identified the consumer, the processor-enable device may transmit one or more signals that may result in the appropriate door 102 in the vending kiosk 100 being unlocked for the consumer.

The vending kiosk 100 may include an antenna 162 that may be communicatively coupled to a radio 164 in which the antenna 162 and radio 164 may be used to provide wireless communication capabilities for the vending kiosk 100. In some implementations, for example, the antenna 162 and radio 164 may be used to communicate using wireless communications protocols, such as protocols for wireless local area networks (e.g., WIFI®, IEEE 802.11, WiMAX, IEEE 802.116, VoIP, and the like) or protocols for wireless peer-to-peer communications (e.g., Bluetooth®, Bluetooth® Low Energy, and the like).

In some implementations, the antenna 162 and radio 164 may be used to wirelessly communicate with objects or devices that are proximate the vending kiosk 100. For example, in some implementations, the antenna 162 and radio 164 may be used to provide near field communication (NFC) capabilities and/or radio frequency identification (RFID) capabilities with device and objects proximate the vending kiosk 100. Such device may include wireless devices associated with consumers who have authorized purchase transaction, or may wish to authorize purchase transaction, for items contained with the vending kiosk 100. In such implementations, the wireless device of the consumer may be with four (4) inches of the antenna for the antenna to receive NFC signals and/or within nine (9) feet of the antenna for the antenna to receive RFID signals. Such NFC signals and/or RFID signals may be used to encode information to authorize a purchase transaction and/or to confirm that a person or device logically associated with a previous purchase transaction is proximate the vending kiosk 100. The antenna 162 may be communicatively coupled to a processor-enabled device that may decode the information contained with the NFC signal and/or RFID signal, and use the decoded information to provide such authorization and/or confirmation. Upon determining such authorization and/or confirmation, the processor-enabled device may transmit one or more actuator control signals to unlock the appropriate door 102 on the vending kiosk 100 so that the consumer may retrieve the purchased item from the associated compartment 104.

The on-board vending kiosk control system 166 may take the form of any current or future developed processor-enabled device capable of executing one or more instruction sets. The on-board vending kiosk control system 166 may include one or more processing units to execute one or more processor-readable instructions, instruction sets, or instruction blocks. The on-board vending kiosk control system 166 may include a system memory to store one or more processor-readable instructions, instruction sets, or instruction blocks to be executed by the processor. Such processor-readable instructions, instruction sets, or instruction blocks may be used to generate one or more control signals that may be used to control the various components of the vending kiosk 100, such as the actuators 132. In some implementations, the processor-readable instructions, instruction sets, or instruction blocks may control the operation of various subsystems or components on the vending kiosk, such as various components of the user input subsystem 148. In some implementations, the on-board vending kiosk control system 166 may be used to communicate using one or more using wireless communications protocols via the antenna 162 and radio 164. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 2A:
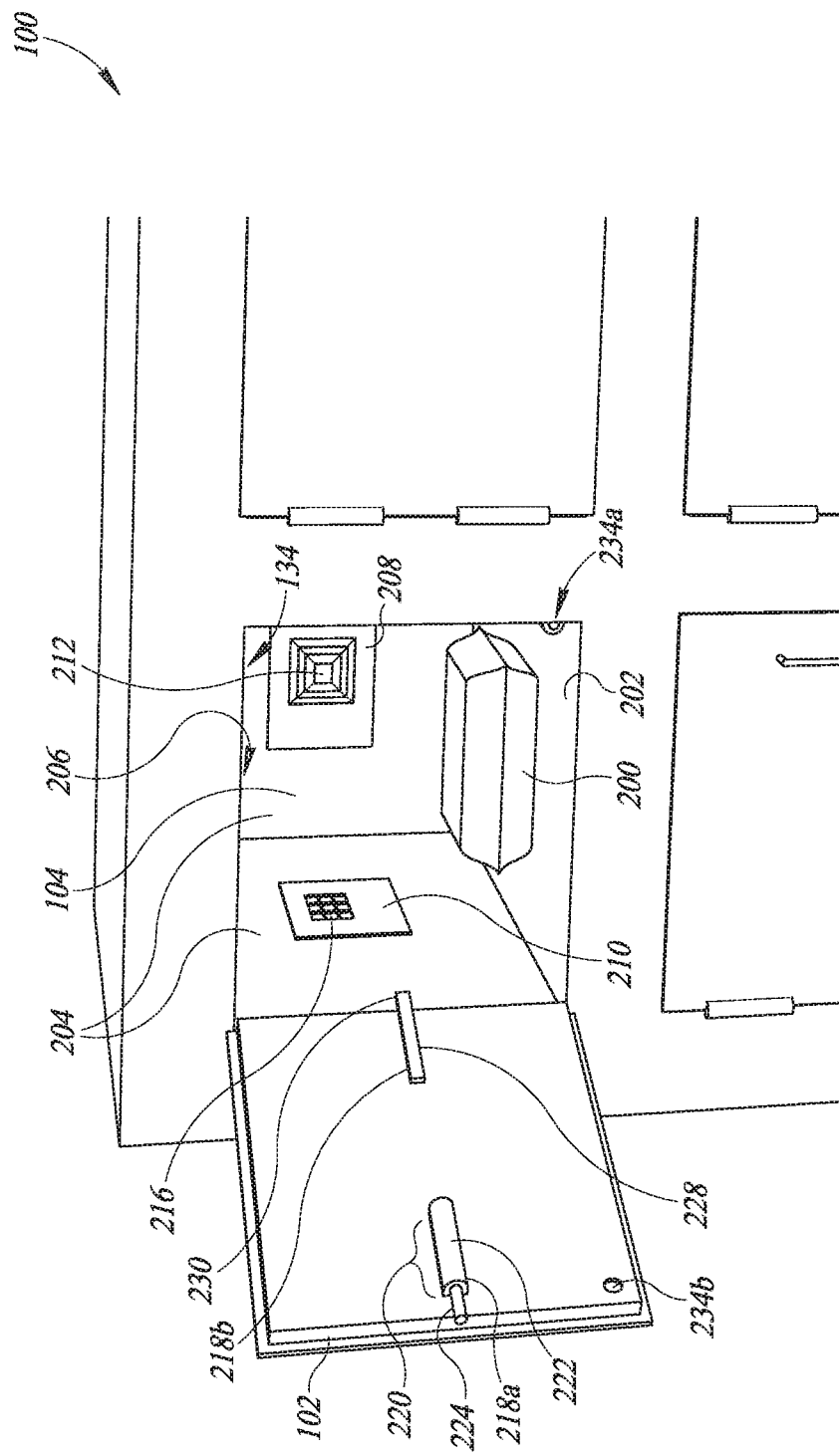
FIG. 2A is a front, top, right isometric view of an interior of a compartment in a vending kiosk, according to at least one illustrated implementation.
Figure 2B:
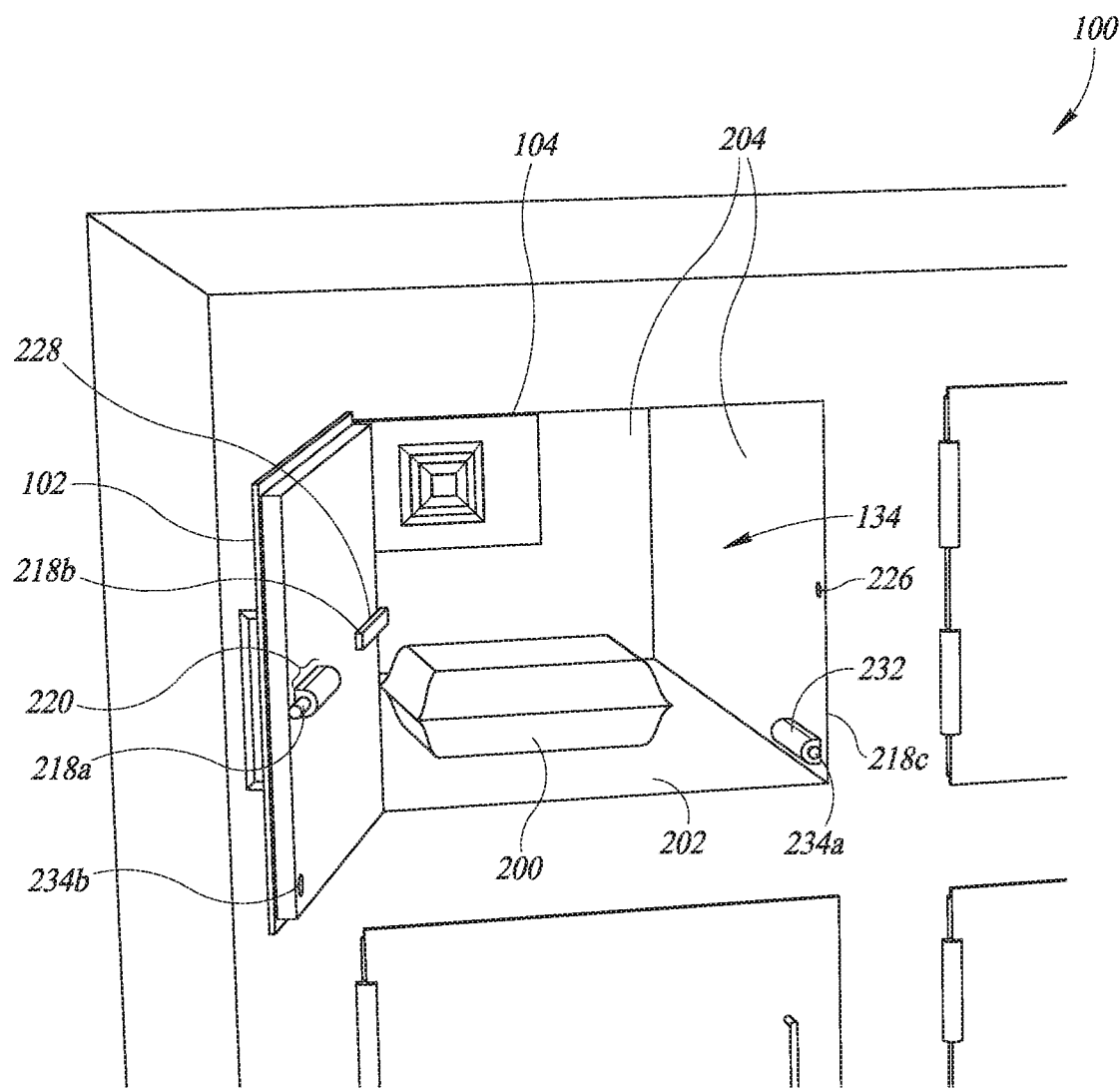
FIG. 2B is a front, top, left isometric view of the interior of the compartment in the vending kiosk shown in FIG. 2A, according to at least one illustrated implementation.

FIGS. 2A and 2B show different isometric views of the interior 134 of one compartment 104 in the vending kiosk 100, according to at least one illustrated implementation. A container 200, such as a container that may hold one or more food items, is supported in the compartment 104, for instance resting one a bottom surface 202 of the compartment 104. The interior 134 of the compartment 104 may include one or more side walls 204 and an upper surface 206. The bottom surface 202, the one or more side walls 204, and the upper surface 206 may comprise the interior surfaces 144 of the compartment 104.

The compartment 104 may include a heater 208 that may be used to increase the temperature of the interior 134 of the compartment 104 to a heated state. The heater 208 may include one or more of an electrically resistive heating element, a natural gas burner, a propane burner, and/or an inductive heating element. In some implementations, the heater 208 may be positioned, for example, along a side wall 204 that is opposite the opening 136 to the compartment 104. In such an implementation, the heater 208 may include a heater opening 212 through which heat may be introduced to the interior 134 of the compartment 104. Alternatively, one or more walls of the compartments may include thermally radiant elements (e.g., electrically resistive conduits carrying heated fluid). In some implementations, a fan may be used to direct heated air into the interior 134 of the compartment 104 through the heater opening 212 or to otherwise circulate heated air throughout the compartment 104.

In some implementations, each compartment 104 in the vending kiosk 100 may include a separate heater 208, such that the vending kiosk 100 includes a plurality of heaters 208. In such implementations, at least one of the plurality of heaters 208 may include an electrically resistive heating element. In some implementations, the heated state provided by the heater 208 may include a cooking state in which the heater 208 may raise the temperature in the compartment 104 to at least 325° F. to cook an item of food stored in the compartment. In some implementations, the heated state provided by the heater 208 may include a heating state in which the heater 208 may be operable to raise the temperature in the compartment 104 to between 140° F. and 250° F. to warm an already cooked item of food stored in the interior 134 of the compartment 104. In some implementations, the heater 208 may be operable transition between the cooking state and the warming state based upon one or more signals, such as signals that may be transmitted by a processor-enabled device. In such implementations, for example, the heater 208 may transition from the cooking state to the warming state in response to a food item being fully cooked, such that the fully cooked food item may be maintained at a warm, elevated temperature until the food item is retrieved.

In some implementations, the compartment 104 may include a cooler 210 that may be used to decrease the temperature of the interior 134 of the compartment 104. The cooler 210 may include one or more of a refrigerant carrying coil and compressor, a Peltier device, or thermoelectric cooler. In some implementations, the cooler 210 may be positioned, for example, along one of the side walls 204 of the compartment 104. In such an implementation, the cooler 210 may include a cooler opening 216 through which cooled, refrigerated air may be introduced to the interior 134 of the compartment 104 to thereby lower the temperature of the interior 134 of the compartment 104 in a refrigerated state. In some implementations, a fan may be used to direct the refrigerated air into the interior 134 of the compartment 104. One or more Peltier devices can advantageously be used for both cooling and heating.

In some implementations, each compartment 104 in the vending kiosk 100 may include a separate cooler 210, such that the vending kiosk 100 includes a plurality of coolers 210. In such implementations, at least one of the plurality of coolers 210 may include a refrigerant carrying coil. In some implementations, the refrigerated state provided by the cooler 210 may lower the temperature within the interior 134 of the compartment 104 to at or below 41° F. to cool an item of food stored in the compartment. In some implementations, one compartment 104 may include a heater 208 and a cooler 210 that may be operable to transition between the refrigerated state, the warming state, and the cooking state. In such implementations, for example, the cooler 210 may maintain a food item at a lower temperature (e.g., at or below 41° F.) until an order for the food item is received, and/or a signal to begin cooking the food item is received. At that point, the cooler 210 may stop providing refrigerated air to the interior 134 of the compartment 104. At or about the same time, the heater 208 may transition to the cooking state to cook the food item held within the interior 134 of the compartment until the food item is cooked. When the food item is cooked, the heater 208 may transition from the cooking state to the warming state to keep the food item warm until the food item is retrieved from the compartment 104.

The compartments 104 may optionally include a stone floor or cast iron floor. In some implementations, the compartments 104 may include electrically radiant elements. In some implementations, compartments 104 may include one or more Peltier thermoelectric heater/coolers. In some implementations, the compartments 104 take the form of air impingement ovens, including one or more blowers that blow extremely hot air, and optionally a rack with a manifold. In some implementations, the compartments 104 may include a thermally insulative barrier, preferably a Yttrium, Indium, Manganese, and Oxygen (YInMn) barrier.

In some implementations, a processor enabled device or component (e.g., the on-board vending kiosk control system 166) may be used to implement a temperature control schedule to be used to control the temperature state within one or more of the compartments 104 in the vending kiosk 100. Such temperature states may specify, for example, that the heater 208 heat the compartment 104 to a cooking state to cook a food item, and then transition to a warming state to keep the cooked food item warm. In some implementations, the temperature control schedule may specify that the compartment be kept in a refrigerated state by the cooler 210 for a first time period, and then specify that the compartment be kept in a cooking state by the heater 208 for a second time period in order to completely cook the food item. In some implementations, the temperature control schedule may be based at least in part on an estimated pick-up time at which an end user will be arriving to pick-up the food item being cooked. As such, the temperature control schedule may be set to minimize the amount of time that elapses after the food item is completely cooked and the expected time at which the end user will arrive to retrieve the item. In some implementations, the temperature control schedule may be modified based upon an updated expected arrival and pick-up time for the end user. In some implementations, the temperature control schedule may be used to transition the compartment 104 between one or more of the refrigerated state, the cooking state, and the warming state.

In some implementations, the vending kiosk 100 may include one or more actuators, such as a locking actuator 218a, a door rotating actuator 218b, and a magnetic actuator 218c (collectively, "actuators 218"). Such actuators 218 may be comprised of one or more of a solenoid, a piston and cylinder (e.g., hydraulic, pneumatic), a pair of magnets including at least one electromagnet, or a pair of an electromagnet and a ferrous metal, for example. In some implementations, one or more of the locking actuator 218a, the rotating actuator 218b, and/or a magnetic actuator 218c may be included in the same structure and/or be implemented by the same actuator.

In some implementations, the locking actuator 218a may include a latch component 220 that may be comprised of a housing 222 and a selectively extendable latch 224 that may be used to lock and unlock the doors 102. In some implementations, the selectively extendable latch 224 may be selectively contained within the housing 222 in a retracted state and selectively extended from one end of the housing 222 in an extended state. In some implementations, the selectively extendable latch 224 may be selectively extended from the housing 222 when the door 102 is in the closed configuration 122 to thereby secure the door in a locked state in the closed configuration 122. In some implementations, the selectively extendable latch 224 may engage with an associated strikeplate 226 that is installed along a portion of the side wall 204 of the corresponding compartment 104 when the selectively extendable latch 224 is in the extended state and the door 102 is in the locked state in the closed configuration 122.

In some implementations, the selectively extendable latch 224 may transition between the extended state and the retracted state responsive to an actuator signal that may be received, for example, by the latch component 220 from a processor-enabled device or component. In some implementations, for example, the selectively extendable latch 224 may transition to the retracted state when such an actuator signal is received. In such implementations, the selectively extendable latch 224 may default to the extended state in the absence of such an actuator signal. In some implementations, the selectively extendable latch 224 may include a beveled edge that faces the opening 136 of the compartment 104. Such a beveled edge may facilitate the selectively extendable latch 224 retracting into the housing 222 sufficiently for the door 102 to transition to the closed configuration 122, at which point the selectively extendable latch 224 may transition to the extended state and engage with the strikeplate 226 when the selectively extendable latch 224 and the strikeplate 226 align.

In some implementations, the door-rotating actuator 218b may be physically coupled to the door 102 and/or to the compartment 104 via a first door-rotating actuator portion 228 and to a portion of the compartment 104 via a second door-rotating actuator portion 230. In such a configuration, the first door-rotating actuator portion 228 may be used to apply a rotational force to the door 102 to physically move the door 102 by rotating the door 102 about the axis of rotation 118, thereby transitioning the door 102 between an open configuration 120 and a closed configuration 122. In some implementations, the door-rotating actuator 218b may be responsive to an actuator signal received, for example, from a processor enabled device or component to physically move the door 102 to the open configuration 120 by applying an outward rotational force to the door 102. In the absence of such an actuator signal, the first door-rotating actuator portion 228 may apply an inward rotational force to the door 102 to thereby transition the door 102 to the closed configuration 122.

The magnetic actuator 218c may be used to apply a linear force on the door 102 to transition the door 102 between the open configuration 120 and the closed configuration 122. In some implementations, the magnetic actuator 218c may include a housing 232 mounted along a side wall 204 of the compartment 104 and/or the interior surface 126 of the door 102, and a pair of magnets, a first magnet 234a mounted along the door 102 (e.g., in the housing 232) and a second magnet 234b mounted along the interior surface 126 of the door 102. The first magnet 234a and the second magnet 234b may be aligned when the door 102 is in the closed configuration 122. In some implementations, the first magnet 234a and the second magnet 234b may be of the same polarity such that the pair of magnets provides an outward rotational force on the door 102, thereby biasing the door 102 to the open configuration 120. In some implementations, the first magnet 234a and the second magnet 234b may be of opposite polarities such that the pair of magnets provides an inward rotational force on the door 102, thereby biasing the door 102 to the closed configuration 122. In some implementations, at least one of the first magnet 234a and second magnet 234b may be an electromagnet that may be selectively activated, such as, for example, by an actuator signal received from a processor controlled device or component. In such an implementation, the pair of magnets may provide a rotational force when receiving such an actuator signal. In some implementations, the first magnet 234a and the second magnet 234b may be of opposite polarities such that the attractional force between the magnets may keep the door 102 in a closed and locked position. In such an implementation, an electromagnet may be employed, along with a circuit that controls a magnetic attraction (e.g., ON/OFF; North/South) of the electromagnet. The electromagnet may be paired with, for example a permanent magnet or a piece of ferrous metal, or another electromagnet.

In some implementations, the magnetic actuator 218c may include a housing and a selectively extendable arm (not shown) in which the selectively extendable arm is selectively contained within the housing in a retracted state, and selectively extended from the housing in an extended state. In such an implementation, for example, the selectively extendable arm may be responsive to selectively extend and/or retract based upon an actuator signal received from a processor-enabled device and/or component. For example, in some implementations, when the actuator signal is received, the selectively extendable arm may transition to the extended state, thereby providing an outward rotational force on the door 102 when the door 102 is in the closed configuration 122. Such an outward rotational force may be sufficient to physically move the door 102 away from the closed configuration 122. In some implementations, such movement may serve as a visual indication to a consumer of the compartment 104 that holds the item associated with the consumer.

In some implementations, a processor-enabled device or component (e.g., the on-board vending kiosk control system 166) may be used to control the operation of one or more of the heater 208, the cooler 210, the locking actuator 218a, the door-rotating actuator 218b, and/or the magnetic actuator 218c. The processor-enabled device may include one or more processing units to execute one or more processor-readable instructions, instruction sets, or instruction blocks. The processor-enabled device may include a system memory to store one or more processor-readable instructions, instruction sets, or instruction blocks to be executed by the processor. Such processor-readable instructions, instruction sets, or instruction blocks may be used to generate one or more control signals that may be used to control the various components of the vending kiosk 100, such as the actuators 218. In some implementations, the processor-readable instructions, instruction sets, or instruction blocks may control the operation of various subsystems or components on the vending kiosk, such as heater 208, and/or the cooler 210. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 3:
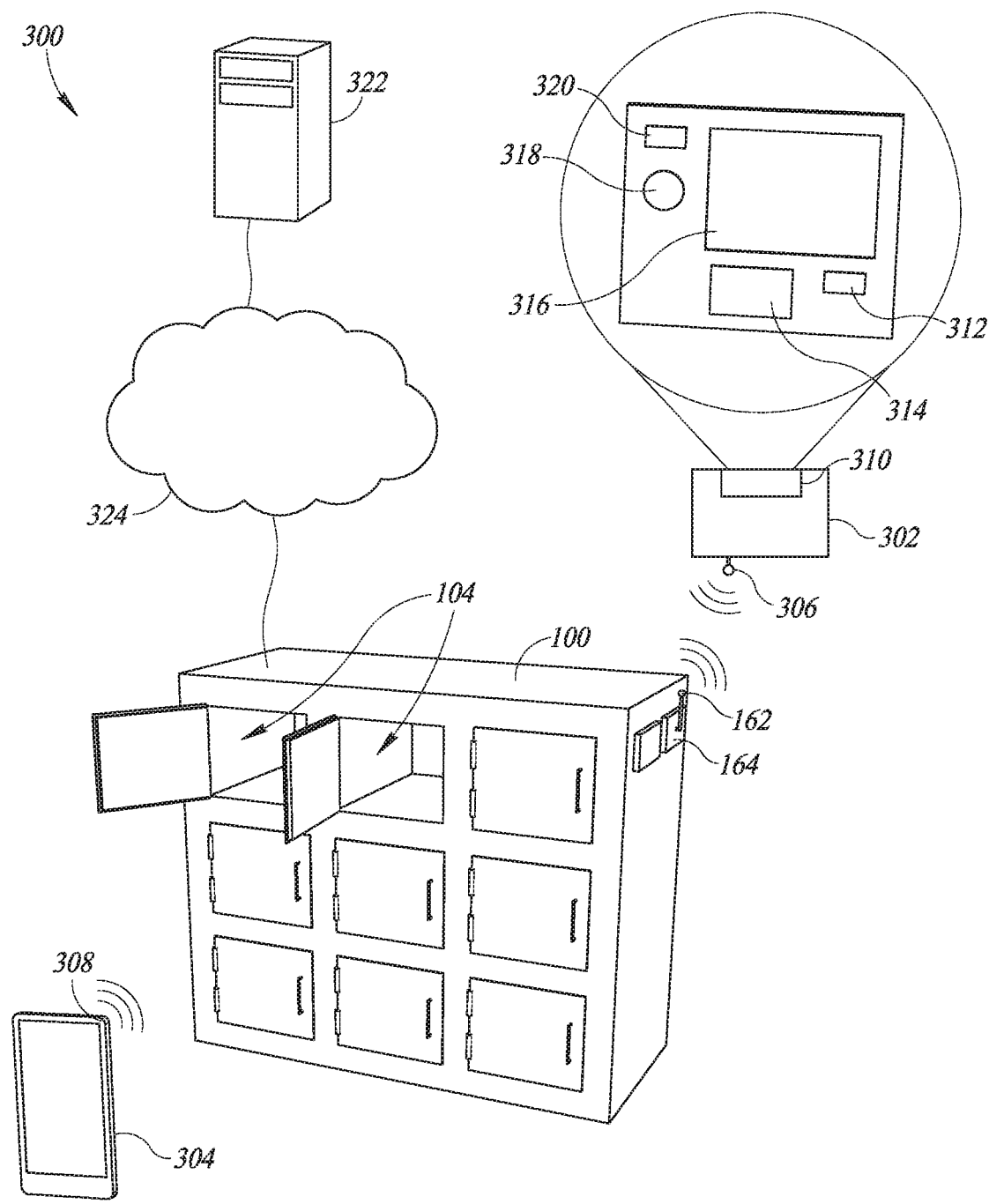
FIG. 3 is a schematic diagram of a vending kiosk-based network that includes a vending kiosk, a purchasing kiosk, and a mobile device, according to one illustrated implementation.

FIG. 3 shows a wireless network 300 that includes a vending kiosk 100, a purchasing kiosk 302, a mobile device 304, and an off-board control system 322 according to one illustrated implementation. In such an implementation, the vending kiosk 100 may include one or more compartments 104 that contain items that may be purchased and subsequently retrieved by consumers. The vending kiosk 100 may be communicatively coupled with the purchasing kiosk 302 and the mobile device 304 via the antenna 162 and radio 164 that are included as part of the vending kiosk 100. The purchasing kiosk 302 may include a purchasing kiosk antenna 306 that the purchasing kiosk 302 may use to wirelessly transmit signals to, and receive wirelessly transmitted signals from, the antenna 162 on the vending kiosk. The mobile device 304 may include one or more mobile device antenna 308 that the mobile device 304 may use to wirelessly transmit signals to, and receive wirelessly transmitted signals from, the antenna 162 on the vending kiosk. The purchasing kiosk 302 and/or the mobile device 304 may advantageously be used to receive and/or authorize purchase transactions at locations that are remote from the vending kiosk 100 from which the purchased items are retrieved. Such an arrangement provides consumers with the ability to place and authorize purchase transactions at their convenience, such as, for example, when the consumer is in transit to the vending kiosk 100. Such an arrangement may be used for crowd control and management by separating the purchase transaction activities at the purchasing kiosk 302 from the item retrieval activities at the vending kiosk 100, thereby decreasing the number of consumers who may be congregating around the vending kiosk 100 at any given time.

In some implementations, one or more components in the wireless network may communicate using wireless communications protocols, such as protocols for wireless local area networks (e.g., WIFI®, IEEE 802.11, WiMAX, IEEE 802.116, VoIP, and the like) or protocols for wireless peer-to-peer communications (e.g., Bluetooth®, Bluetooth® Low Energy, and the like). In some implementations, the devices such as the vending kiosk 100, the purchasing kiosk 302, and/or the mobile device 304 may communicate via near field communication (NFC) and/or radio frequency identification (RFID).

In some implementations, the purchasing kiosk may include a user input device 310 that may include one or more of a magnetic stripe reader 312, a keypad 314, a touchscreen 316, an image capture device 318, and/or a biometric capture device 320. In some implementations, the magnetic stripe reader 312 may be used to read and collect information that has been encoded within a financial transaction card using, for example, a magnetic stripe, a card chip, or some other type of storage medium. The magnetic stripe reader 312 may be communicatively coupled to one or more processors that may authorize a requested purchase transaction based upon information stored within and/or associated with the financial transaction card. Such one or more processors may be located locally at the purchasing kiosk 302 and/or remotely from the purchasing kiosk 302 at one or more processor-enabled devices, such as the off-board control system 322, that may be communicatively coupled to the purchasing kiosk 302 via a communications network 324.

The keypad 314 and/or touchscreen 316 may be used to enter information related to an item stored within one or more of the compartments 104 in the vending kiosk 100. In such an implementation, for example, the keypad 314 and/or touchscreen 316 may be used to enter a key code that may associated with a previous purchase transaction and/or order to be retrieved from one of the compartments 104 in the vending kiosk 100. In some implementations, the key code may include an order identifier that may be associated with a previous purchase transaction and may be comprised of a unique code that is associated with an order to be retrieved from the vending kiosk 100. In some implementations, the order identifier may be a randomly generated identifier that is not related to the order identifiers associated with other items being stored within the vending kiosk 100. Such a randomly generated identifier may be used, for example, to prevent orders from being stolen, and to reduce the possibility that an order entry that has been mis-entered will nonetheless open the door 102 to a compartment 104 associated with another order. In some implementations, the key code may additionally or alternatively include a customer identifier that may be associated with the customer who will be retrieving the order from the vending kiosk 100. In some implementations, the touchscreen 316 may be used to display information identifying the appropriate door 102 from which a consumer can retrieve an order from the vending kiosk 100.

The image capture device 318 may include, for example, a video camera or a still-image camera that may be used to capture images. In some implementations, such images may include, for example, machine-readable symbols that may be displayed within a field-of-vision of the image capture device 318. Such machine-readable symbols may include, for example, bar codes and/or Quick Response codes. In such an implementation, the machine-readable symbols may be affixed to a physical object (e.g., printed on a piece of paper) and/or may be rendered on a changeable display. For example, in some implementations, the machine-readable symbol may be electronically transmitted to a portable device via, for example, an email and/or text to an address associated with the consumer, to be rendered on a display of the portable device within the field-of-vision of the image capture device 318. The image capture device 318 in such an implementation may transmit the captured image of the machine-readable symbol to a processor-enabled device to decode the information contained within the machine-readable symbol. Such a processor enabled device may be local to the purchasing kiosk 302 or located remotely from the purchasing kiosk 302. In response, the processor-enabled device may transmit one or more signals that may result in the appropriate door 102 in the vending kiosk 100 being unlocked for the consumer.

The biometric capture device 320 and associated software may be used to identify consumers based upon one or more physical characteristics. The biometric capture device 320 and associated software may be used to identify consumers based upon, for example, one or more of fingerprints, facial features, eye feature, vocal characteristics, and/or any other unique physical characteristic of the consumer. In some implementations, such software may be implemented by one or more processor-enabled devices, including processor-enabled devices that may be communicatively coupled to the purchasing kiosk 302 via a communications network. Once the biometric capture device 320 and associated software has identified the consumer, the processor-enable device may transmit one or more signals that may result in the appropriate door 102 in the vending kiosk 100 being unlocked for the consumer.

The mobile device 304 may be used to enter purchasing information and to retrieve an item from one of the compartments 104 in the vending kiosk 100. Such purchasing and retrieval via the mobile device 304 may be facilitated by a user application, or app, that is implemented on and displayed by the mobile device 304. In some implementations, the consumer may use a software application (app) with an associated user interface presented by the mobile device 304 to authorize a purchase transaction for an item held in one of the compartments 104 in the vending kiosk 100. In some implementations, the app may be used to display pictures or other information related to the items stored in the various compartments 104 in the vending kiosk 100. In some implementations, the app rendered by the mobile device 304 may be used to display additional information to facilitate a purchase transaction by the consumer. For example, in some implementations, the app may be used to display or otherwise present information, such as location information in the form of a map and/or address list, for multiple vending kiosks 100 located within the vicinity of the consumer. Such information may also include the type of items currently available for purchase from each of the different vending kiosks 100. Such an app may enable the consumer to remotely authorize a purchase transaction for items that may be retrieved from one of the various vending kiosks 100. The consumer may then travel to the appropriate vending kiosk 100 without worrying that the item may have been sold out in during the interim period while the consumer traveled to the vending kiosk 100.

In some implementations, the consumer may use the app rendered by the mobile device 304 to retrieve items from the vending kiosk 100. In some implementations, for example, the app may be used to produce a machine-readable symbol that may be detected by the vending kiosk 100. Such a machine-readable symbol may be in the form of a visual symbol (e.g., a bar code symbol or a Quick Response code symbol) that may be detected by an image capture device at the vending kiosk 100. Such a machine-readable symbol may be contained within a wireless transmission, such as an NFC signal and/or an RFID signal, that may be received by the antenna 162 and radio 164 at the vending kiosk 100. Upon receiving and confirming the machine-readable symbol, the vending kiosk may open the appropriate door 102 of the vending kiosk 100 to provide access to the item to be retrieve from the associated compartment 104. In some implementations, the app may be used to display information identifying the appropriate door 102 of the vending kiosk 100 upon confirming the purchase transaction.

The off-board control system 322 may be communicatively coupled to the vending kiosk 100 via the communications network 324. In some implementations, the off-board control system 322 may execute one or more instructions from a purchase confirmation application to confirm a purchase transaction for one or more food items being held within the vending kiosk 100. Such purchase transactions may be initiated by one or more of the purchasing kiosk 302 and/or the mobile device 304. The purchase confirmation application can be executed by one or more hardware circuits, for instance one or more processors and stored on one or more associated nontransitory storage media, e.g., memory (e.g., FLASH, RAM, ROM) and/or spinning media (e.g., spinning magnetic media, spinning optical media) that stores at least one of processor-executable instructions or data. The off-board control system 322 may communicatively couple with the vending kiosk 100 to transmit information to confirm a purchase transaction. Some communications can employ one or more proprietary communications channels, for instance a proprietary network communications channel like a proprietary Local Area Network (LAN) or proprietary Wide Area Network (WAN) such as one or more intranets. Some communications can employ one or more non-proprietary communications channels, for instance one or more non-proprietary network communications channels like a Wide Area Network (WAN) such as the Internet and/or cellular provider communications networks including voice, data and short message service (SMS) networks or channels as part of the communications network 324.

In some implementations, the off-board control system 322 may execute one or more instructions from an end user authentication application to authenticate the identity of an end user to retrieve one or more food items being held within the vending kiosk 100. Such end user authentication may be initiated by one or more of the purchasing kiosk 302 and/or the mobile device 304. The end user authentication application can be executed by one or more hardware circuits, for instance one or more processors and stored on one or more associated nontransitory storage media, e.g., memory (e.g., FLASH, RAM, ROM) and/or spinning media (e.g., spinning magnetic media, spinning optical media) that stores at least one of processor-executable instructions or data. The off-board control system 322 may communicatively couple with the vending kiosk 100 to transmit information to confirm a purchase transaction. Some communications can employ one or more proprietary communications channels, for instance a proprietary Local Area Network (LAN) or proprietary Wide Area Network (WAN) such as one or more intranets. Some communications can employ one or more non-proprietary communications channels, for instance one or more non-proprietary network communications channels like a Wide Area Network (WAN) such as the Internet and/or cellular provider communications networks including voice, data and short message service (SMS) networks or channels as part of the communications network 324.

In some implementations, the off-board control system 322 may transmit routing, cooking (e.g., temperature control schedule), and/or destination instructions to the vending kiosk 100 via the communications network 324. Such routing and/or destination instructions may be used, for example, when the vending kiosk 100 is autonomously movable, as discussed below. The vending kiosk 100 may store the transmitted routing, cooking, and/or destination instructions on one or more nontransitory storage media to be used during routing of the vehicle, cooking of food items, and/or travel to a destination. In some implementations, the off-board control system 322 may transmit updated routing, cooking, and/or destination instructions to the vending kiosk 100, which may thereby update the previously stored instructions. In some implementations, the vending kiosk 100 may transmit information back to the off-board control system 107. Such information may include, for example, number and amount of sales of food items, remaining ingredients left in the vending kiosk 100, current location of the vending kiosk 100, and like information. The routing, cooking, and/or destination instructions may be used by a human operator of a distribution vehicle that transports the vending kiosk 100 to a distribution location and/or autonomously by the vending kiosk 100 to travel to the distribution location.

In some implementations, the off-board control system 322 may execute one or more instructions from an actuator control application to control one or more actuators on the vending kiosk 100. The actuator control application can be executed by one or more hardware circuits, for instance one or more processors and stored on one or more associated nontransitory storage media, e.g., memory (e.g., FLASH, RAM, ROM) and/or spinning media (e.g., spinning magnetic media, spinning optical media) that stores at least one of processor-executable instructions or data. The off-board control system 322 may communicatively couple with the vending kiosk 100 to transmit information to control one or more of the actuators. Some communications can employ one or more proprietary communications channels, for instance a proprietary network communications channel like a proprietary Local Area Network (LAN) or proprietary Wide Area Network (WAN) such as one or more intranets. Some communications can employ one or more non-proprietary communications channels, for instance one or more non-proprietary network communications channels like a Wide Area Network (WAN) such as the Internet and/or cellular provider communications networks including voice, data and short message service (SMS) networks or channels as part of the communications network 324.

Figure 4A:
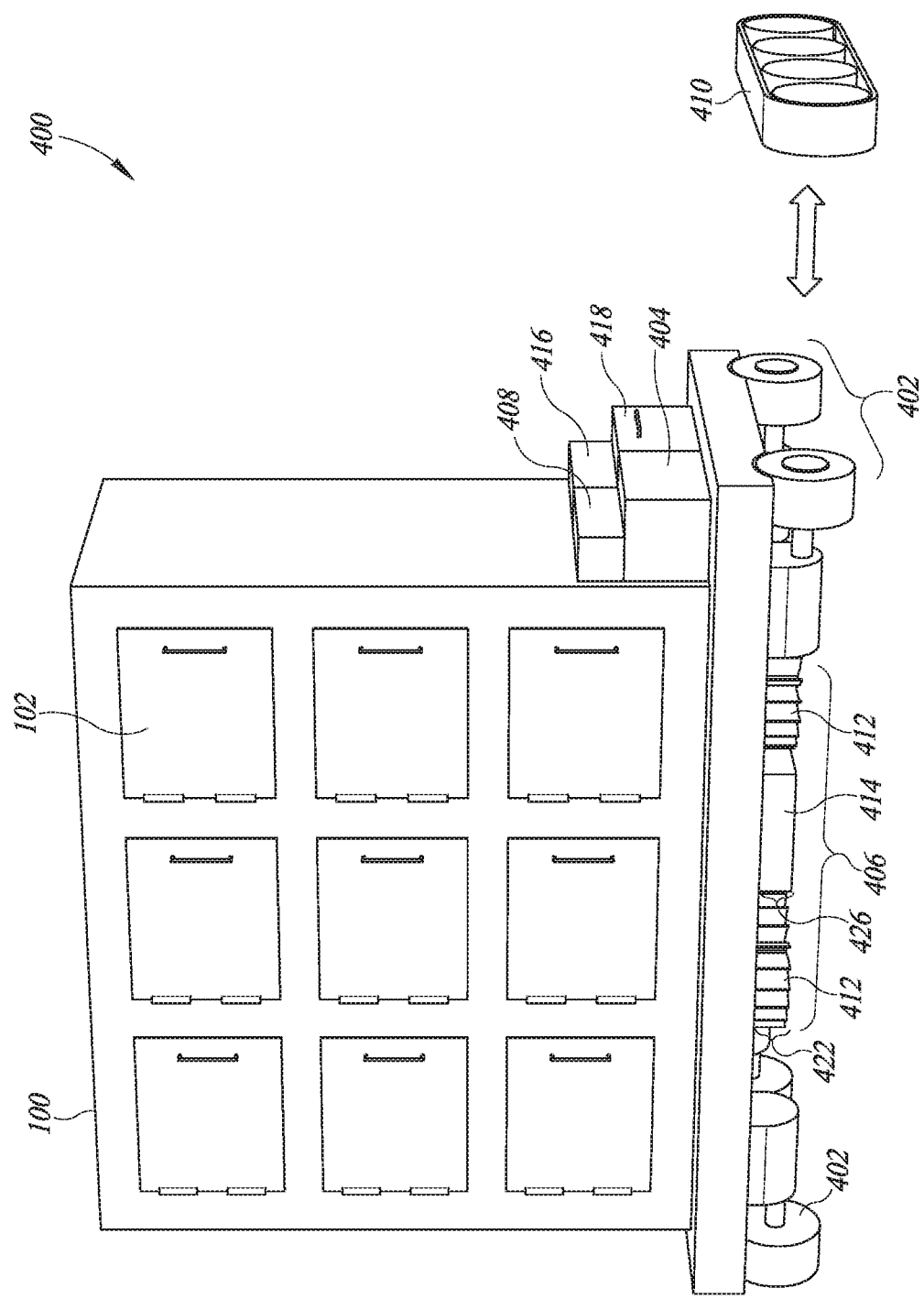
FIG. 4A is front, top, right isometric view of a self-propelled vending kiosk including wheels or optional treads, according to at least one illustrated implementation.
Figure 4B:
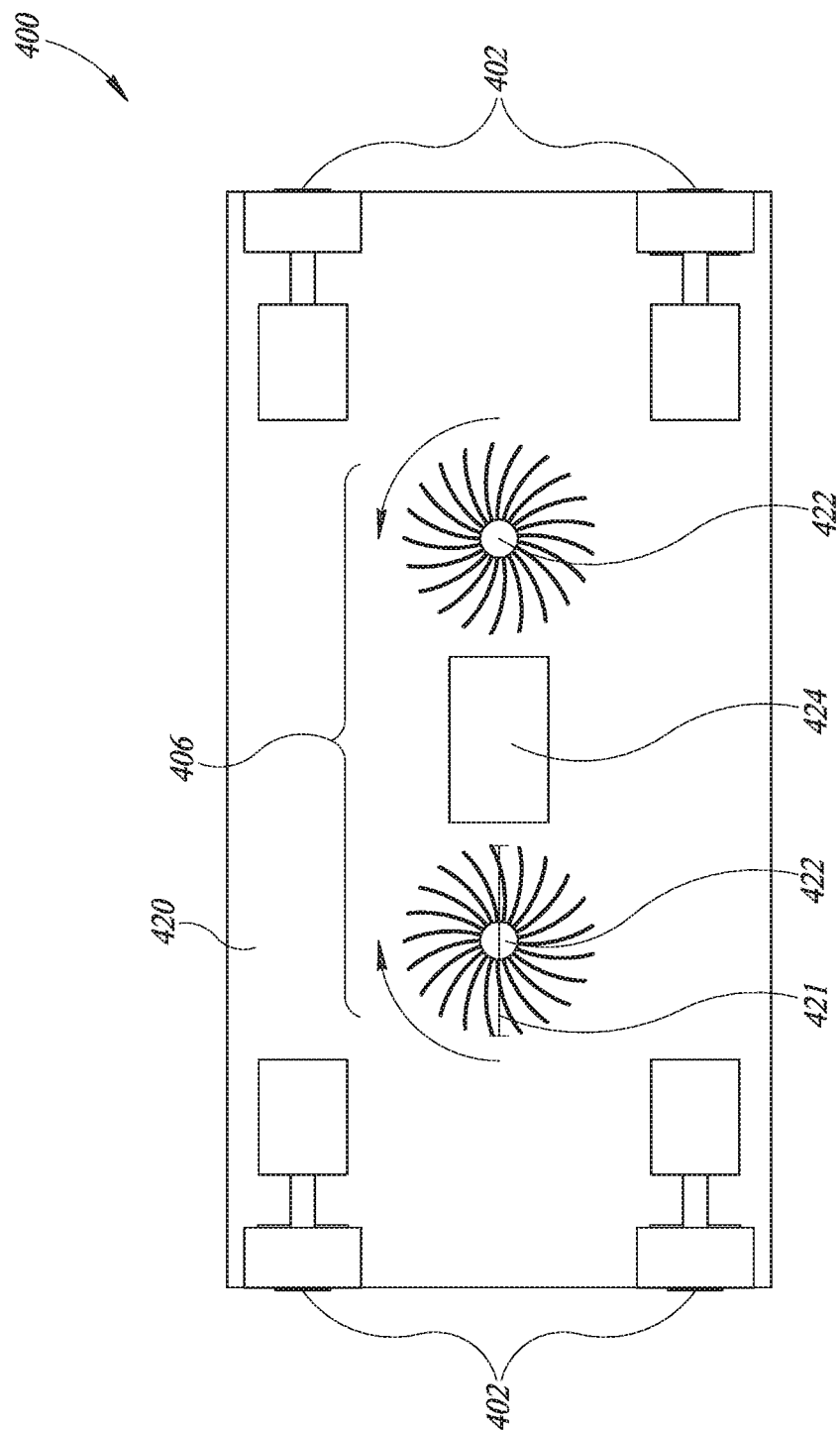
FIG. 4B is a bottom plan view of the self-propelled vending kiosk of FIG. 4A, according to at least one illustrated implementation.

FIGS. 4A and 4B show a self-propelled kiosk 400 that includes a vending kiosk 100, a set of wheels 402, a motor 404, an optional cleaning subsystem 406, and an on-board self-propelled vehicle control system 408. The vending kiosk 100 may include a plurality of doors 102 that may provide access to corresponding compartments. Items, such as food items, may be retrieved from the compartments. Each of the doors 102 may be in the open configuration 120 to provide access to the associated compartment 104, or in a closed configuration 122 to prevent access to the associated compartment 104. In some implementations, one or more of the doors 102 may be selectively locked in the closed configuration 122 to protect the item being stored in the corresponding compartment 104 until the item can be retrieved by the consumer who has purchased the item.

The set of wheels 402 may be used by the self-propelled kiosk 400 to travel across a geographic area. The motor 404 may be drivingly coupled to one or more wheels in the set of wheels 402, and used to drive the set of wheels 402 in an autonomous vehicle mode or in a semi-autonomous vehicle mode. The motor 404 may be any type of motor that may be used to drive the set of wheels 402, such as an electric motor, a gasoline-powered motor, a natural gas-powered motor, or any other type of similar motor. In some implementations, a set of treads 410 may be used to travel over a physical terrain. In such implementations, the set of treads 410 may provide improved stability when traveling over uneven terrain as compared to the set of wheels 402.

In some implementations, in the autonomous vehicle mode, the self-propelled kiosk 400 may be provided with destination information (e.g., destination location and/or route information), and the self-propelled kiosk 400 may navigate to the destination without any control or supervision by a human. In such an implementation, the self-propelled kiosk 400 may use one or more sensors to collect information about the surroundings of the self-propelled kiosk 400. Based upon the collected information, one or more control systems on the self-propelled kiosk 400 may determine what actions the self-propelled kiosk 400 should take in response in order to continue traveling towards the destination location. In some implementations, in the semi-autonomous vehicle mode, the self-propelled kiosk 400 may be subject to at least some control and/or supervision by a human. In such an implementation, for example, the self-propelled kiosk 400 may use one or more sensors to collect information about the surroundings of the self-propelled kiosk 400. A human controller may have the ability to review the collected information and control the navigation of the self-propelled kiosk 400 based upon this collected information. In some implementations, the human controller may intervene to control the self-propelled kiosk 400 in limited situations, such as, for example, when a control system on the self-propelled kiosk 400 cannot identify a next action to take in a given situation.

The cleaning subsystem 406 may include one or more brushes 412, a plenum 414, and a low-pressure source 416, and a debris collection compartment 418. The brushes 412 and the plenum 414 may be located along a bottom-facing side 420 (FIG. 4B) of the self-propelled kiosk 400, and may be oriented to face towards the ground or other surface on which the self-propelled kiosk 400 rests. In some implementations, the brushes 412 may have an annular shape or a circular shape with an outside diameter 421 and a height 422. The height 422 of the brushes 412 may be equal to or larger than a distance separating the bottom-facing side 420 of the self-propelled kiosk 400 from the ground or surface on which the self-propelled kiosk 400 rests. In this situation, at least a portion of the brushes 412 may make contact with the surface on which the self-propelled kiosk 400 rests to facilitate the collection of debris from the surface. In some implementations, at least some of the brushes 412 may be drivingly coupled to a motor (e.g., motor 404) that may move the brushes 412 to improve the collection of debris. In implementations in which the brushes 412 have a circular profile, the motor 404 may rotate the brushes 412 about an axis of rotation 423 that extends outward from a center of the brushes 412. In such an implementation, the brushes 412 may be rotated to sweep debris towards a collection component (e.g., the plenum 414, discussed below) located on the bottom facing side 420 of the self-propelled kiosk 400. For example, in implementations involving brushes 412 with a circular shape, the portion of the brush 412 facing the direction of movement of the self-propelled kiosk 400 may be rotated towards collection component to thereby facilitate the collection of debris.

The cleaning subsystem 406 may include a plenum 414 and an associated low pressure source 416. The plenum 414 may have an open end 424 and extend outward from the bottom-facing side 420 of the self-propelled kiosk 400 such that the open end 424 is directed towards the surface that supports the self-propelled kiosk 400. In some implementations, the open end 424 of the plenum 414 may have a rectangular profile with a length and a width, and the plenum 414 may have a height 426. Such height 426 may be less than the distance from the bottom-facing side 420 of the self-propelled kiosk 400 and the surface on which the self-propelled kiosk 400. The plenum 414 may be in fluid communication with the low pressure source 416, such as a pump. The low pressure source 416 may create a low pressure that is less than an atmospheric pressure of the ambient environment surrounding the self-propelled kiosk 400. The low pressure created by the low pressure source 416 may produce a suction effect at the open end 424 to thereby draw debris into the open end 424 of the plenum 414.

The plenum 414 may be in fluid communication with a debris collection compartment 418 such that a fluid pathway extends from the open end 424 of the plenum 414 to the debris collection compartment 418. The debris that enters the open end 424 of the plenum 414 may travel through the fluid pathway to the debris collection compartment 418. The debris collection compartment 418 may include an interior cavity that may store the debris collected by the cleaning subsystem 406. In some implementations, the debris collection compartment 418 may be selectively removable from the self-propelled kiosk 400 such that the debris contained within the debris collection compartment 418 may be emptied.

The on-board self-propelled vehicle control system 408 may take the form of any current or future developed processor-enabled device capable of executing one or more instruction sets. The on-board self-propelled vehicle control system 408 may include one or more processing units to execute one or more processor-readable instructions, instruction sets, or instruction blocks. The on-board self-propelled vehicle control system 408 may include a system memory to store one or more processor-readable instructions, instruction sets, or instruction blocks to be executed by the processor. Such processor-readable instructions, instruction sets, or instruction blocks may be used to generate one or more control signals that may be used to control the various components of the self-propelled kiosk 400, such as the motor 404 and/or the cleaning subsystem 406. In some implementations, the processor-readable instructions, instruction sets, or instruction blocks may control the operation of self-propelled kiosk 400 in one or both of the autonomous vehicle mode and the semi-autonomous vehicle mode. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 5A:
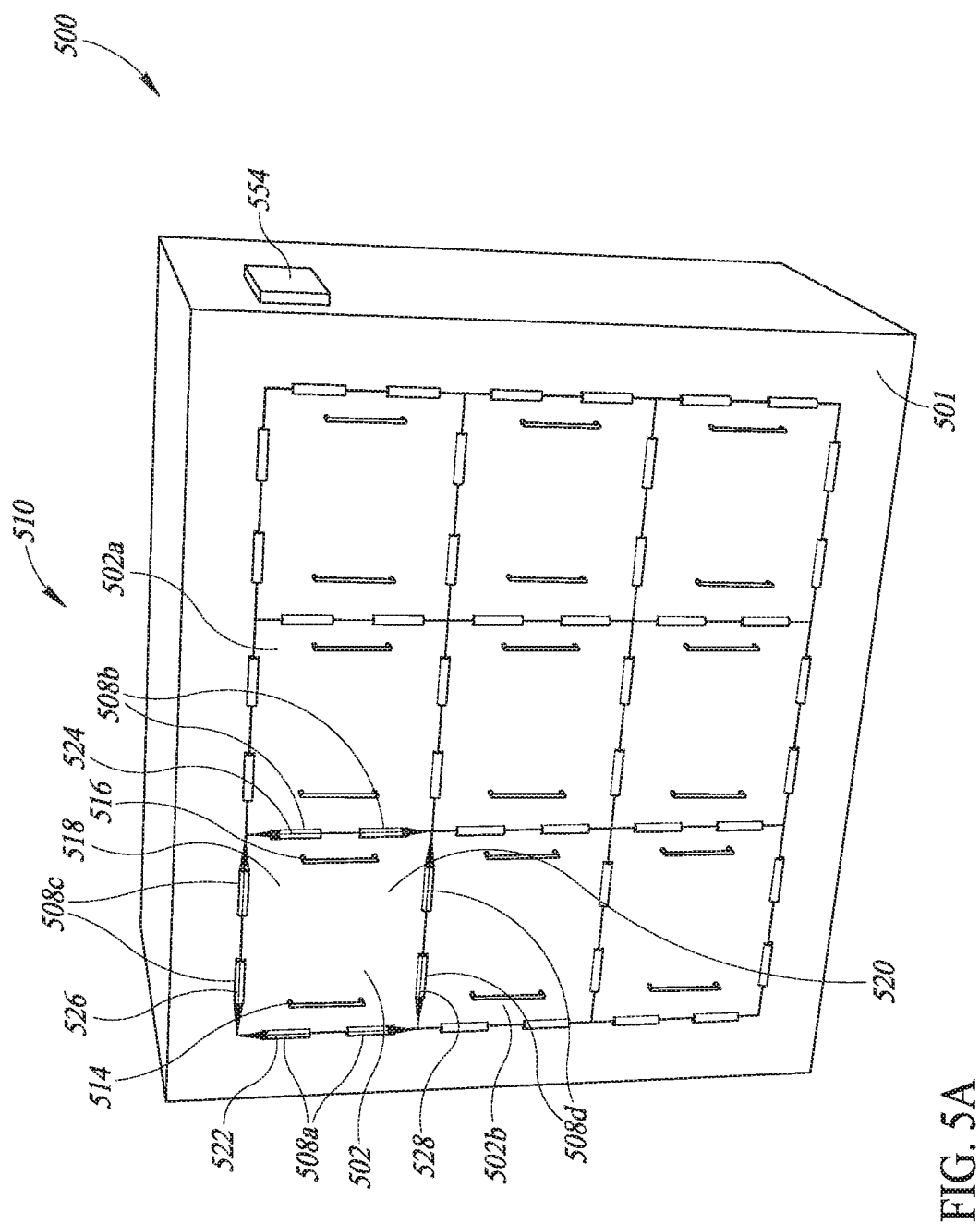
FIG. 5A is a front, top, right isometric view of a locker system that includes a plurality of doors in which two or more of the doors may be selectively coupled to move in a coupled configuration, or selectively uncoupled to move in an uncoupled configuration or to change an axis of rotation about which one or more of the doors pivot between closed and opened configurations, according to one illustrated implementation.
Figure 5B:
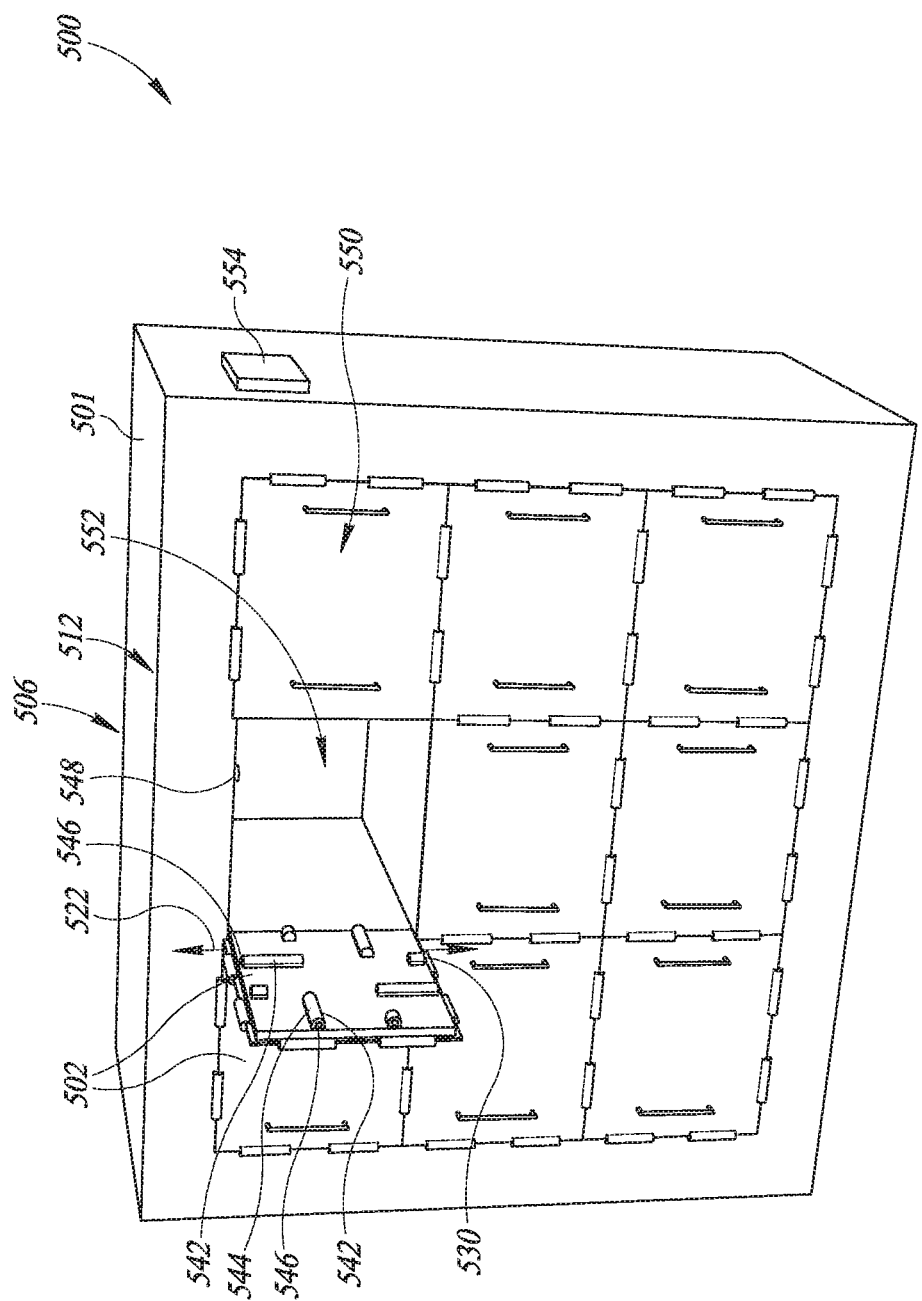
FIG. 5B is a front, top, right isometric view of the locker system of FIG. 5A in which one of the doors is selectively coupled and uncoupled in one configuration to pivot about a respective left-side hinge, the door shown in an open configuration, according to one illustrated implementation.
Figure 5C:
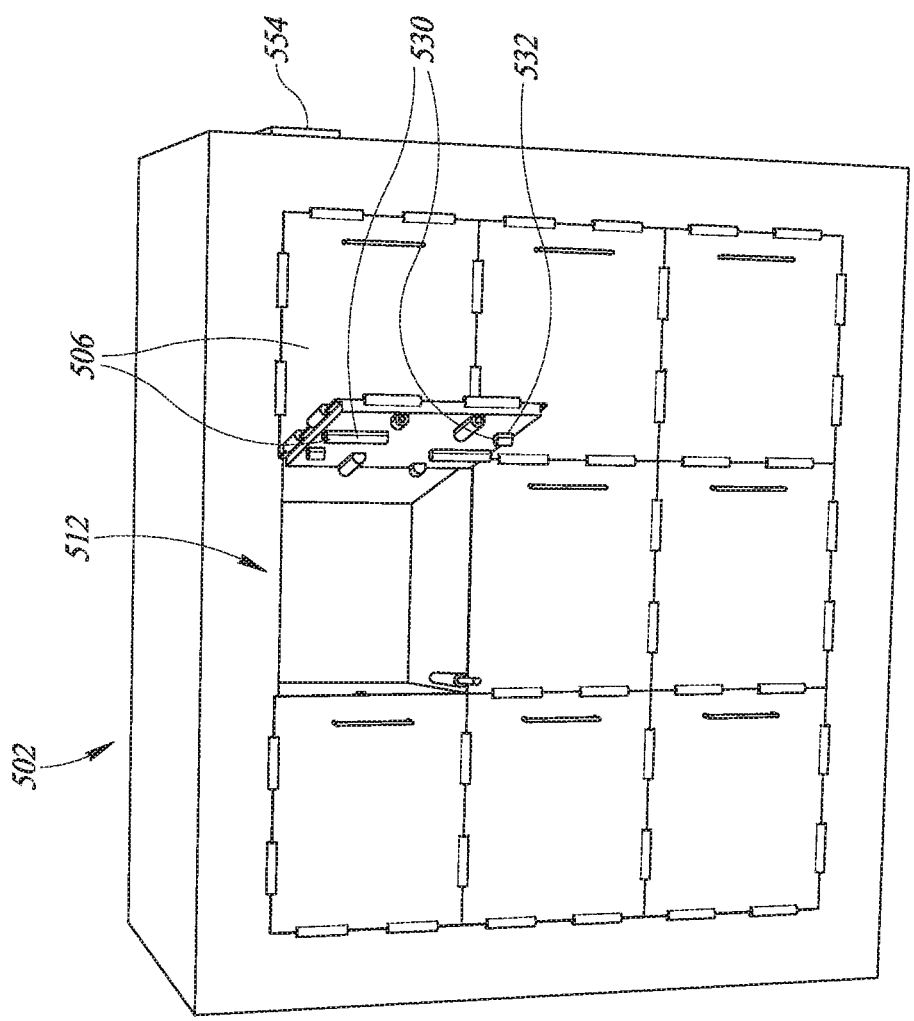
FIG. 5C is a front, top, right isometric view of the locker system of FIG. 5A in which one of the doors is selectively coupled and uncoupled in one configuration to pivot about a respective right-side hinge, the door shown in an open configuration, according to at least one illustrated implementation.
Figure 5D:
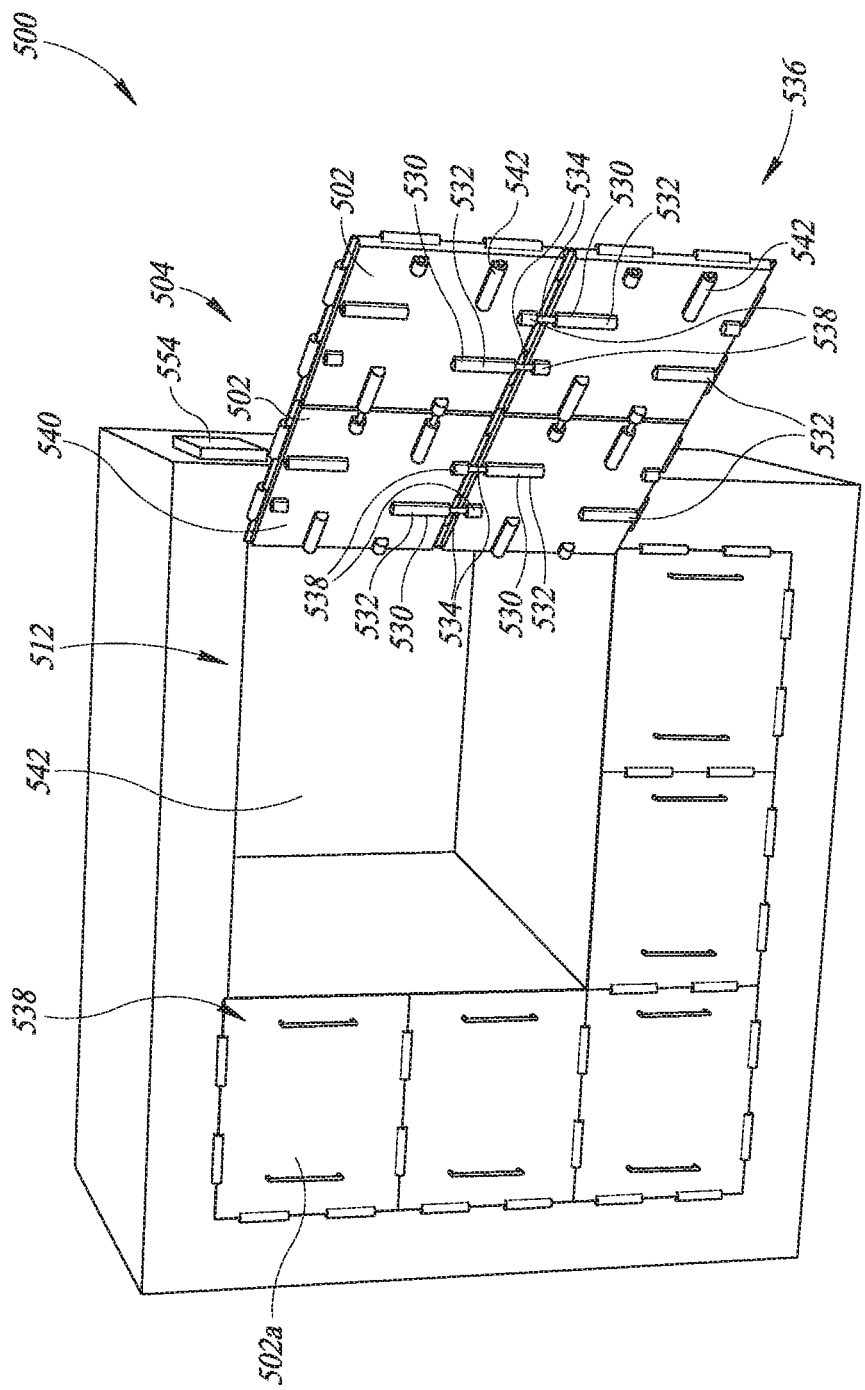
FIG. 5D is a front, top, right isometric view of the locker system of FIG. 5A in which four of the doors are selectively coupled and uncoupled in one configuration to pivot together about a respective right-side hinge, the coupled set of doors shown in an open configuration, according to at least one illustrated implementation.

FIGS. 5A, 5B, 5C, and 5D show a locker system 500 that may include a frame 501 and a plurality of doors 502, according to at least one illustrated implementation. Two or more of the doors 502 in the locker system 500 may be selectively coupled to move together as a single unit in a coupled configuration 504 (FIG. 5D), or selectively uncoupled to move independently of one another in an uncoupled configuration 506 (FIGS. 5B, 5C). There are a plurality of hinges 508 that may be used to selectively rotatably or pivotally couple one or more of the doors 502 for rotation between a closed configuration 510 (FIG. 5A) and an open configuration 512 (FIGS. 5B, 5C, and 5D). In some implementations, a first set of hinges 508a may selectively rotatably or pivotally couple the door 502 along a right edge 514 of the door 502, a second set of hinges 508b may selectively rotatably or pivotally coupled the door 502 along a left edge 516 of the door 502, a third set of hinges 508c may selectively rotatably or pivotally couple the door 502 along a top edge 518 of the door 502, and a fourth set of hinges 508d may selectively rotatably or pivotally couple the door 502 along a bottom edge 520 of the door 502.

In some implementations, each set of hinges 508 may be selectively coupled or uncoupled to the respective door 502 and/or to an adjacent portion of the locker system 500. For example, the first set of hinges 508a may be selectively coupled to the right edge 514 of the door 502 and to a portion of the frame 501, thereby selectively providing a right side axis 522 around which the door 502 may rotate. In such an implementation, each of the second set of hinges 508b, the third set of hinges 508c, and the fourth set of hinges 508d may be selectively uncoupled from either the door 502 and/or the adjacent portion of the locker system 500 such that the door 502 may rotate about the right side axis 522. In some implementations, the second set of hinges 508b may be selectively coupled to the left edge 516 of the door 502 and to a portion of a horizontally adjacent door 502a, thereby selectively providing a left side axis 524 around which the door 502 may rotate. In such an implementation, each of the first set of hinges 508a, the third set of hinges 508c, and the fourth set of hinges 508d may be selectively uncoupled from either the door 502 and/or the adjacent portion of the locker system 500 such that the door 502 may rotate about the left side axis 524. In some implementations, the third set of hinges 508c may be selectively coupled to the top edge 518 of the door 502 and to a portion of the frame 501, thereby selectively providing a top axis 526 around which the door 502 may rotate. In such an implementation, each of the first set of hinges 508a, the second set of hinges 508b, and the fourth set of hinges 508d may be selectively uncoupled from either the door 502 and/or the adjacent portion of the locker system 500 such that the door 502 may rotate about the top axis 526. In some implementations, the fourth set of hinges 508d may be selectively coupled to the bottom edge 520 of the door 502 and to a portion of a vertically adjacent door 502b, thereby selectively providing a bottom axis 528 around which the door 502 may rotate. In such an implementation, each of the first set of hinges 508a, the second set of hinges 508b, and the third set of hinges 508c may be selectively uncoupled from either the door 502 and/or the adjacent portion of the locker system 500 such that the door 502 may rotate about the bottom axis 528.

In some implementations, each door 502 on the locker system 500 may include a set of coupling actuators 530 that may be used to couple the door 502 with an adjacent door 502 on the locker system 500. Such a coupling actuator 530 may be comprised, for example, of one or more of a solenoid, a piston and associated cylinder (e.g., hydraulic, pneumatic), a plurality of magnets, including at least one of which is an electromagnet, and/or an electromagnet paired with a ferrous metal.

In some implementations, for example, the coupling actuator 530 may include a housing 532 and a selectively extendable coupling post 534 (FIG. 5D) that may be used to selectively couple and uncouple two or more of the doors 502. In some implementations, the selectively extendable coupling post 534 may be selectively contained within the housing 532 in a retracted state and selectively extended from one end of the housing 532 in an extended state. In some implementations, the selectively extendable coupling post 534 may be selectively extended from the housing 532 to thereby securely couple adjacent doors 502 in a coupled configuration 536 to move as a single door 540. In some implementations, when the selectively extendable coupling post 534 is in the extended state, the selectively extendable coupling post 534 may engage with an associated port 538 that is installed along the adjacent door 502. The single door 540 in such a coupled configuration 536 may be associated with a relatively larger compartment 541 than those compartments that are accessible from just one door 502. In some implementations, the selectively extendable coupling post 534 may be in the retracted state, in which adjacent doors 502 may move independently from one another in an uncoupled configuration 539. As shown in FIG. 5D, for example, the left side door 502c is in an uncoupled configuration 539 with the single door 540. The selective movement of the selectively extendable coupling posts 534 from an extended state to a retracted state may be in response to one or more actuator signals received from a processor-enabled device or components, as discussed below. In some implementations, a set (e.g., one or more) of actuators 542 may be attached or otherwise physically coupled to interact with each door 502 on the locker system 500. Such locking actuators 542 may be used to securely lock each respective door 502 in a closed state. Such a locking actuator 542 may be comprised, for example, of one or more of a solenoid, a piston and associated cylinder, a plurality of magnets, including at least one of which is an electromagnet, and/or an electromagnet paired with a ferrous metal.

In some implementations, for example, the locking actuator 542 may include a housing 544 and a selectively extendable locking post 546 (FIG. 5B) that may be used to selectively lock and unlock the associated door 502. In some implementations, the selectively extendable locking post 546 may be selectively contained within the housing 544 in a retracted state and selectively extended from one end of the housing 544 in an extended state. In some implementations, the selectively extendable locking post 546 may be selectively extended from the housing 544 to thereby securely lock the associated door 502 in a locked state in a closed configuration 550. In some implementations, when the selectively extendable locking post 546 is in the extended state, the selectively extendable locking post 546 may engage with an associated port 548 that may be installed along an adjacent door 502 or along the frame 501 of the locker system 500. In some implementations, the selectively extendable locking post 546 may be in the retracted state, in which the associated door 502 may be rotated about one or more axis (e.g., right side axis 522) from the closed configuration 550 to an open configuration 552. The selective movement of the selectively extendable locking posts 546 from an extended state to a retracted state may be in response to one or more actuator signals received from a processor-enabled device or components, as discussed below.

In some implementations, such as those in which the coupling actuators 530 and locking actuators 542 include solenoids, the coupling actuators 530 and the locking actuators 542 may each fail (i.e., on occurrence of a failure, failure state, loss of power, or other error condition) such that the respective extendable posts are all in the extended state. In such an implementation, the doors 502 may remain securely locked to prevent items in the respective compartments (e.g., larger compartment 541) from being taken. In implementations, the set of coupling actuators 530 may be separate and distinct from the set of locking actuators 542, as shown in FIG. 5D. In some implementations, one or more actuators may alternately serve as coupling actuators 530 during a first time period in which the one or more actuators couple multiple doors 502 into a single door 540. During a second, non-overlapping time period in which the multiple doors 502 are in an uncoupled configuration, the same actuators may serve as locking actuators 542 to securely lock each of the multiple doors 502 in a respective closed configuration 550.

In some implementations, the locker system 500 may include an on-board locker control system 554 that may take the form of any current or future developed processor-enabled device capable of executing one or more instruction sets. The on-board locker control system 554 may include one or more processing units to execute one or more processor-readable instructions, instruction sets, or instruction blocks. The on-board locker control system 554 may include a system memory to store one or more processor-readable instructions, instruction sets, or instruction blocks to be executed by the processor. Such processor-readable instructions, instruction sets, or instruction blocks may be used to generate one or more control signals that may be used to control the various components of the locker system 500, such as the coupling actuators 530 and/or the locking actuators 542. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 6A:
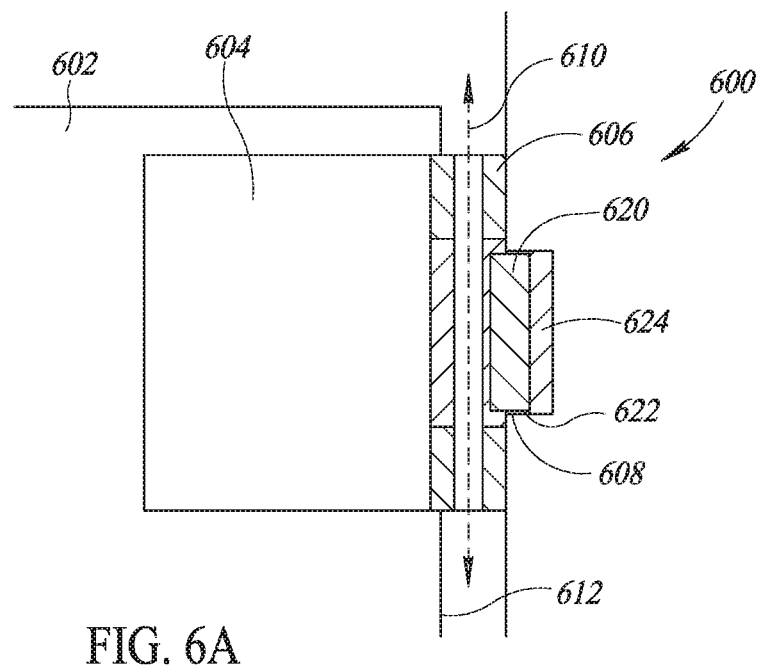
FIG. 6A is a side elevational view of a selectively coupleable hinge that is coupled to a portion of a locker system and to a door, according to at least one illustrated implementation.
Figure 6B:
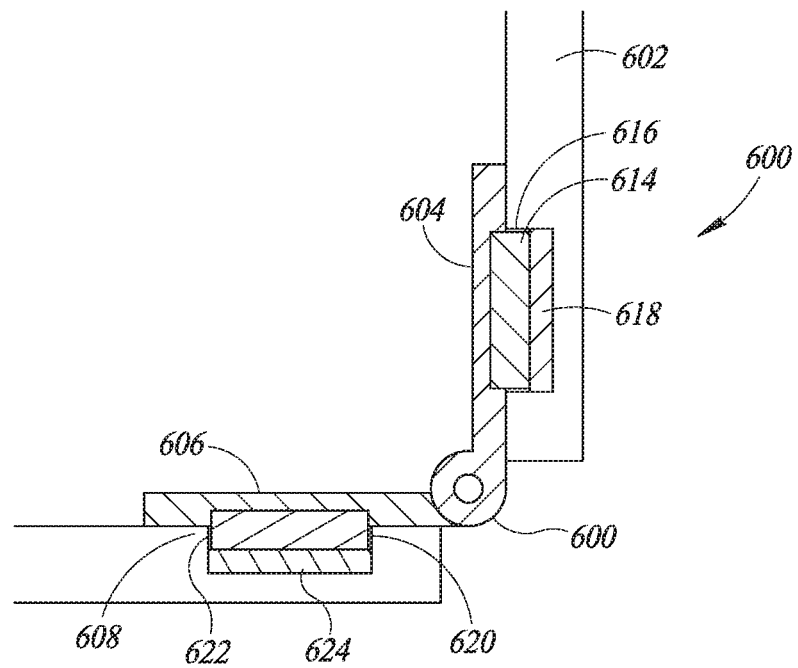
FIG. 6B is a top plan view of the selectively coupleable hinge of FIG. 6A, according to at least on illustrated implementation.

FIGS. 6A and 6B show a selectively coupleable hinge 600 that is selectively coupled by a first arm 604 to a side edge 612 of a door 602 and that is selectively coupleable by a second arm 606 to a portion of a locker system 608. The selectively coupleable hinge 600 provides an axis of rotation 610 that may extend parallel to the side edge 612 of the door 602. In some implementations, a first magnet 614 may be coupled to a portion of the first arm 604 of the selectively coupleable hinge 600. In such an implementation, the first magnet 614 may be placed along a side of the first arm 604 that faces towards the door 602. In some implementations, the door 602 may include a recessed area 616 that is sized and shaped to receive the first magnet 614. In some implementations, the door 602 may contain a second magnet 618 that may be aligned with and complementary to the first magnet 614. In some implementations, the second magnet 618 may be of an opposite polarity as the polarity of the first magnet 614 such that an attractive force arises between the first magnet 614 and the second magnet 618. In some implementations, at least one of the first magnet 614 and the second magnet 618 may be an electromagnet such that the attractive force between the first magnet 614 and the second magnet 618 may be selectively activated and deactivated.

In some implementations, a third magnet 620 may be coupled to a portion of the second arm 606 of the selectively coupleable hinge 600. In such an implementation, the third magnet 620 may be placed along a side of the first arm 604 that faces towards a portion of the locker system 608 proximate the selectively coupleable hinge 600. In some implementations, the portion of the locker system 608 may include a recessed area 622 that is sized and shaped to receive the third magnet 620. In some implementations, the portion of the locker system 608 may contain a fourth magnet 624 that may be aligned with and complementary to the third magnet 620. In some implementations, the fourth magnet 624 may be of an opposite polarity as the polarity of the third magnet 620 such that an attractive force arises between the third magnet 620 and the fourth magnet 624. In some implementations, at least one of the third magnet 620 and the fourth magnet 624 may be an electromagnet such that the attractive force between the third magnet 620 and the fourth magnet 624 may be selectively activated and deactivated.

In some implementations, the first magnet 614 and second magnet 618 may be selectively, physically coupled to thereby attach the selectively coupleable hinge 600 to the door 602, and the third magnet 620 and the fourth magnet 624 may be selectively, physically coupled to thereby attach the selectively coupleable hinge 600 to the portion of the locker system 608. When the first magnet 614 and the second magnet 618 are physically coupled, and the third magnet 620 and the fourth magnet 624 are physically coupled, the selectively coupleable hinge 600 may provide an axis of rotation 610 around which the door 602 may rotate. In some implementations, multiple sets of selectively coupleable hinges 600 may each be located along different respective edges of the door 602. In such an implementation, the multiple sets of selectively coupleable hinges 600 may be used to vary the direction in which the door 602 rotates when opening. For example, in some implementations, a set of selectively coupleable hinges 600 located along the right edge of a door 602 may be used to selectively couple the door 602 to an adjacent portion of the locker system 608. At the same time the sets of selectively coupleable hinges 600 located along the other edges (e.g., the left edge, the top edge, and the bottom edge) may be uncoupled to either the door 602 or to the respective adjacent portions of the locker system 608. In such an implementation, the various sets of selectively coupleable hinges 600 may provide a right side axis about which the door 602 may rotate. The same door 602 may be provided with a left side axis by selectively coupling the set of selectively coupleable hinges 600 located along the left edge, and selectively uncoupling the sets of selectively coupleable hinges 600 located along the other edges of the door 602.

In some implementations, a processor enable device or component may provide one or more actuator signals to selectively couple and/or uncouple the respective sets of selectively coupleable hinges 600, as discussed below, to provide various axes of rotation to move the door 602. In such an implementation, the respective axis of rotation for a door 602 may be changed based upon various attributes of an end user. For example, in some implementations, the processor-enabled device or component may store information regarding physical traits of the end user, such as, for example, the dominant hand of the end user, indicating, for example, that the end user is either right-handed or left-handed. In such an implementation, the processor-enabled device or component may transmit one or more actuator signals to selectively couple a set of selectively coupleable hinges 600 based upon the physical characteristic of the end user (e.g., selectively coupling the set of selectively coupleable hinges 600 along the left edge of the door 602, and uncoupling the remaining sets of selectively coupleable hinges 600, to provide a left side axis of rotation for a left-handed user). In some implementations, the physical characteristics of the end user may be determined based upon one or more sensors located at the locker system 608. For example, in some implementations, the locker system 608 may include an imager that may capture an image of the end user who is proximate the locker system 608 to retrieve an item. In some implementations, a processor enabled device or component may recognize from an image captured by the imager that the end user has one particular hand occupied, such as, for example, by carrying a package or a child. As such, the processor enabled device or component may configure the door 602 to open along an axis that is determined based at least in part on the captured image of the end user.

Figure 7A:
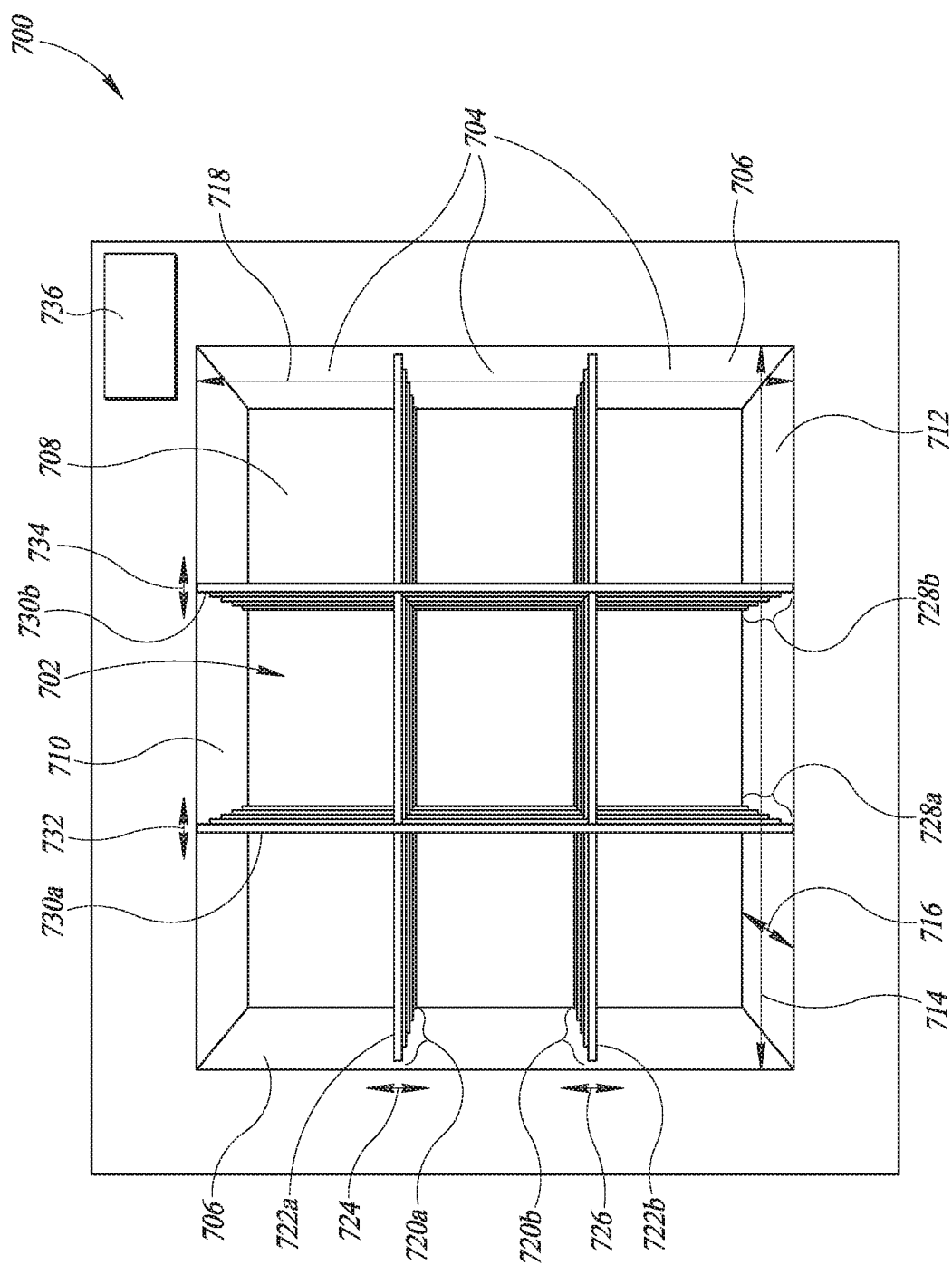
FIG. 7A is a front perspective view of a locker system having an interior that includes a set of configurable compartments arranged in a first exemplary arrangement, according to at least one illustrated implementation.
Figure 7B:
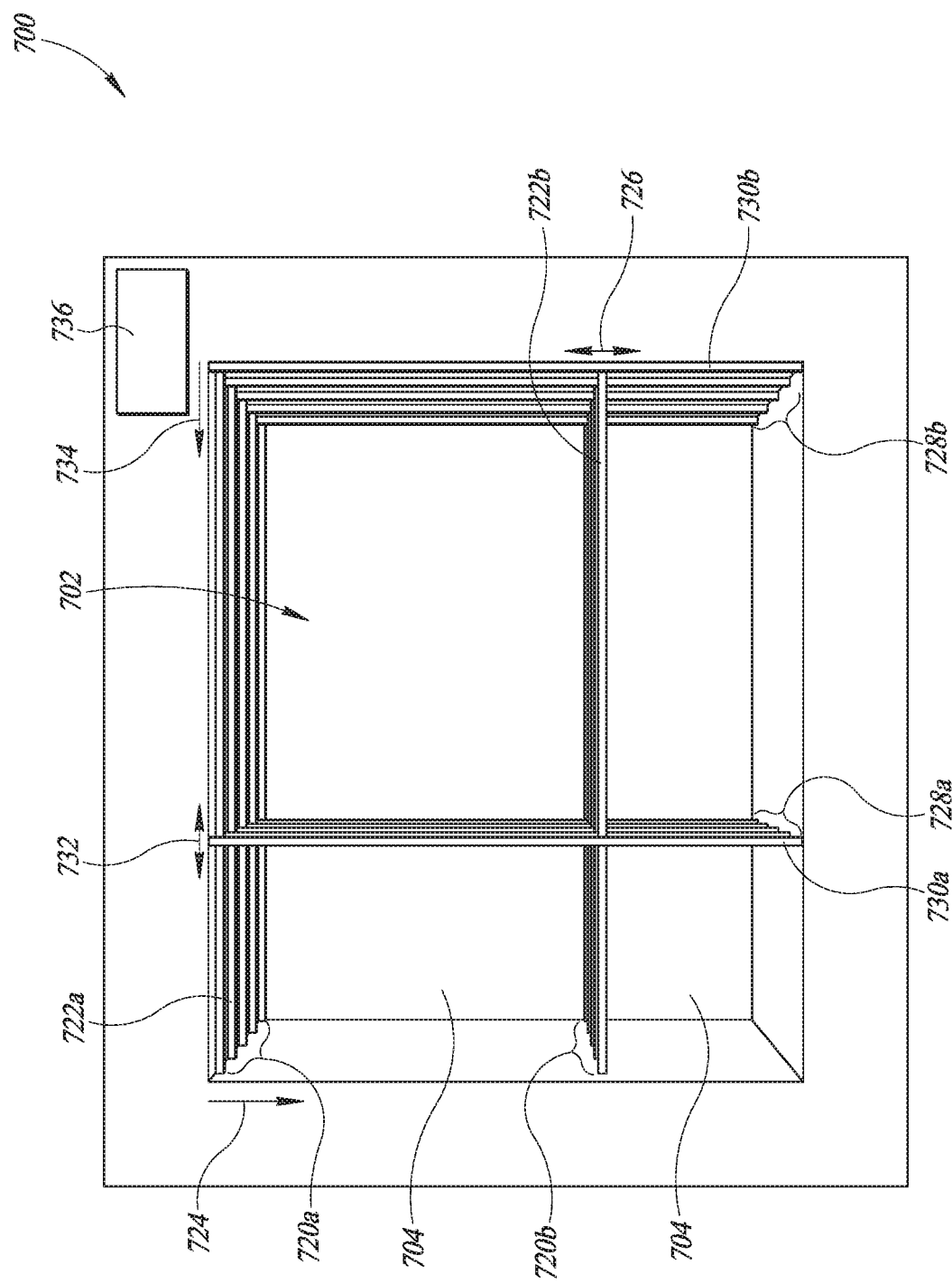
FIG. 7B is a front perspective view of the locker system of FIG. 7A in which the configurable compartments are arranged in a second exemplary arrangement, according to at least one illustrated implementation.
Figure 7C:
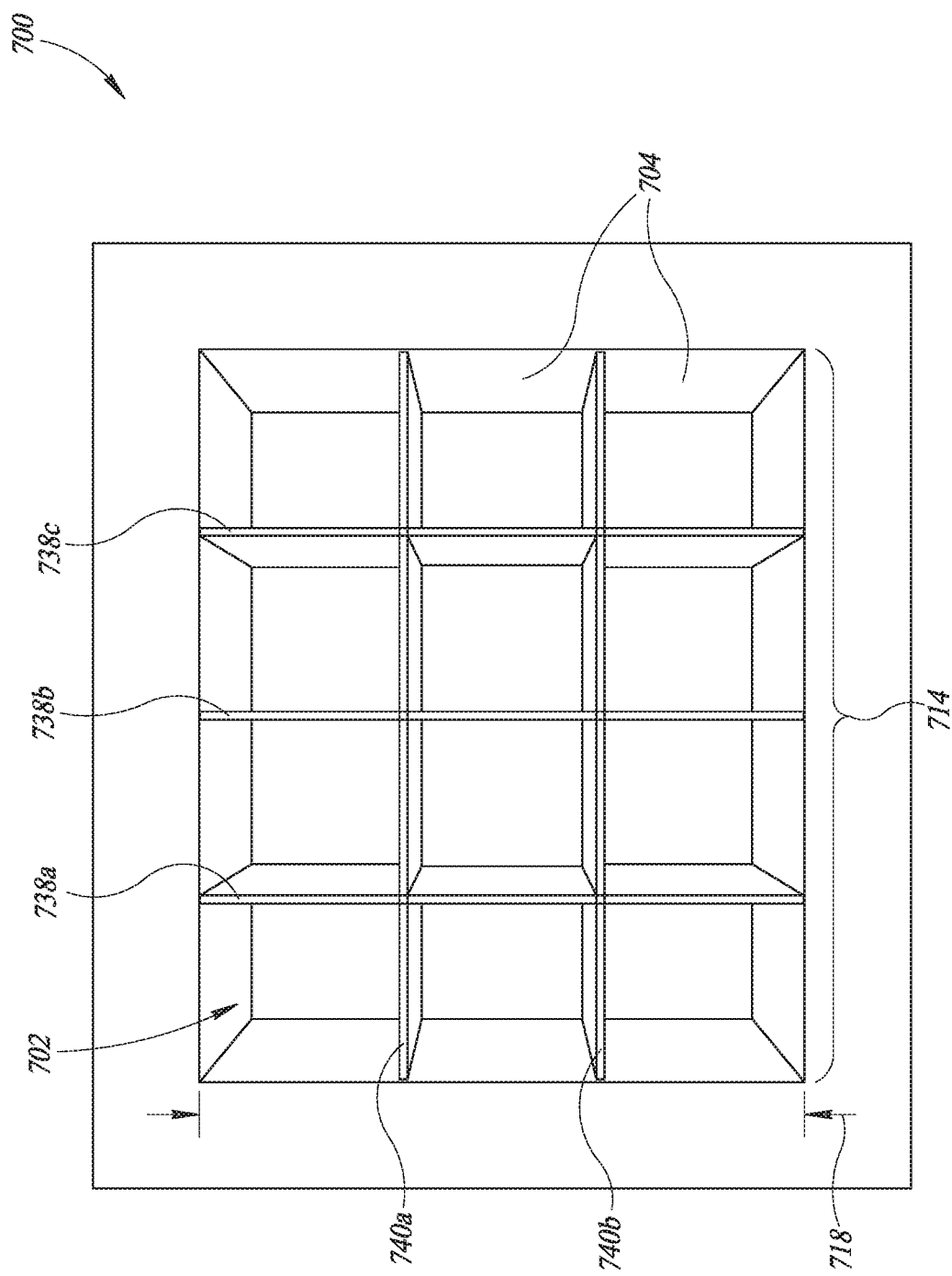
FIG. 7C is a front perspective view of a lock system in which the configurable compartments may be selectively, manually configured, according to at least one illustrated implementation.

FIGS. 7A, 7B, and 7C show a locker system 700 that has an interior 702 that includes a set of configurable compartments 704, according to at least one illustrated implementation. The interior 702 of the locker system 700 may include one or more side walls 706, a back wall 708, a top surface 710, and a bottom surface 712. The interior 702 may have a length 714 that extends between two opposing side walls 706, a depth 716 that extends from the back wall 708 to a front portion of the interior 702, and a height 718 that extends from the bottom surface 712 towards the top surface 710. In some implementations, the set of configurable compartments 704 may be used in conjunction with locker system 500 in which the respective doors 502 may be variously configured. In some implementations, one or more of the side walls 706 and the back wall 708 may be solid (e.g., sheet metal, sheet of plastic). In some implementations, one or more of the side walls 706 and the back wall 708 may be a mesh (e.g., wire mesh or grid, expanded metal) with a plurality of openings. In some implementations, one or more of the side walls 706 and the back wall 708 may be perforated (e.g., perforated sheet metal, perforated sheet of plastic) with a plurality of openings. In some implementations, one or more of the side walls 706 and the back walls 708 may be comprised of bars and/or slats with intervening openings. In some implementations, some or all of the thermal insulation may be omitted, such as, for example, when the locker system 700 will not store perishable item and/or will not be used to cook food items.

The locker system 700 may include a set of selectively movable shelves 720 (e.g., first selectively movable shelf 720a and second selectively movable shelf 720b) that extend across some or all of the length 714 of the interior 702 of the locker system. The first selectively movable shelf 720a may include a first set of horizontally aligned slats 722a wherein each horizontally aligned slat 722a is separated by a distance from each adjacent slat. In such an implementation, the top portions of each horizontally aligned slat 722a are aligned within a horizontal plane to thereby form a slotted horizontal surface. The first set of horizontally aligned slats 722a may be drivingly coupled to a motor (not shown) that may move the first set of horizontally aligned slats 722a in a vertical direction 724 within the interior 702 of the locker system 700. Such movement in the vertical direction 724 may be used to modify the dimensions of at least some of the configurable compartments 704.

The second selectively movable shelf 720b may include a second set of horizontally aligned slats 722b wherein each horizontally aligned slat 722b is separated by a distance from each adjacent slat. In such an implementation, the top portions of each horizontally aligned slat 722b may be aligned within a horizontal plane to thereby form a slotted horizontal surface. In some implementations, each of the horizontally aligned slats 722b within the second set of horizontally aligned slats 722b may align in a vertical direction with a respective horizontally aligned slat 722a within the first set of horizontally aligned slats 722a. In such an implementation, the slots formed by the second set of horizontally aligned slats 722b may align with respective slots formed by the first set of horizontally aligned slats 722a. The second set of horizontally aligned slats 722b may be drivingly coupled to a motor (not shown) that may move the second set of horizontally aligned slats 722b in a vertical direction 726 within the interior 702 of the locker system 700. Such movement in the vertical direction 726 may be used to modify the dimensions of at least some of the configurable compartments 704.

In some implementations, the movement in the vertical direction 724 for the first set of horizontally aligned slats 722a may be limited to only a portion of the interior 702 of the locker system 700, and/or the movement in the vertical direction 726 for the second set of horizontally aligned slats 722b may be limited to only a portion of the interior 702 of the locker system 700. For example, in some limitations, the first set of horizontally aligned slats 722a may move within an upper portion (e.g., the upper half) of the interior 702 of the locker system 700, and the second set of horizontally aligned slats 722b may move within a lower portion (e.g., the lower half) of the interior 702 of the locker system 700 to thereby prevent any interference between the first set of horizontally aligned slats 722a and the second set of horizontally aligned slats 722b.

In some implementations, the locker system 700 may include a set of selectively movable walls 728 (e.g., first selectively movable wall 728a and second selectively movable wall 728b) that extend across some or all of the height 718 of the interior 702 of the locker system. The first selectively movable wall 728a may include a first set of vertically aligned slats 730a wherein each vertically aligned slat 730a is separated by a distance from each adjacent slat. In such an implementation, the left and right vertical edges of each vertically aligned slat 730a may be aligned within a left vertical plane and a right vertical plane, respectively. The first set of vertically aligned slats 730a may be drivingly coupled to a motor (not shown) that may move the first set of vertically aligned slats 730a in a horizontal direction 732 within the interior 702 of the locker system 700. Such movement in the horizontal direction 732 may be used to modify the dimensions of at least some of the configurable compartments 704.

In some implementations, each of the vertically aligned slats 730a may align with and pass through corresponding slots within each of the first set of horizontally aligned slats 722a and the second set of horizontally aligned slats 722b. In such an implementation, each of the first set of horizontally aligned slats 722a and the second set of horizontally aligned slats 722b may align with and pass through a slot formed within the first set of vertically aligned slats 730a. Such alignment between the first set of vertically aligned slats 730a, and each of the first set of horizontally aligned slats 722a and the second set of horizontally aligned slats 722b may be maintained even as one or more of the first set of vertically aligned slats 730a, the first set of horizontally aligned slats 722a, and the second set of horizontally aligned slats 722b are translated within the interior 702 of the locker system 700.

The second selectively movable wall 728b may include a second set of vertically aligned slats 730b wherein each vertically aligned slat 730b is separated by a distance from each adjacent slat. In such an implementation, the left and right vertical edges of each vertically aligned slat 730b may be aligned within a left vertical plane and a right vertical plane, respectively. The second set of vertically aligned slats 730b may be drivingly coupled to a motor (not shown) that may move the second set of vertically aligned slats 730b in a horizontal direction 734 within the interior 702 of the locker system 700. Such movement in the horizontal direction 734 may be used to modify the dimensions of at least some of the configurable compartments 704. In some implementations, each of the vertically aligned slats 730b within the second set of vertically aligned slats 730b may align in a horizontal direction with a respective vertically aligned slat 730a within the first set of vertically aligned slats 730a. In such an implementation, the slots formed by the second set of vertically aligned slats 730b may align with respective slots formed by the first set of vertically aligned slats 730a.

In some implementations, each of the vertically aligned slats 730b in the second set of vertically aligned slats 730b may align with and pass through corresponding slots within each of the first set of horizontally aligned slats 722a and the second set of horizontally aligned slats 722b. In such an implementation, each of the first set of horizontally aligned slats 722a and the second set of horizontally aligned slats 722b may align with and pass through a slot formed within the second set of vertically aligned slats 730b. Such alignment between the second set of vertically aligned slats 730b, and each of the first set of horizontally aligned slats 722a and the second set of horizontally aligned slats 722b may be maintained even as one or more of the second set of vertically aligned slats 730b, the first set of horizontally aligned slats 722a, and the second set of horizontally aligned slats 722b are translated within the interior 702 of the locker system 700.

In some implementations, the movement in the vertical direction 724 for the first set of horizontally aligned slats 722a may be limited to only a portion of the interior 702 of the locker system 700, and/or the movement in the vertical direction 726 for the second set of horizontally aligned slats 722b may be limited to only a portion of the interior 702 of the locker system 700. For example, in some limitations, the first set of horizontally aligned slats 722a may move within an upper portion (e.g., the upper half) of the interior 702 of the locker system 700, and the second set of horizontally aligned slats 722b may move within a lower portion (e.g., the lower half) of the interior 702 of the locker system 700 to thereby prevent any interference between the first set of horizontally aligned slats 722a and the second set of horizontally aligned slats 722b.

The movement of the selectively movable shelves 720 and/or the selectively movable walls 728 may be controlled by a processor-enabled component 736 that may take the form of any current or future developed processor-enabled device capable of executing one or more instruction sets. The processor-enabled component 736 may include one or more processing units to execute one or more processor-readable instructions, instruction sets, or instruction blocks. The processor-enabled component 736 may include a system memory to store one or more processor-readable instructions, instruction sets, or instruction blocks to be executed by the processor. Such processor-readable instructions, instruction sets, or instruction blocks may be used to generate one or more control signals that may be used to control the movement of the selectively movable shelves 720 and/or the selectively movable walls 728. In some implementations, the processor-enabled component 736 may be implemented by an on-board locker control system 554 (FIG. 5). In some implementation, some or all of the processor-readable instructions, instruction sets, or instruction blocks may be executed by an off-board processor-enabled device. In such an implementation, the resulting control signals may be transmitted to the vending kiosk via a communication network.

As shown in FIG. 7C, the locker system 700 may include a set of selectively manually removable walls 738 (e.g., first selectively manually removable wall 738a, second manually selectively removable wall 738b, and third manually selectively removable wall 738c) that extend across some or all of the height 718 of the interior 702 of the locker system. The locker system 700 may include a set of selectively manually removable shelves 740 (e.g., first selectively manually removable shelf 740a and second selectively manually removable shelf 740b) that may extend across some or all of the length 714 of the interior 702 of the locker system. At least a portion of at least one of the selectively manually removable walls 738 and/or selectively manually removable shelves 740 may be removed to configure the configurable compartments 704 of various sizes. Such sizes may be based for example upon the size of the items to be placed in one or more of the configurable compartments 704. The portions of the selectively manually removable walls 738 and/or the selectively manually removable shelves 740 may be removed by a user, worker, or other person to configure the configurable compartments 704 of the desired size.

Figure 8A:
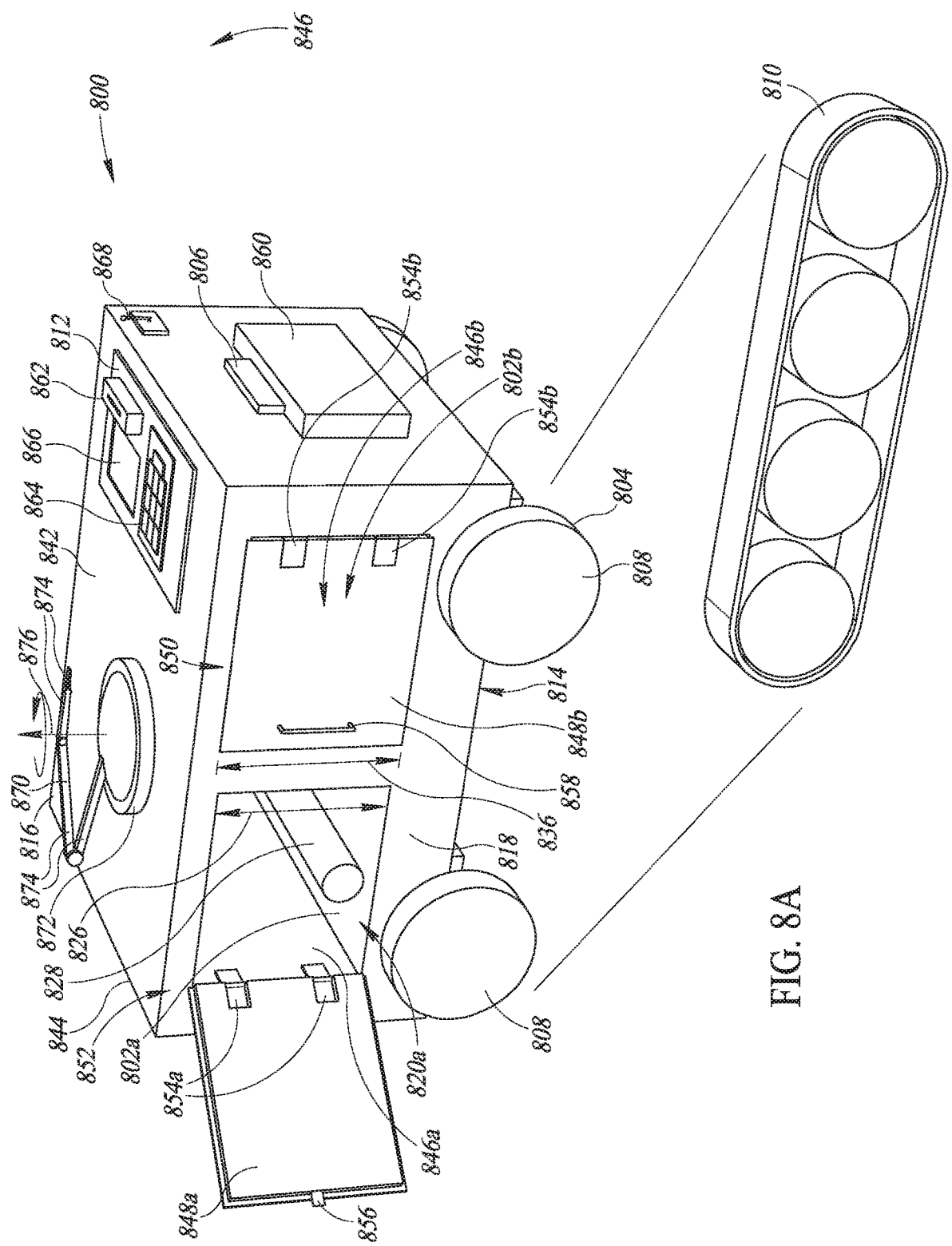
FIG. 8A is top, right, front isometric view of a self-propelled delivery robot that includes two thermally insulated compartments each accessible via a respective door, according to at least one illustrated implementation.
Figure 8B:
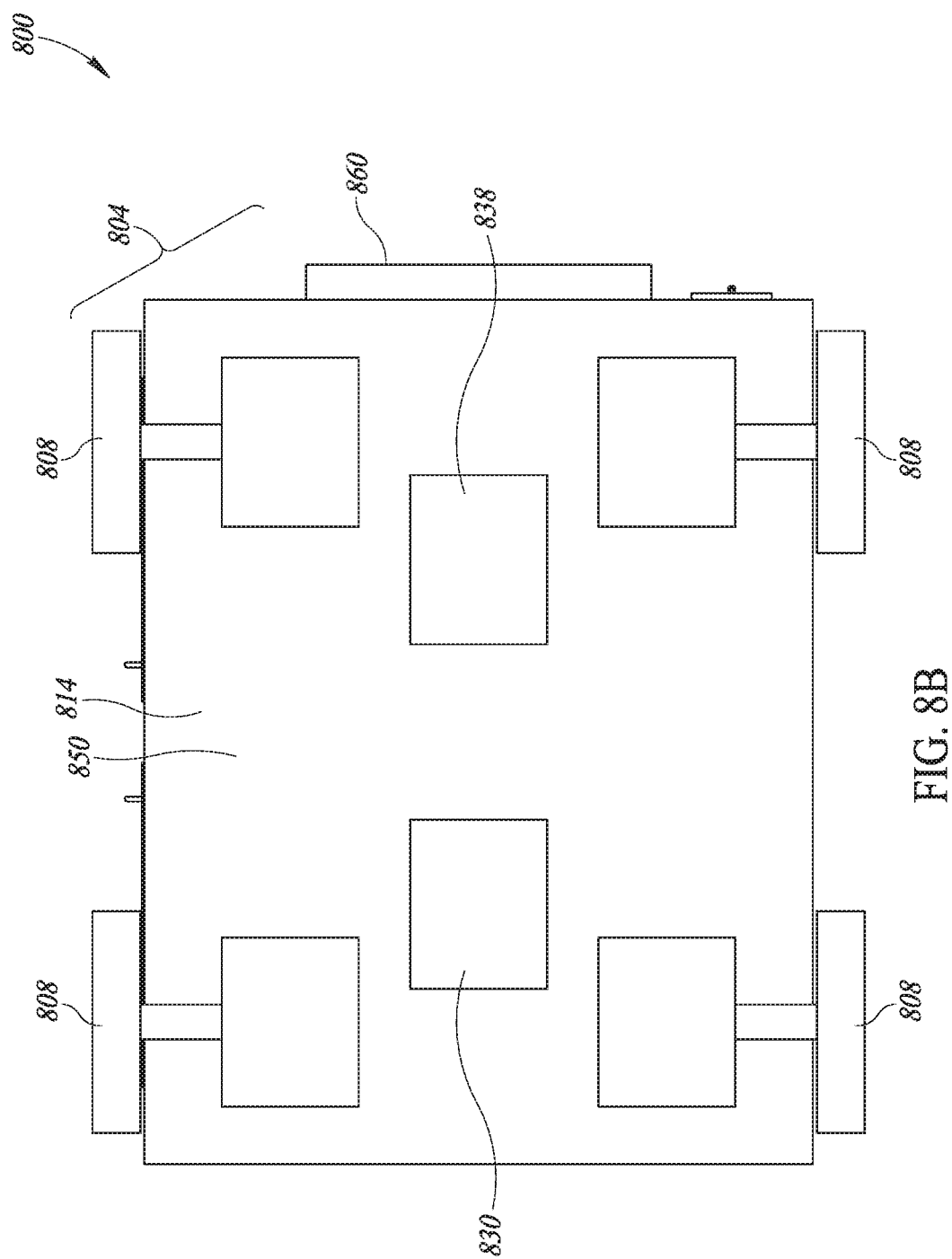
FIG. 8B is bottom plan view of the self-propelled delivery robot of FIG. 8A, according to at least one illustrated implementation.
Figure 8C:
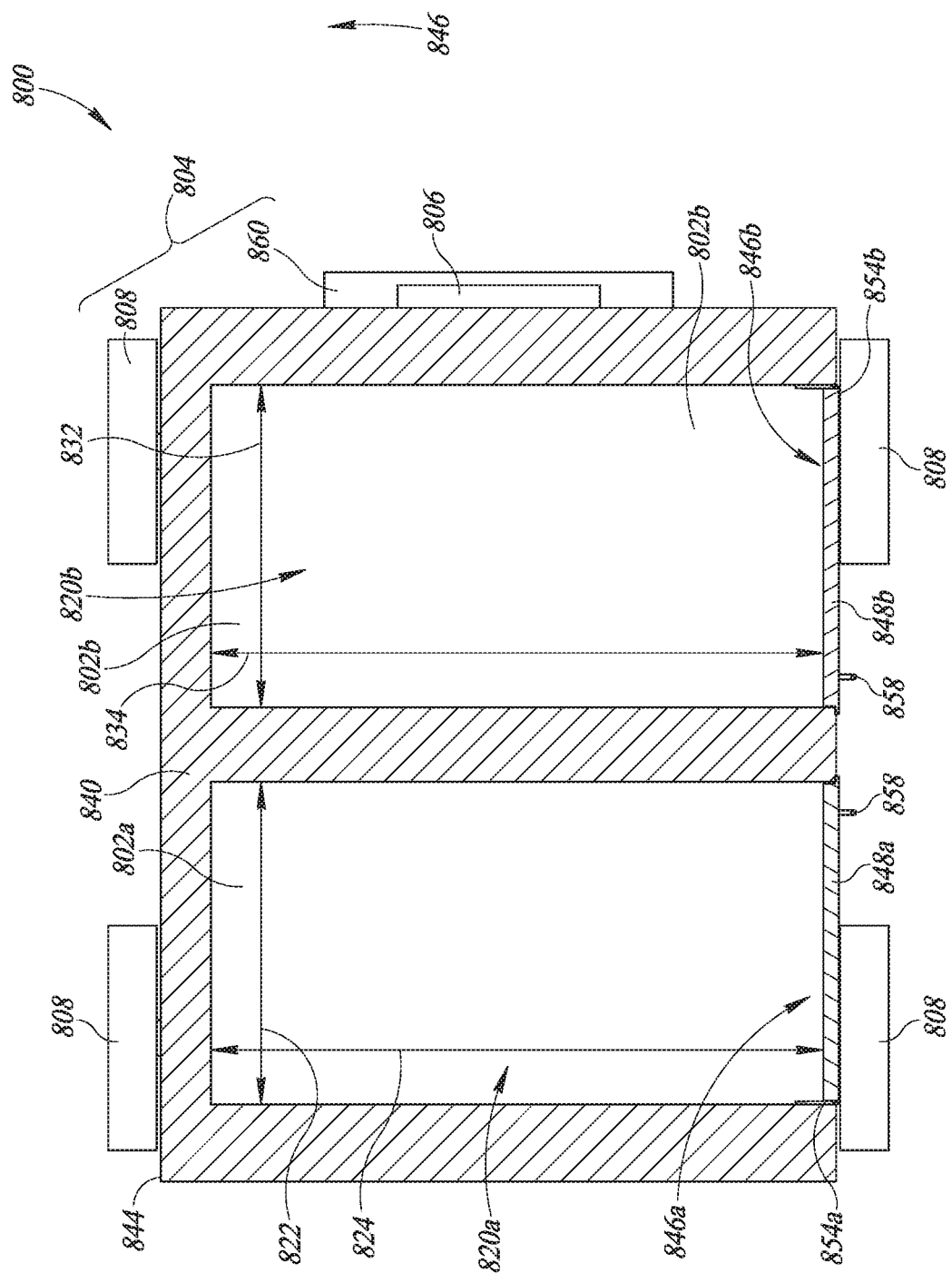
FIG. 8C is schematic view of an interior portion of the self-propelled delivery robot of FIG. 8A, according to at least one illustrated implementation.

FIG. 8A, FIG. 8B, and FIG. 8C show a self-propelled delivery robot 800 that includes a first thermally insulated compartment 802a and a second thermally insulated compartment 802b that may be used to carry items, such as food items, for delivery, according to at least one illustrated implementation. In some implementations, the self-propelled delivery robot 800 may further include a propulsion subsystem 804, an on-board self-propelled delivery robot control subsystem 806, and a user input subsystem 812. The self-propelled delivery robot 800 may include a bottom surface 814, an opposing top surface 816, and one or more sidewalls 818 that extend between the bottom surface 814 and the top surface 816.

The first thermally insulated compartment 802a may have a first interior 820a that includes a width 822, a depth 824, and a height 826. In some implementations, the first interior 820a may be sized and dimensioned to contain a first food item 828. In some implementations, a heater 830 may be used to increase the temperature of the first interior 820a of the first thermally insulated compartment 802a to a heated state. The heater 830 may include one or more of an electrically resistive heating element, a natural gas burner, a propane burner, and/or an inductive heating element. In some implementations, the heater 830 may be positioned, for example, along the bottom surface 814 of the self-propelled delivery robot 800. In some implementations, the heater 830 may include a heater opening through which heat may be introduced to the first interior 820a of the first thermally insulated compartment 802a. In some implementations, a fan may be used to direct heated air into the first interior 820a of the first thermally insulated compartment 802a through the heater opening.

In some implementations, the heated state provided by the heater 830 may include a cooking state in which the heater 830 may raise the temperature in the first interior 820a of the first thermally insulated compartment 802a to at least 325° F. to cook an item of food stored in the compartment. In some implementations, the heated state provided by the heater 830 may include a heating state in which the heater 830 may be operable to raise the temperature in the first interior 820a of the first thermally insulated compartment 802a to between 140° F. and 250° F. to warm an already cooked item of food stored in the first interior 820a. In some implementations, the heater 830 may be operable transition between the cooking state and the warming state based upon one or more signals, such as signals that may be transmitted by a processor-enabled device.

The second thermally insulated compartment 802b may have a second interior 820b that includes a width 832, a depth 834, and a height 836. In some implementations, the second interior 820b may be sized and dimensioned to contain a second food item (not shown). In some implementations, a cooler 838 may be used to decrease the temperature of the second interior 820b of the second thermally insulated compartment 802b to a cooled state. The cooler 838 may include one or more of a refrigerant carrying coil and compressor, a Peltier device, or thermoelectric cooler. In some implementations, the cooler 838 may be positioned, for example, along the bottom surface 814 of the self-propelled delivery robot 800. In such an implementation, the cooler 838 may include a cooler opening (not shown) through which cooled, refrigerated air may be introduced to the second interior 820b of the second thermally insulated compartment 802b to thereby lower the temperature of the second interior 820b to a refrigerated state. In some implementations, a fan may be used to direct the refrigerated air into the second interior 820b of the second thermally insulated compartment 802b. In some implementations, the refrigerated state provided by the cooler 838 may lower the temperature within the second interior 820b of the second thermally insulated compartment 802b to at or below 41° F. to cool the second food item stored in the compartment. The first thermally insulated compartment 802a and the second thermally insulated compartment 802b may be separated by a thermally insulating barrier 840 that inhibits the transfer of heat between the first thermally insulated compartment 802a and the second thermally insulated compartment 802b. In such an implementation, the first thermally insulated compartment 802a may be used to transport a hot food item (e.g., an entrée) to an end user, whereas the second thermally insulated compartment 802b may be used to transport a chilled food item (e.g., a beverage and/or a salad) to the same or a different end user.

In some implementations, each of the first thermally insulated compartment 802a and the second thermally insulated compartment 802b may be surrounded by a container 842. Such a container 842 may include an exterior surface 844 that separates each of the first thermally insulated compartment 802a and the second thermally insulated compartment 802b from an exterior 845 of the self-propelled delivery robot 800. In some implementations, the exterior surface 844 may be delineated by one or more of the bottom surface 814, the top surface 816, and the sidewalls 818 of the self-propelled delivery robot 800. In some implementations, one or more openings 846 (e.g., first opening 846a and second opening 846b) may provide an aperture or path between the exterior 845 of the self-propelled delivery robot 800 and the interiors 820 of respective thermally insulated compartments 802 (e.g., the first interior 820a of the first thermally insulated compartment 802a, and the second interior 820b of the second thermally insulated compartment 802b, respectively).

In some implementations, a set of one or more doors 848 (e.g., first door 848a and second door 848b, collectively, doors 848) may be physically coupled to the self-propelled delivery robot 800. As such, each door 848 in the set of doors 848 may be associated with a respective one of the openings 846 for one of the thermally insulated compartments 802. For example, the first door 848a may be associated with the first opening 846a for the first thermally insulated compartment 802a. As such, each door 848 may be selectively, operably moved between a closed configuration 850 in which the door 848 covers the associated opening 846 thereby preventing access to the interior 820 of the respective thermally insulated compartment 802, and an open configuration 852 in which the door 848 is moved (e.g., rotated or slid) to reveal the associated opening 846 to thereby provide access to the interior 820 of respective thermally insulated compartment 802. In some implementations, the movement of the one or more doors 848 may be effected by rotating each of the one or more doors 848 about a set of one or more hinges (e.g., first set of hinges 854a and second set of hinges 854b), by sliding each of the one or more doors 848 along a set of one or more tracks (not shown). In some implementations, one or more edges of each door 848 may include a component comprised of rubber or some other compressible elastomer that may sealingly engage with a portion of the container 842 proximate the respective opening 846 associated with the respective door 848 when the door 848 is in the closed configuration to provide additional thermal insulation for the thermally insulated compartment 802.

In some implementations, one or more of the doors 848 may each include a lock 856. The lock 856 may be used to lock the associated door 848 in a closed configuration 850 to thereby prevent access to the interior 820 of the associated thermally insulated compartment 802. In some implementations, one or more actuators may be used to selectively engage the lock 856 to lock the associated door 848 in the closed configuration 850 and to selectively disengage the lock 856 to unlock the associated door 848 such that the door 848 may move from the closed configuration 850 to the open configuration 852, thereby providing access to the respective thermally insulated compartment 802. Such an actuator may include, for example, one or more of a solenoid, a piston and associated cylinder, a plurality of magnets, including at least one of which is an electromagnet, and/or an electromagnet paired with a ferrous metal. In some implementations, the actuator may be responsive to one or more actuator signals transmitted from one or more processors, as discussed below, to lock and/or unlock the associated lock 856. In some implementations, for example, the actuator may receive a signal to unlock one of the locks 856 to provide access to the interior 820 of the associated thermally insulated compartment 802 when, for example, the self-propelled delivery robot 800 reaches a delivery destination, and/or confirms the presence of an end user who is to retrieve a food item stored within one of the thermally insulated compartments 802. In some implementations, such a signal may be generated by a processor-enabled component that is located on the self-propelled delivery robot 800. In some implementations, such a signal may be generated by a processor-enabled component that is located remotely from the self-propelled delivery robot 800. In some implementations, the door 848 may be manually moveable between the open configuration 852 and the closed configuration 850 when the door 848 is unlocked with such movement facilitated, for example, by a handle 858.

The propulsion subsystem 804 may include a set of wheels 808 and/or a set of treads 810 along with at least one motor 860 may be used by the self-propelled delivery robot 800 to travel across a geographic area. In some implementations, the motor 860 may be drivingly coupled to one or more wheels in the set of wheels 808, and used to drive the set of wheels 808 in an autonomous robot mode or in a semi-autonomous robot mode. The motor 860 may be any type of motor that may be used to drive the set of wheels 808, such as an electric motor, a gasoline-powered motor, a natural gas-powered motor, or any other type of similar motor. In some implementations, the set of treads 810 may be drivingly coupled to the motor 860 and used to travel over a physical terrain. In such implementations, the set of treads 810 may provide improved stability when traveling over uneven terrain as compared to the set of wheels 808.

In some implementations, in the autonomous robot mode, the self-propelled delivery robot 800 may be provided with destination information (e.g., destination location and/or route information), and the self-propelled delivery robot 800 may navigate to the destination without any control or supervision by a human. In such an implementation, the self-propelled delivery robot 800 may use one or more sensors to collect information about the surroundings of the self-propelled delivery robot 800. Based upon the collected information, one or more control systems on the self-propelled delivery robot 800 may determine what actions the self-propelled delivery robot 800 should take in response in order to continue traveling towards the destination location.

In some implementations, in the semi-autonomous vehicle mode, the self-propelled delivery robot 800 may be subject to at least some control and/or supervision by a human. In such an implementation, for example, the self-propelled delivery robot 800 may use one or more sensors to collect information about the surroundings of the self-propelled delivery robot 800. A human controller may have the ability to review the collected information and control the navigation of the self-propelled delivery robot 800 based upon this collected information. In some implementations, the human controller may intervene to control the self-propelled delivery robot 800 in limited situations, such as, for example, when a control system on the self-propelled delivery robot 800 cannot identify a next action to take in a given situation.

The user input subsystem 812 may be used to collect information related to an item, such as a food item, stored within one of the thermally insulated compartments 802 of the self-propelled delivery robot 800. In some implementations, for example, the user input subsystem 812 may include one or more of a card reader 862, a keypad/touchscreen 864, and/or a biometric capture device 866. In some implementations, the card reader 862 may be used to read and collect information that has been encoded within a financial transaction card using, for example, a magnetic stripe, a card chip, or some other type of storage medium. The card reader 862 may be communicatively coupled to one or more processors that may authorize a requested purchase transaction based upon information stored within and/or associated with the financial transaction card. Such one or more processors may be located locally on the self-propelled delivery robot 800, such as part of the on-board self-propelled delivery robot control subsystem 806, and/or remotely from the self-propelled delivery robot 800 at one or more processor-enabled devices that may be communicatively coupled to the self-propelled delivery robot 800 via a communications network.

The keypad/touchscreen 864 may be used to enter information related to an item stored within one or more of the thermally insulated compartments 802. In such an implementation, for example, the keypad/touchscreen 864 may be used to enter a key code that may associated with a purchase transaction and/or order to be retrieved from one of the thermally insulated compartments 802. In some implementations, the key code may include an order identifier that may be associated with the purchase transaction and may be comprised of a unique code that is associated with the order to be retrieved from self-propelled delivery robot 800. In some implementations, the order identifier may be a randomly generated identifier that is not related to the order identifiers associated with other items being transported by the self-propelled delivery robot 800. Such a randomly generated identifier may be used, for example, to prevent orders from being stolen, and to reduce the possibility that an order entry that has been mis-entered will nonetheless provide access to a thermally insulated compartment 802 associated with another order. In some implementations, the key code may additionally or alternatively include a customer identifier that may be associated with the customer who will be retrieving the order from the self-propelled delivery robot 800.

The biometric capture device 866 and associated software may be used to identify consumers based upon one or more physical characteristics. Such physical characteristics may include, for example, one or more of fingerprints, facial features, eye feature, vocal characteristics, and/or any other unique physical characteristic of the consumer. In some implementations, such software may be implemented by one or more processor-enabled devices, including processor-enabled devices that may be communicatively coupled to the self-propelled delivery robot 800 via a communications network. Once the biometric capture device 866 and associated software has identified the consumer, the processor-enable device may transmit one or more signals that may result in the appropriate door 848 on the self-propelled delivery robot 800 being unlocked for the consumer.

The self-propelled delivery robot 800 may include an antenna 868 that may be used to provide wireless communication capabilities for the self-propelled delivery robot 800. In some implementations, for example, the antenna 868 may be used to communicate using wireless communications protocols, such as protocols for wireless local area networks (e.g., WIFI®, IEEE 802.11, WiMAX, IEEE 802.116, VoIP, and the like) or protocols for wireless peer-to-peer communications (e.g., Bluetooth®, Bluetooth® Low Energy, and the like).

In some implementations, the antenna 868 may be used to wirelessly communicate with objects or devices that are proximate the self-propelled delivery robot 800. For example, in some implementations, the antenna 868 may be used to provide near field communication (NFC) capabilities and/or radio frequency identification (RFID) capabilities with device and objects proximate the self-propelled delivery robot 800. Such device may include wireless devices associated with consumers who have authorized purchase transaction. In such implementations, the wireless device of the consumer may be with four (4) inches of the antenna 868 for the antenna 868 to receive NFC signals and/or within nine (9) feet of the antenna 868 for the antenna 868 to receive RFID signals. Such NFC signals and/or RFID signals may be used to encode information to authorize a purchase transaction and/or to confirm that a person or device logically associated with a previous purchase transaction is proximate the self-propelled delivery robot 800. The antenna 868 may be communicatively coupled to a processor-enabled device that may decode the information contained with the NFC signal and/or RFID signal, and use the decoded information to provide such authorization and/or confirmation. Upon determining such authorization and/or confirmation, the processor-enabled device may transmit one or more actuator control signals to unlock the appropriate door 848 on the self-propelled delivery robot 800 so that the consumer may retrieve the purchased item from the associated thermally insulated compartment 802.

In some implementations, the self-propelled delivery robot 800 may include a transfer assembly 870 that may be used to transfer items between the first thermally insulated compartment 802a and the second thermally insulated compartment 802b. In some implementations, for example, the transfer assembly 870 may include a rotatable platform 872 and one or more hinged and/or rotatable robotic arms 874. In such an implementation, the rotatable platform 872 may be used to rotate the hinged and/or rotatable robotic arms 874 about a vertical axis of rotation 876 that extends perpendicularly from the top surface 816 of the self-propelled delivery robot 800. As such, the rotatable platform 872 may be used to position the hinged and/or rotatable robotic arms 874 relative to at least one of a first opening associated with the first thermally insulated compartment 802a and/or a second opening associated with the second thermally insulated compartment 802b. Once positioned, the hinged and/or rotatable robotic arms 874 may be operable to extend past the top surface 816 of the self-propelled delivery robot 800 and reach into one of the first thermally insulated compartment 802a or the second thermally insulated compartment 802b to retrieve an item. The hinged and/or rotatable robotic arms 874 may then be used to transfer the retrieved item to the other thermally insulated compartment 802. In some implementations, the hinged and/or rotatable robotic arms 874 of the transfer assembly 870 may be used to retrieve an item from one of the thermally insulated compartments 802 and provide the retrieved item to an end user, such as, for example, when the end user has confirmed a purchase transaction. As such, the transfer assembly 870 may be used to reduce the interactions between the end user and the thermally insulated compartments 802, to thereby reduce wear and tear on the thermally insulated compartments 802.

The on-board self-propelled delivery robot control subsystem 806 may take the form of any current or future developed processor-enabled device capable of executing one or more instruction sets. The on-board self-propelled delivery robot control subsystem 806 may include one or more processing units to execute one or more processor-readable instructions, instruction sets, or instruction blocks. The on-board self-propelled delivery robot control subsystem 806 may include a system memory to store one or more processor-readable instructions, instruction sets, or instruction blocks to be executed by the processor. Such processor-readable instructions, instruction sets, or instruction blocks may be used to generate one or more control signals that may be used to control the various components of the self-propelled delivery robot 800, such as the locks 856. In some implementations, the processor-readable instructions, instruction sets, or instruction blocks may control the operation of various subsystems or components on the vending kiosk, such as various components of the propulsion subsystem 806, user input subsystem 812, the heater 830, the cooler 838, and/or the transfer assembly 870. In some implementations, the on-board self-propelled delivery robot control subsystem 806 may be used to communicate using one or more using wireless communications protocols via the antenna 868. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 9:
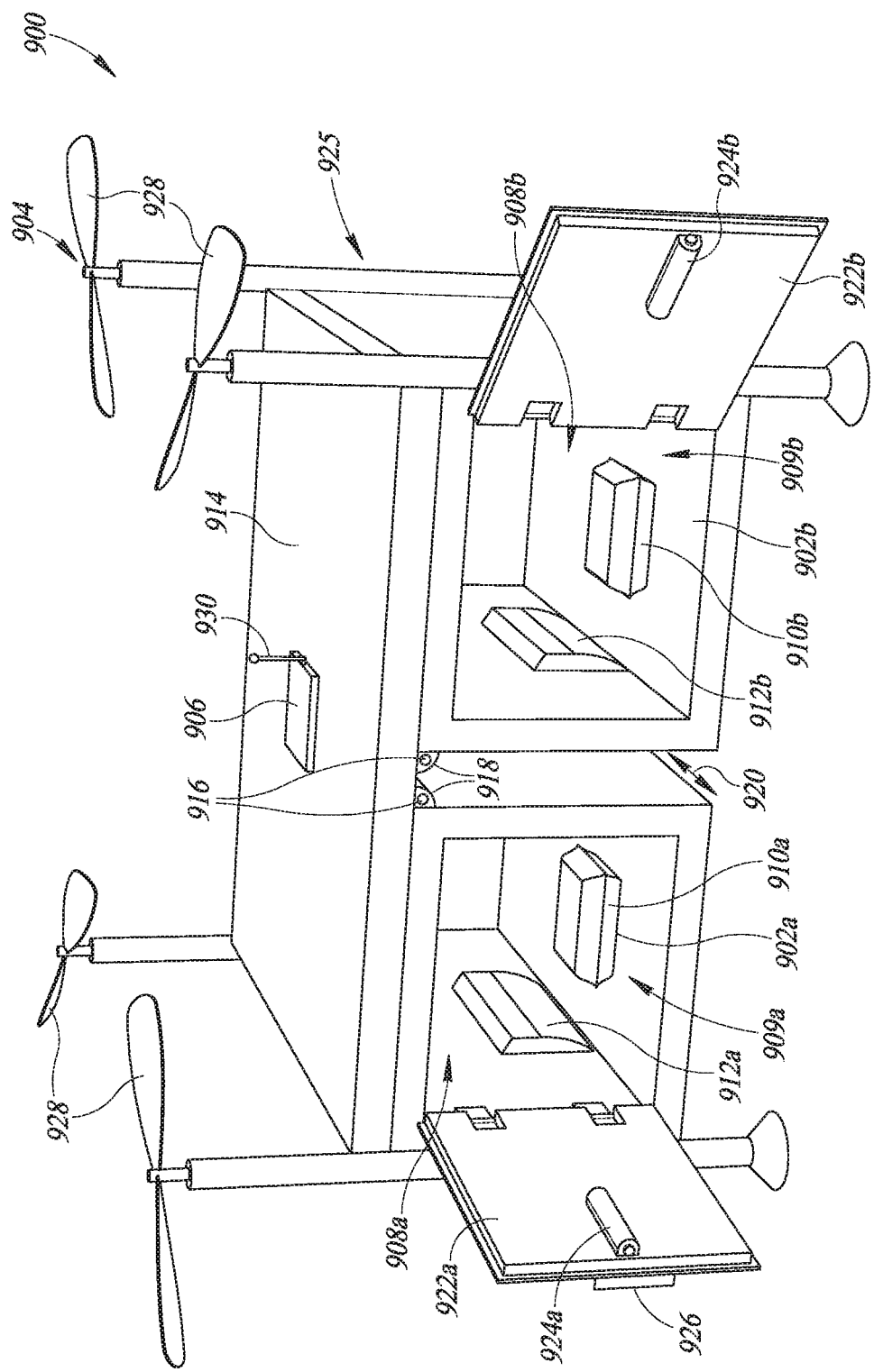
FIG. 9 is a front, top, right isometric view of a self-propelled delivery robot that is an aerial delivery drone, according to at least one illustrated implementation.

FIG. 9 shows a version of a self-propelled delivery robot that is an aerial delivery drone 900, according to at least one illustrated implementation. The aerial delivery drone 900 may include a first thermally insulated compartment 902a and a second thermally insulated compartment 902b that may be used to carry items, such as food items, for delivery, according to at least one illustrated implementation. In some implementations, the aerial delivery drone 900 may further include a propulsion subsystem 904, and an on-board aerial delivery drone controller subsystem 906.

The first thermally insulated compartment 902a may have a first interior 908a that may be sized and dimensioned to contain a first food item 910a. In some implementations, a first holder 912a may be used to hold a hot or cold pack that may be used to maintain the temperature within the first thermally insulated compartment 902a at an increased or decreased, respectively, temperature. Such a hot or cold pack may be inserted into an opening of the first holder 912a, and used to warm or refrigerate the first interior 908a depending upon the first food item 910a. The first interior 908a may be accessed by a first opening 909a.

The second thermally insulated compartment 902b may have a second interior 908b that may be sized and dimensioned to contain a second food item 910b. In some implementations, a second holder 912b may be used to hold a hot or cold pack that may be used to maintain the temperature within the second thermally insulated compartment 902b at an increased or decreased, respectively, temperature. Such a hot or cold pack may be inserted into an opening of the second holder 912b, and used to warm or refrigerate the second interior 908b. The second interior 908b may be accessed by a second opening 909b.

In some implementations, one or both of the first thermally insulated compartment 902a and/or the second thermally insulated compartment 902b may be selectively, physically coupled to a platform 914 that may be coupled to the propulsion subsystem 904. In such an implementation, one or both of the first thermally insulated compartment 902a and/or the second thermally insulated compartment 902b may be selectively removed from the aerial delivery drone 900. For example, in some implementations, the thermally insulated compartments 902 may be physically coupled to the platform 914 via one or more protrusions 916 that extend horizontally outward from the rest of the thermally insulated compartment 902 proximate a top portion of the thermally insulated compartment 902. Such protrusions 916 may be sized and dimensioned to slide into corresponding openings formed by extensions 918 that extend outward from the platform 914. The thermally insulated compartment 902 may thereby be physically coupled and secured to the platform 914 by aligning the protrusions 916 on the thermally insulated compartment 902 with the corresponding openings formed by the extensions 918 from the platform 914 and sliding the thermally insulated compartment 902 in a horizontal direction 920 to engage each protrusion 916 within the opening formed by the corresponding extension 918. The thermally insulated compartment 902 may be de-coupled from the aerial delivery drone 900 by sliding the thermally insulated compartment 902 in the opposite direction until the protrusions 916 are no longer engaged with the corresponding extensions 918. In such an implementation, thermally insulated compartments 902 may be pre-loaded with the appropriate food item while the aerial delivery drone 900 is at another location (e.g., making another delivery). Once the aerial delivery drone 900 is present, the aerial delivery drone 900 can be quickly turned for a new delivery by physically de-coupling and quickly removing any empty thermally insulated compartments 902, and coupling and quickly securing the pre-loaded thermally insulated compartment 902 to the aerial delivery drone 900.

In some implementations, a set of one or more doors 922 (e.g., first door 922a and second door 922b, collectively, doors 922) may be physically coupled to respective ones of the thermally insulated compartments 902. Each door 922 may be selectively, operably moved between a closed configuration (not shown) in which the door 922 covers the associated opening 909 thereby preventing access to the interior 908 of the respective thermally insulated compartment 902, and an open configuration 925 in which the door 922 is moved (e.g., rotated or slid) to reveal the associated opening 909 to thereby provide access to the interior 908 of respective thermally insulated compartment 902. In some implementations, one or more edges of each door 922 may include a component comprised of rubber or some other compressible elastomer that may sealingly engage with a portion of the thermally insulated compartment 902 proximate the respective opening 909 when the door 922 is in the closed configuration to provide additional thermal insulation for the thermally insulated compartment 902.

In some implementations, one or more of the doors 922 may each include a lock 924 (e.g., first lock 924a on the first door 922a and second lock 924b on the second door 922b). The lock 924 may be used to lock the associated door 922 in a closed configuration to thereby prevent access to the interior 908 of the associated thermally insulated compartment 902. In some implementations, one or more actuators may be used to selectively engage the lock 924 to lock the associated door 922 in the closed configuration and to selectively disengage the lock 924 to unlock the associated door 922 such that the door 922 may move from the closed configuration to the open configuration 852, thereby providing access to the respective thermally insulated compartment 902. Such an actuator may include, for example, one or more of a solenoid, a piston and associated cylinder, a plurality of magnets, including at least one of which is an electromagnet, and/or an electromagnet paired with a ferrous metal. In some implementations, the actuator may be responsive to one or more actuator signals transmitted from one or more processors, as discussed below, to lock and/or unlock the associated lock 924. In some implementations, for example, the actuator may receive a signal to unlock one of the locks 924 to provide access to the interior 908 of the associated thermally insulated compartment 902 when, for example, the aerial delivery drone 900 reaches a delivery destination, and/or confirms the presence of an end user who is to retrieve a food item stored within one of the thermally insulated compartments 902. In some implementations, such a signal may be generated by a processor-enabled component that is located on the aerial delivery drone 900. In some implementations, such a signal may be generated by a processor-enabled component that is located remotely from the aerial delivery drone 900, such as, for example from a remote controller network. In some implementations, the door 922 may be manually moveable between the open configuration 925 and the closed configuration when the door 922 is unlocked with such movement facilitated, for example, by a handle 926.

The propulsion subsystem 904 may include a set of rotor blades 928 that may be used to lift the aerial delivery drone 900 into the air in order to navigate to a destination location. In some implementations, the propulsion subsystem 904 may include a single rotor. In some implementations, the propulsion subsystem 904 may include multiple rotors, including implementations in which the propulsion subsystem 904 includes four rotors (e.g., quadcopter), wherein each rotor may be attached to a separate, respective fixed wing. Such a propulsion subsystem 904 may provide sufficient lift to elevate the aerial delivery drone 900 and one or more items into the air for travel. In such an implementation, the propulsion subsystem 904 may provide for vertical take-off and landing, as well as be capable of performing a soft landing to minimize disruption or possible damage to the items being transported.

In some implementations, the antenna 930 may be used to wirelessly communicate with objects or devices that are proximate the aerial delivery drone 900. For example, in some implementations, the antenna 930 may be used to provide near field communication (NFC) capabilities and/or radio frequency identification (RFID) capabilities with device and objects proximate the aerial delivery drone 900. Such device may include wireless devices associated with consumers who have authorized purchase transaction. In such implementations, the wireless device of the consumer may be with four (4) inches of the antenna 930 for the antenna 930 to receive NFC signals and/or within nine (9) feet of the antenna 930 for the antenna 930 to receive RFID signals. Such NFC signals and/or RFID signals may be used to encode information to authorize a purchase transaction and/or to confirm that a person or device logically associated with a previous purchase transaction is proximate the aerial delivery drone 900. The antenna 930 may be communicatively coupled to a processor-enabled device that may decode the information contained with the NFC signal and/or RFID signal, and use the decoded information to provide such authorization and/or confirmation. Upon determining such authorization and/or confirmation, the processor-enabled device may transmit one or more actuator control signals to unlock the appropriate door 922 on the aerial delivery drone 900 so that the consumer may retrieve the purchased item from the associated thermally insulated compartment 902.

The on-board aerial delivery drone controller subsystem 906 may take the form of any current or future developed processor-enabled device capable of executing one or more instruction sets. The on-board aerial delivery drone controller subsystem 906 may include one or more processing units to execute one or more processor-readable instructions, instruction sets, or instruction blocks. The on-board aerial delivery drone controller subsystem 906 may include a system memory to store one or more processor-readable instructions, instruction sets, or instruction blocks to be executed by the processor. Such processor-readable instructions, instruction sets, or instruction blocks may be used to generate one or more control signals that may be used to control the various components of the aerial delivery drone 900, such as the locks 924. In some implementations, the processor-readable instructions, instruction sets, or instruction blocks may control the operation of various subsystems or components on the vending kiosk, such as various components of the propulsion subsystem 904. In some implementations, the on-board aerial delivery drone controller subsystem 906 may be used to communicate using one or more using wireless communications protocols via the antenna 930. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 10:
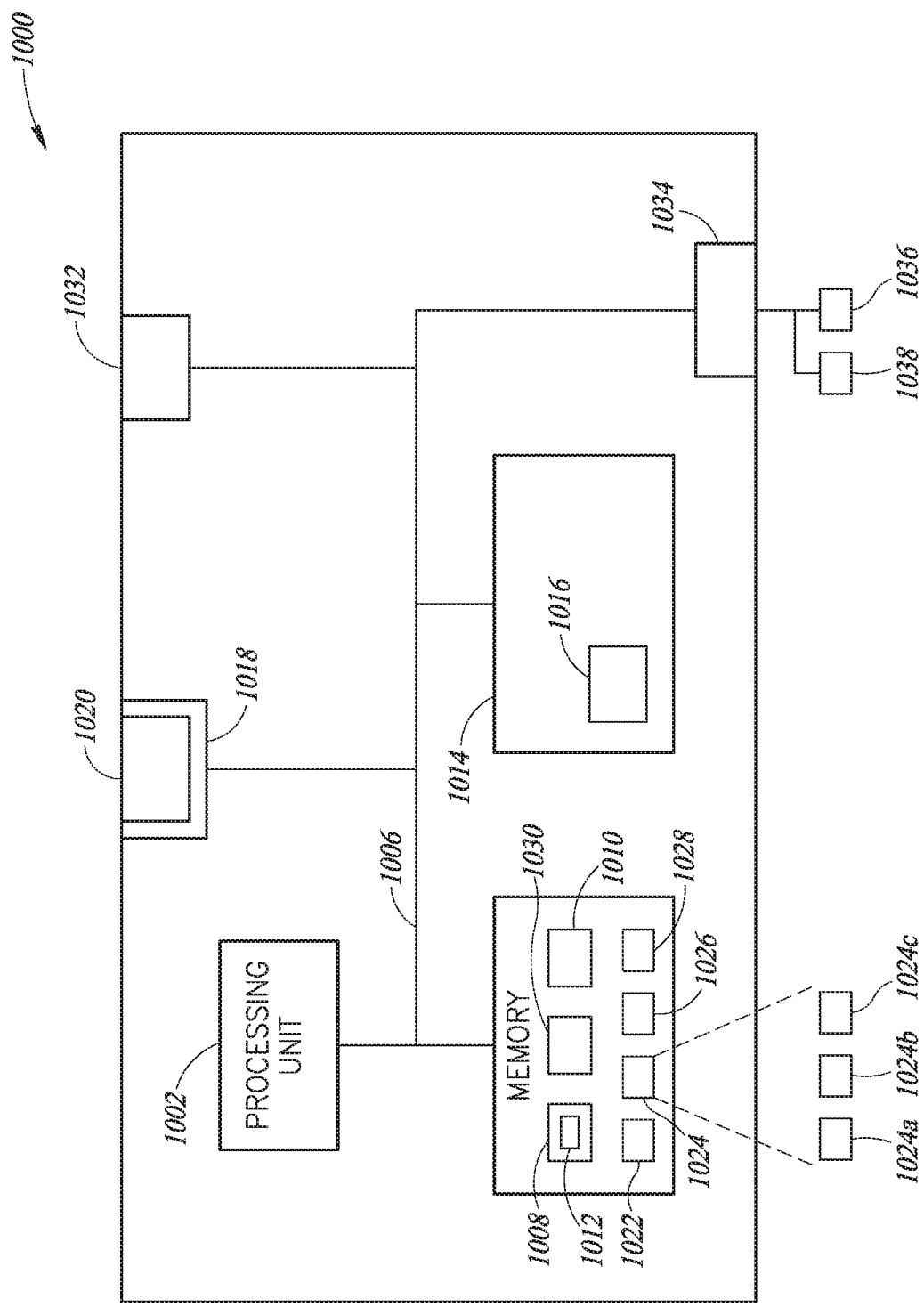
FIG. 10 is a schematic block diagram of a control system, according to at least one illustrated implementation.

FIG. 10 shows a schematic block diagram of a control system 1000, according to at least one illustrated implementation. Such a control system 1000 may be used as part of, or to implement, one or more of the on-board vending kiosk control system 166, the off-board control system 322, the on-board self-propelled control system 408, the on-board locker control system 554, the processor-enabled component 736, the on-board self-propelled delivery robot control subsystem 806, and/or the on-board aerial delivery drone controller subsystem 906.

The control system 1000 may take the form of any current or future developed computing system capable of executing one or more instruction sets. The control system 1000 includes a processing unit 1002, a system memory 1004 and a system bus 1006 that communicably couples various system components including the system memory 1004 to the processing unit 1002. The control system 1000 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 1002 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. Unless described otherwise, the construction and operation of the various blocks shown in FIG. 10 are of conventional design. As a result, such blocks need not be described in further detail herein, as they will be understood by those skilled in the relevant art.

The system bus 1006 can employ any known bus structures or architectures, including a memory bus with memory controller, a peripheral bus, and a local bus. The system memory 1004 includes read-only memory ("ROM") 1008 and random access memory ("RAM") 1010. A basic input/output system ("BIOS") 1012, which can form part of the ROM 1008, contains basic routines that help transfer information between elements within the control system 1000, such as during start-up. Some embodiments may employ separate buses for data, instructions and power.

The control system 1000 also includes one or more internal nontransitory storage systems 1014. Such internal nontransitory storage systems 1014 may include, but are not limited to, any current or future developed persistent storage device 1016. Such persistent storage devices 1016 may include, without limitation, magnetic storage devices such as hard disc drives, electromagnetic storage devices such as memristors, molecular storage devices, quantum storage devices, electrostatic storage devices such as solid state drives, and the like.

The control system 1000 may also include one or more optional removable nontransitory storage systems 1018. Such removable nontransitory storage systems 1018 may include, but are not limited to, any current or future developed removable persistent storage device 1020. Such removable persistent storage devices 1020 may include, without limitation, magnetic storage devices, electromagnetic storage devices such as memristors, molecular storage devices, and electrostatic storage devices such as secure digital ("SD") drives, USB drives, memory sticks, or the like. The one or more internal nontransitory storage systems 1014 and the one or more optional removable nontransitory storage systems 1018 communicate with the processing unit 1002 via the system bus 1006. The one or more internal nontransitory storage systems 1014 and the one or more optional removable nontransitory storage systems 1018 may include interfaces or device controllers (not shown) communicably coupled between nontransitory storage system and the system bus 1006, as is known by those skilled in the relevant art. The nontransitory storage systems 1014, 1018, and their associated storage devices 1016, 1020 provide nonvolatile storage of computer-readable instructions, data structures, program modules and other data for the control system 1000. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 1004, such as an operating system 1022, one or more application programs 1024, other programs or modules 1026, drivers 1028 and program data 1030.

The application programs 1024 may include, for example, one or more machine executable instruction sets (i.e., temperature control schedule 1024a) capable of outputting temperature control instructions to the components, e.g., heaters 208 and/or coolers 210 associated with each compartment 104 in a vending kiosk 100 and/or self-propelled kiosk 400. The application programs 1024 may include, for example, one or more machine executable instruction sets (i.e., actuator control module 1024b) capable of transmitting actuator control signals to one or more actuators that may be located in one or more of the vending kiosk 100, the self-propelled kiosk 400, the locker system 500, the self-propelled delivery robot 800, and/or the aerial delivery drone 900. The application programs 1024 may include, for example, one or more machine executable instruction sets (routing module 1024c) capable of providing routing instructions to one or more of the self-propelled kiosk 400, the self-propelled delivery robot 800, and/or the aerial delivery drone 900. In some implementations, such a routing module 1024c may determine and/or receive location information related to a destination and transmit at least one instruction to a motor (e.g., the motor 860 in the propulsion subsystem 804) that causes the motor to move a device, such as the self-propelled delivery robot 800, along a route.

The cooking instructions for the temperature control schedule 1024a can be determined by the control system 1000 using any number of inputs including at least, the food type in a particular compartment 104 and the available cooking time before each respective food item is to be picked up by a respective end user. Such cooking instructions may be executed in whole or in part by one or more controllers installed in the control system 1000. The application programs 1024 may be stored as one or more executable instructions.

In some embodiments, the control system 1000 operates in an environment using one or more of the network interfaces 1032 to optionally communicably couple to one or more remote computers, servers, display devices, such as the off-board control system 322, the mobile device 304, and/or other devices via one or more communications channels, for example, one or more networks such as the communications network 324. These logical connections may facilitate any known method of permitting computers to communicate, such as through one or more LANs and/or WANs. Such networking environments are well known in wired and wireless enterprise-wide computer networks, intranets, extranets, and the Internet.

Figure 11:
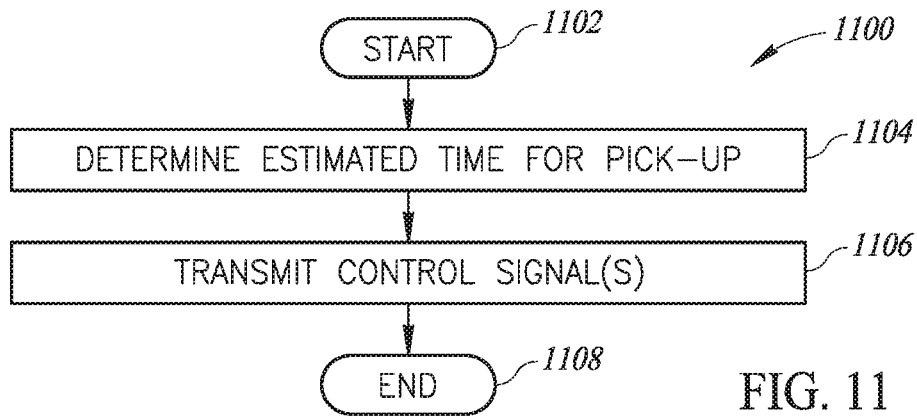
FIG. 11 is a logic flow diagram of a method of implementing a temperature control schedule, according to at least one illustrated implementation.

Further, local communication interface 1034 may be used for establishing communications with other components in a local device, such as may occur, for example, when the control system 1000 is implemented as part of a vending kiosk 100, a self-propelled kiosk 400, locker system 500, self-propelled delivery robot 800, and/or aerial delivery drone 900. For example, the local communication interface 1034 may be used to communicate temperature instructions to one or more heaters 208 or coolers 210, as may be determined, for example, according to a temperature control schedule. In some implementations, the local communication interface 1034 may be used to communicate one or more actuator signals to one or more actuators. In some implementations, the local communication interface 1034 may be communicatively coupled to navigation equipment 1036. The navigation equipment 1036 may be used, for example, to provide location and/or navigation information for upcoming routes or deliveries by the self-propelled kiosk 400, the self-propelled delivery robot 800, and/or the aerial delivery drone 900. The navigation equipment may include location tracking equipment 1038 such as receivers that can receive and determine coordinate information from a GPS and/or GLONASS positioning system, and/or from cellular towers. FIG. 11 shows a method 1100 that may be used to implement a temperature control schedule, according to at least one illustrated implementation. The method 1100 starts at 1102, at which a processor-based device, for example the control system 1000, receives a new order for a food item to be picked up at a distribution location.

At 1104, a processor-based device, for example, the control system 1000, determines an estimated time for the food item to be picked up. The estimated pick-up time at a distribution destination can take into account an estimated or expected time for the end user to arrive at the distribution destination. Such can take into account anticipated or even real-time traffic information, including slowdowns, accidents and/or detours.

At 1104, a processor-based device, for example, the control system 1000, determines a temperature control schedule that may be used to control the temperature in one or more compartments 104. The temperature control schedule may be used to activate and/or deactivate one or more of a heater 208 and a cooler 210 to heat or cool, respectively, the interior 134 of a compartment 104. Such a temperature control schedule may be used to transition the interior 134 between a refrigerated state, a cooking state, and a warming state. In some implementations, the temperature control schedule may be used to fully cook a food item using the cooking state based upon the estimated pick-up time from 1102. In such an implementation, for example, the temperature control schedule may be used to complete the cooking of the food time at the same time, or slightly before, the estimated pick up time. In some implementations, the temperature control schedule may maintain the interior 134 of the compartment 104 in a refrigerated state until transitioning the interior 134 to a cooking state to cook the food item. In some implementations, the temperature control schedule may transition the interior 134 to a warming state after the food item is fully cooked and before the food item is picked up. In some implementations, the estimated pick-up time may be continuously updated based upon changing travel conditions. The updated estimated pick-up time may be used to update the temperature control schedule such that the food item may be finished cooking close to the estimated pick-up time.

At 1106, a processor-based device, for example the control system 1000, transmits one or more control signals to implement the determined temperature control schedule from 1104. Such control signals, for example, may be transmitted to one or more actuators, such as actuators that may be used to lock one or more doors 102 that may be associated with the compartments 104 that are to transition to a cooking state. In some implementations, the one or more signals may be transmitted to one or more of the heater 208 and/or the cooler 210 to control the temperature within the interior 134 of the compartment 104.

At 1108, the method 1100 terminates, for example until invoked again. Alternatively, the method 1100 may repeat continuously or repeatedly, or may execute as multiple instances of a multi-threaded process.

Figure 12:
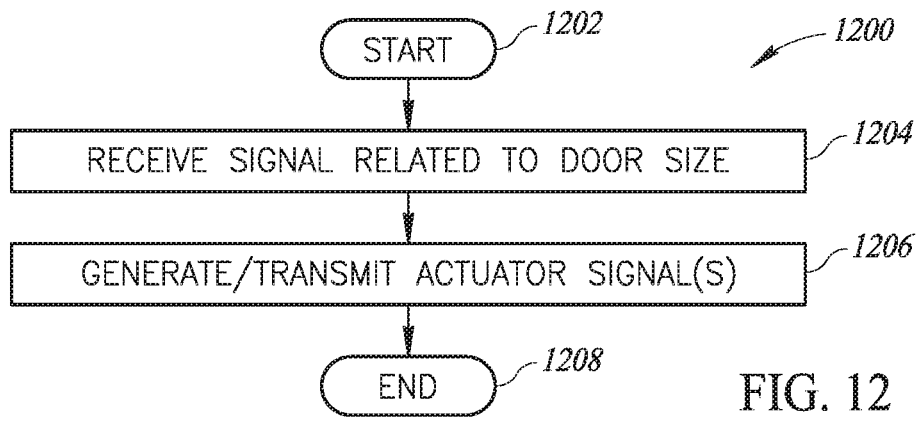
FIG. 12 is a logic flow diagram of a method of coupling multiple doors into a single door, according to at least one illustrated implementation.

FIG. 12 shows a method 1200 that may be used to modify one or more of the coupling actuators 530 to couple multiple ones of the doors 502 into a single door 540, according to at least one illustrated implementation. The method 1200 starts at 1202, at a processor-based device, for example the control system 1000.

At 1204, a processor-based device, for example, the control system 1000, receives one or more signals indicating a size for the single door 540. Such signals may be received based upon input received from a user via, for example, a user input component or device, such as a touch screen. As such, the user input may specify the number of doors 502 needed for the single door 540. In some implementations, the control system 1000 may receive other information related to the size for the single door 540, such as, for example, when an end user inputs information related to the dimensions of the item to be held. In such an implementation, the control system 1000 may determine the size of the compartment and associated single door 540 that is need to hold the item.

At 1206, a processor-based device, for example, the control system 1000, may generate and/or transmit one or more actuator signals to one or more coupling actuators 530 based upon the determination from 1204. Such actuator signals may cause each of the respective coupling actuators 530 to selectively couple multiple ones of the doors 502 into a coupled configuration 536 to create a single door 540.

At 1208, the method 1200 terminates, for example until invoked again. Alternatively, the method 1200 may repeat continuously or repeatedly, or may execute as multiple instances of a multi-threaded process.

Figure 13:
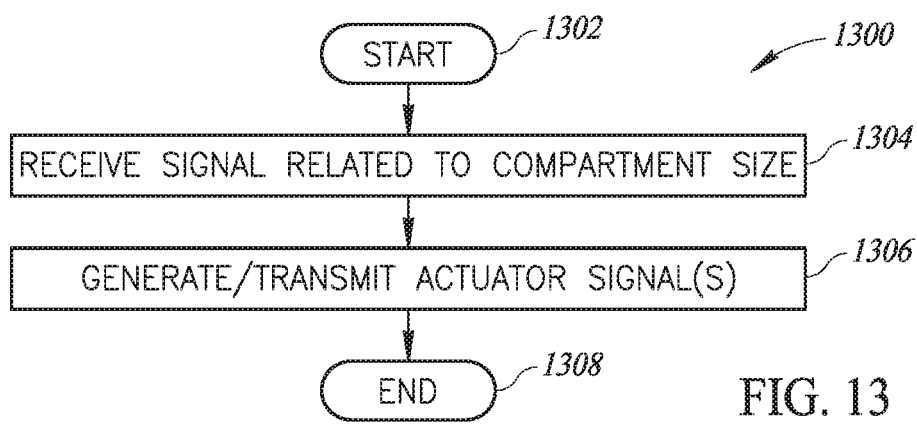
FIG. 13 is a logic flow diagram of a method of configuring a configurable compartment using one or more of the selectively movable shelves and/or the selectively movable walls, according to at least one illustrated implementation.

FIG. 13 shows a method 1300 that may be used to modify one or more of the selectively movable shelves 720 and/or the selectively movable walls 728 for a configurable compartment 704. The method 1300 starts at 1302, at a processor-based device, for example the control system 1000.

At 1304, a processor-based device, for example, the control system 1000, receives one or more signals indicating a size for the configurable compartment 704. Such signals may be received based upon input received from a user via, for example, a user input component or device, such as a touch screen. As such, the user input may specify the size of the configurable compartment 704. In some implementations, the control system 1000 may receive other information related to the size for the configurable compartment 704, such as, for example, when an end user inputs information related to the dimensions of the item to be held within the configurable compartment 704. In such an implementation, the control system 1000 may determine the size of the configurable compartment 704 that is needed to hold the item.

At 1306, a processor-based device, for example, the control system 1000, generates and transmits one or more actuator signals to one or more actuators used to control the position of one or more of the selectively movable shelves 720 and/or the selectively movable walls 728. Such actuator signals may be based upon the determination from 1304. Such actuator signals may cause each of the selectively movable shelves 720 and/or the selectively movable walls 728 to move to the desired position.

At 1308, the method 1300 terminates, for example until invoked again. Alternatively, the method 1300 may repeat continuously or repeatedly, or may execute as multiple instances of a multi-threaded process.

Figure 14:
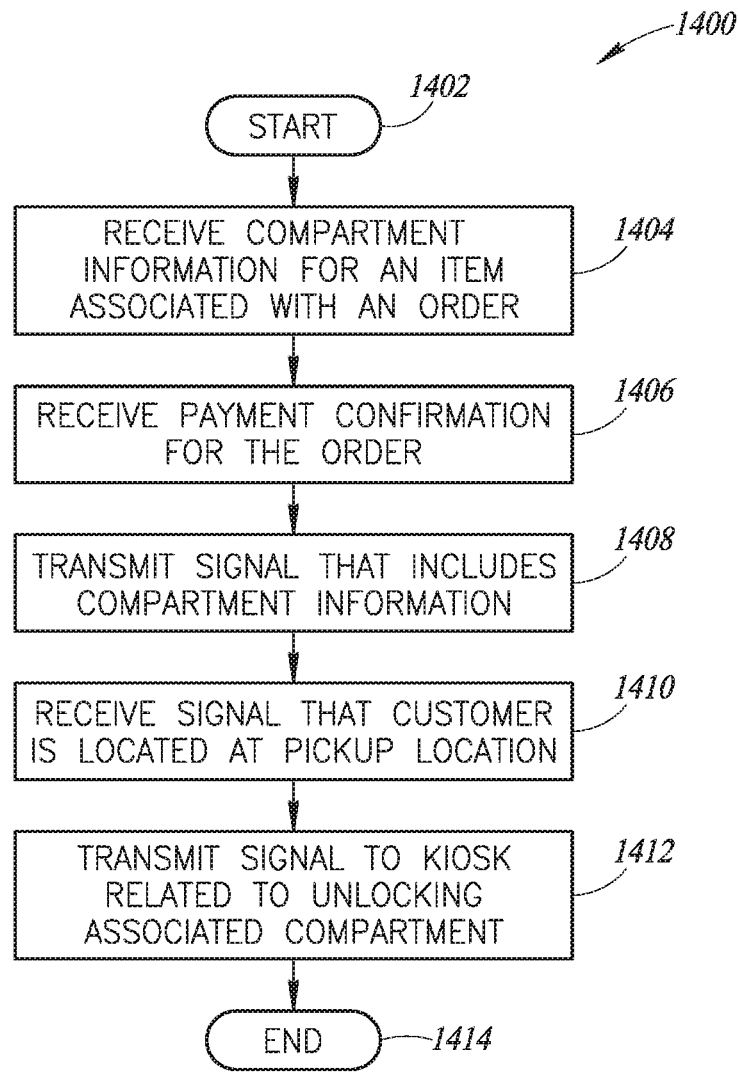
FIG. 14 is a logic flow diagram of a method that may be used to pay for and retrieve an item located in a vending kiosk, according to at least one illustrated implementation.

FIG. 14 shows a method 1400 that may be used to pay for and retrieve an item located in a vending kiosk 100, according to at least one illustrated implementation. The method 1400 starts at 1402, at which a processor-based device, for example the control system 1000.

At 1404, the processor-based device, such as the control system 1000, may receive information regarding the compartment 104 in a vending kiosk 100 which an item, such as the container 200, may be placed. In some implementations, the container 200 may be associated with an order placed by a customer. For example, in some implementations, the container 200 may hold a food item that that corresponds to an order or request that had previously been placed by a customer for pick-up at the kiosk 100. In some implementations, the location information regarding the compartment 104 may be determined by a vendor, employee, robot, or other operator who stocks items into the various compartments 104 of the vending kiosk 100. In some implementations, product (e.g., vendable product, assembled product) may be loaded from an exterior of the vending kiosk 100 into respective compartments. Such product may be previously fully cooked or partially cooked, prior to being loaded into the compartments. Alternatively, product may be uncooked when loaded into the compartments, and may optionally be cooked while in the compartments, prior to vending or dispensing to a customer. In some implementations, product (e.g., ingredients, raw ingredients, unassembled product) may be loaded from an exterior of the vending kiosk 100 into a portion of the kiosk that is not a compartment and, or is otherwise generally not accessible by a customer. The loaded product may, for example, be assembled via one or more robots into an assembled product. Once assembled, the assembled product may be moved within the vending kiosk to a compartment for vending, or may be vended directly from a slot or other opening. The assembled product may be cooked or partially cooked before being moved within the vending kiosk. Alternatively, or additionally, the assembled product may be cooked or finish cooking within the compartment after being loaded into the compartment.

Once the operator or robot has placed the container 200 in the compartment 104, the operator may perform an action to associate the container 200 with the compartment 104. Such an action may include, for example, entering such information into a user interface (e.g., the user input subsystem 148, or a hand-held device) to associate the container 200 with the compartment 104. In some implementations, such an action may include reading a machine-readable symbol associated with the container 200 and reading a machine-readable symbol associated with the compartment 104 to store the location information. In some implementations, such an action may include reading information from a wireless transponder (e.g., RFID transponder) associated with the container 200 and reading information from a wireless transponder (e.g., RFID transponder) associated with the compartment 104 to store the location information. In some implementations, such an action may include storing information that specifies or represents a pose of a robot with respect to a compartment to store the location information. Automatically reading or capturing such information may advantageously reduce the possibility that the data regarding the container 200 and/or the compartment 104 may be erroneously entered.

At 1406, the processor-based device, such as the control system 1000, may receive a payment confirmation for the container 200 or item of food or other vendable product in the compartment 104. In some implementations, the magnetic stripe reader 150 may be used to read and collect information that has been encoded within a financial transaction card 158 using, for example, a magnetic stripe, a card chip, or some other type of storage medium. The magnetic stripe reader 150 may be communicatively coupled to one or more processors that may authorize a requested purchase transaction based upon information stored within and/or associated with the financial transaction card 158. Such authorization may then be received by the control system 1000. In some implementations, a customer may initiate authorization for payment from a mobile device or some other customer-facing processor-enabled device that is remote from the vending kiosk 100. In such a situation, a payment authorization request may be transmitted to one or more remote processors for approval. Once the remote processor-enabled device approves the authorization request, at least one of the remote processor-enabled device and/or the customer-facing processor-enabled device may transmit payment confirmation to the control system 1000. In some implementations, the control system 1000 may generate payment confirmation, such as, for example, when the customer enters money into the currency acceptor and validator.

At 1408, the processor-based device, such as the control system 1000, upon receiving payment confirmation may transmit a signal that includes the information identifying the compartment 104. Such a signal may be transmitted upon a request by the customer, such as, for example, when the customer arrives at the location of the vending kiosk 100. In some implementations, the signal including the location information may be transmitted to the mobile device or some other customer-facing processor-enabled device that is separate from the vending kiosk 100. In some implementations, the signal may be transmitted to the touchscreen 154 for presentation. In such implementations, the signal may be used to present the location information of the compartment to the customer.

At 1410, the processor-based device, such as the control system 1000, may receive one or more signals that the customer who authorized the purchase transaction, or who is associated with such a customer who authorized the transaction, is located at the pick-up location. For example, in some implementations, the antenna 162 and radio 164 may be used to provide near field communication (NFC) capabilities and/or radio frequency identification (RFID) capabilities with device and objects proximate the vending kiosk 100. Such devices may include wireless devices associated with consumers who have authorized purchase transaction for items contained with the vending kiosk 100. As such, the wireless device of the consumer may be with four (4) inches of the antenna for the antenna to receive NFC signals and/or within nine (9) feet of the antenna for the antenna to receive RFID signals. Such NFC signals and/or RFID signals may be used to encode information to authorize a purchase transaction and/or to confirm that a person or device logically associated with a previous purchase transaction is proximate the vending kiosk 100. The antenna 162 may be communicatively coupled to a processor-enabled device that may decode the information contained with the NFC signal and/or RFID signal, and use the decoded information to provide such authorization and/or confirmation. In some implementations, the controller 1000 may receive one or more signals from the touchscreen 154 (e.g., a pick-up code or customer identification) that may be used to identify a customer who is at the pick-up location.

At 1412, the processor-based device, such as the control system 1000, may transmit one or more signals to the vending kiosk 100 to unlock the door 102 to the compartment 104 that holds the container 200 or other item to be retrieved. Such a signal may be used to transition the locking actuator 218a, for example, to an UNLOCKED state to enable the associated door 102 to be opened, thereby providing access to the appropriate compartment 104. In some implementations, a signal may additionally or alternatively cause a corresponding door to automatically move from a closed to an open configuration or position. In some implementations, a signal may additionally or alternatively cause an activation (e.g., coupling, uncoupling) of certain hinges for a corresponding door, such that the door opens and closes in a defined direction (e.g., hinged to swing open in a clockwise direction, hinged to swing open in a counterclockwise direction, hinged along a left edge of the door to swing open in a clockwise direction, hinged along a right edge of the door to swing open in a counterclockwise direction, hinged to swing open in an upward direction, hinged to swing open in a downward direction). Such can, for example, be based on one or more physical characteristics of the specific customer that will access the compartment via the door. For instance, the hinge may be configured to open in a clockwise or counterclockwise direction to facilitate opening by a right-handed customer, or conversely, a left-handed customer. Also for instance, the hinge may be configured to open in an upward direction or a downward direction based on a height of the customer or where a customer is confined to a wheelchair. The particular compartment may even be assigned based on a physical characteristic of a specific customer. Thus, orders from specific customers who are below a threshold height or confined to a wheelchair may be allocated to relatively lower compartments in the vending kiosk, while orders from specific customers who are above a threshold height may be allocated to relatively higher compartments in the vending kiosk. In some implementations, the processor-based device may transmit such a signal upon receiving the signal at 1410 that the customer has reached the pick-up location (e.g., the location of the vending kiosk 100).

At 1414, the method 1400 terminates, for example until invoked again. Alternatively, the method 1400 may repeat continuously or repeatedly, or may execute as multiple instances of a multi-threaded process.

Various embodiments of the devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. U.S. Pat. No. 9,292,889, issued Mar. 22, 2016, titled "Systems and Methods of Preparing Food Products"; U.S. patent application Ser. No. 62/311,787; U.S. patent application Ser. No. 15/040,866, filed Feb. 10, 2016, titled, "Systems and Methods of Preparing Food Products"; PCT Application No. PCT/US2014/042879, filed Jun. 18, 2014, titled, "Systems and Methods of Preparing Food Products"; U.S. patent application Ser. No. 15/465,230, filed Mar. 21, 2017, titled, "Container for Transport and Storage of Food Products"; U.S. Provisional Patent Application No. 62/311,787, filed Mar. 22, 2016, titled, "Container for Transport and Storage of Food Products"; PCT Application No. PCT/US2017/023408, filed Mar. 21, 2017, titled, "Container for Transport and Storage of Food Products"; U.S. patent application Ser. No. 15/481,240, filed Apr. 6, 2017, titled, "On-Demand Robotic Food Assembly and Related Systems, Devices, and Methods"; U.S. Provisional Patent Application No. 62/320,282, filed Apr. 8, 2016, titled, "On-Demand Robotic Food Assembly and Related Systems, Devices, and Methods"; PCT Application No. PCT/US17/26408, filed Apr. 6, 2017, titled, "On-Demand Robotic Food Assembly and Related Systems, Devices, and Methods"; U.S. Provisional Patent Application No. 62/394,063, filed Sep. 13, 2016, titled, "Cutter with Radially Disposed Blades"; U.S. Provisional Patent Application No.

62/613,272, file Jan. 3, 2018, titled "MULTI-MODAL DISTRIBUTION SYSTEMS AND METHODS USING VENDING KIOSKS AND AUTONOMOUS DELIVERY VEHICLES"; U.S. Provisional Patent Application No. 62/531,131, filed Jul. 7, 2017, titled "CONFIGURABLE FOOD DELIVERY VEHICLE AND RELATED METHODS AND ARTICLES"; U.S. Provisional Patent Application No. 62/531,136, filed Jul. 11, 2017, titled "CONFIGURABLE FOOD DELIVERY VEHICLE AND RELATED METHODS AND ARTICLES"; U.S. Provisional Patent Application No. 62/532,885, filed Jul. 14, 2017, titled "MULTI-MODAL VEHICLE IMPLEMENTED FOOD PREPARATION, COOKING, AND DISTRIBUTION SYSTEMS AND METHODS"; U.S. patent application Ser. No. 29/558,872; U.S. patent application Ser. No. 29/558,873; and U.S. patent application Ser. No. 29/558,874 are each incorporated herein by reference, in their entirety.

From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A self-propelled delivery robot, comprising:
a propulsion subsystem including at least one motor configured to move the self-propelled delivery robot through an environment;
a first thermally insulated compartment having a first interior, the first interior sized and dimensioned to contain a first food item;
a second thermally insulated compartment having a second interior, the second interior sized and dimensioned to contain a second food item;
at least one sliding door to provide access to the first thermally insulated compartment or the second thermally insulated compartment;
a transfer assembly configured to selectively, operably transfer selected food items between the first thermally insulated compartment and the second thermally insulated compartment; and
a control subsystem comprising:
a processor; and
a computer readable memory, the computer readable memory including processor-readable instructions that when executed by the processor, cause the processor to:
receive location information related to a destination; and
transmit at least one instruction to the at least one motor, wherein the at least one instruction causes the at least one motor to move the self-propelled delivery robot along a route associated with the destination.

2. The self-propelled delivery robot of claim 1, further comprising:
a container configured to surround the first thermally insulated compartment and the second thermally insulated compartment.

3. The self-propelled delivery robot of claim 1, wherein the transfer assembly comprises a robotic arm, which is positionable relative to the first thermally insulated compartment and the second thermally insulated compartment to transfer food items there between.

4. The self-propelled delivery robot of claim 1, wherein the first thermally insulated compartment includes a heater positioned to heat the first interior of the first thermally insulated compartment.

5. The self-propelled delivery robot of claim 4, wherein the heater includes at least one electrically resistive heating element.

6. The self-propelled delivery robot of claim 4, wherein the heater is operable to raise a temperature in the first interior to between 140° F. and 250° F. to warm an already cooked item of food stored in the first thermally insulated compartment.

7. The self-propelled delivery robot of claim 1, wherein the second thermally insulated compartment includes a cooler positioned to cool the second interior of the second thermally insulated compartment.

8. The self-propelled delivery robot of claim 7, wherein the cooler includes a refrigerant carrying coil.

9. The self-propelled delivery robot of claim 1, further comprising:
at least one sliding door to provide access to the first thermally insulated compartment or the second thermally insulated compartment, wherein the at least one rotating or sliding door comprises:
a first door associated with the first thermally insulated compartment and a second door associated with the second thermally insulated compartment, wherein each door is respectively moveable between a closed configuration in which the respective door prevents access to the interior of the associated thermally insulated compartment and an open configuration in which the respective door provides access to the interior of the associated thermally insulated compartment.

10. The self-propelled delivery robot of claim 9, wherein the first door includes a first selectively lockable door that provides access to at least the first thermally insulated compartment, and the second door includes a second selectively lockable door that provides access to at least the second thermally insulated compartment.

11. The self-propelled delivery robot of claim 10, wherein one or both of the first selectively lockable door and the second selectively lockable door selectively unlocks responsive to a signal received from a controller network located remotely from the self-propelled delivery robot.

12. The self-propelled delivery robot of claim 10, further comprising:
at least one antenna, and
at least one radio communicatively coupled to the antenna, wherein the at least one processor includes a near field communications processor communicatively coupled to the at least one radio to receive near field communications signals via the antenna and to control at least one of the first selectively lockable door and the second selectively lockable door upon confirming that a device or a person logically associated with the food item in the respective first thermally insulated compartment or the second thermally insulated compartment is proximate the self-propelled delivery robot.

13. The self-propelled delivery robot of claim 10, further comprising:
a biometric input subsystem that generates a signal based upon one or more biometric features of a person, wherein one of the first selectively lockable door and the second selectively lockable door selectively unlocks responsive to signal generated from the biometric input subsystem.

14. The self-propelled delivery robot of claim 1, wherein the propulsion subsystem includes at least one of a set of wheels or a set of treads.

15. The self-propelled delivery robot of claim 1, wherein the propulsion subsystem includes one or more rotors.

16. A self-propelled delivery robot, comprising:
a propulsion subsystem including at least one motor configured to move the self-propelled delivery robot through an environment;
a first thermally insulated compartment having a first interior, the first interior sized and dimensioned to contain a first food item;
a second thermally insulated compartment having a second interior, the second interior sized and dimensioned to contain a second food item;
a transfer assembly configured to selectively, operably transfer selected food items between the first thermally insulated compartment and the second thermally insulated compartment; and
a control subsystem comprising:
a processor; and
a computer readable memory, the computer readable memory including processor-readable instructions that when executed by the processor, cause the processor to:
receive location information related to a destination; and
transmit at least one instruction to the at least one motor, wherein the at least one instruction causes the at least one motor to move the self-propelled delivery robot along a route associated with the destination.

17. The self-propelled delivery robot of claim 16, wherein the transfer assembly comprises a robotic arm, which is positionable relative to the first thermally insulated compartment and the second thermally insulated compartment to transfer food items there between.

18. The self-propelled delivery robot of claim 16, wherein the first thermally insulated compartment includes a heater positioned to heat the first interior of the first thermally insulated compartment or a cooler positioned to cool the first interior of the first thermally insulated compartment.

19. The self-propelled delivery robot of claim 16, further comprising:
a set of doors including a first door associated with the first thermally insulated compartment and a second door associated with the second thermally insulated compartment, wherein each door is respectively moveable between a closed configuration in which the respective door prevents access to the interior of the associated thermally insulated compartment and an open configuration in which the respective door provides access to the interior of the associated thermally insulated compartment.

20. A self-propelled delivery robot, comprising:
a propulsion subsystem configured to move the self-propelled delivery robot to a delivery destination;
at least two thermally insulated compartments sized and dimensioned to contain food items to be delivered to the delivery destination;
a transfer assembly configured to selectively retrieve selected food items from the at least two thermally insulated compartments; and
a control subsystem comprising:
a processor; and
a computer readable memory, the computer readable memory including processor-readable instructions that when executed by the processor, cause the processor to:
receive location information related to the delivery destination;
control an operation of the propulsion subsystem to move the self-propelled delivery robot along a selected route to the delivery destination; and
control an operation of the transfer assembly to retrieve the selected food items from the at least two thermally insulated compartments at the delivery destination and provide to an end user.

21. The self-propelled delivery robot of claim 20, wherein the at least two thermally insulated compartments comprise a first thermally insulated compartment to store cold food items and a second thermally insulated compartment to store hot or warm food items.

22. The self-propelled delivery robot of claim 21, wherein the second thermally insulated compartment includes a heater configured to transition between a cooking state and a warming state based on one or more signals from the processor.

23. The self-propelled delivery robot of claim 20, wherein the at least two thermally insulated compartments are reconfigurable through removable walls and/or shelves.

24. The self-propelled delivery robot of claim 20, wherein the at least two thermally insulated compartments comprise selectively lockable doors controlled by the processor.

* * * * *